United States Patent
Imai et al.

(10) Patent No.: US 9,678,412 B2
(45) Date of Patent: Jun. 13, 2017

(54) PROJECTION LENS SYSTEM HAVING MAGNIFICATION CHANGING FUNCTION AND PROJECTOR

(71) Applicant: KONICA MINOLTA, INC., Tokyo (JP)

(72) Inventors: Yusuke Imai, Tokyo (JP); Kazuhiko Inoue, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 166 days.

(21) Appl. No.: 14/655,205

(22) PCT Filed: Dec. 25, 2013

(86) PCT No.: PCT/JP2013/084639
§ 371 (c)(1),
(2) Date: Jun. 24, 2015

(87) PCT Pub. No.: WO2014/104083
PCT Pub. Date: Jul. 3, 2014

(65) Prior Publication Data
US 2015/0346464 A1   Dec. 3, 2015

(30) Foreign Application Priority Data
Dec. 27, 2012   (JP) .................................. 2012-284401

(51) Int. Cl.
*G03B 21/14*   (2006.01)
*G02B 13/16*   (2006.01)
(Continued)

(52) U.S. Cl.
CPC ........... *G03B 21/142* (2013.01); *G02B 13/16* (2013.01); *G02B 13/22* (2013.01); *G02B 15/177* (2013.01);
(Continued)

(58) Field of Classification Search
CPC ...... G02B 13/16; G02B 13/22; G02B 15/177; G02B 27/0988; G03B 21/142;
(Continued)

(56) References Cited

U.S. PATENT DOCUMENTS

| 5,416,639 A | 5/1995 | Yamanashi |
| 2002/0131184 A1* | 9/2002 | Yasui .................. G02B 15/177 359/680 |

(Continued)

FOREIGN PATENT DOCUMENTS

| JP | 05-019169 A | 1/1993 |
| JP | 06-051203 A | 2/1994 |

(Continued)

OTHER PUBLICATIONS

International Search Report in International Application No. PCT/JP2013/084639, dated Mar. 25, 2014, 4 pages.

*Primary Examiner* — Sultan Chowdhury
*Assistant Examiner* — Magda Cruz
(74) *Attorney, Agent, or Firm* — Brinks Gilson & Lione

(57) ABSTRACT

A zoom lens is a projection lens which is composed of a negative first lens group, a negative second lens group, a positive third lens group, a negative fourth lens group, a fifth lens group, and a positive sixth lens group in order from the enlargement conjugate side, and changes magnification by changing the intervals between the lens groups. At least the second, third, and fifth lens groups move when the magnification is changed, and the third lens group moves from the enlargement conjugate side to the reduction conjugate side when the magnification is changed from a telephoto end to a wide angle end. An aperture stop is disposed between the surface closest to the reduction conjugate side of the third lens group and the surface closest to the enlargement con- (Continued)

jugate side of the fifth lens group, and is approximately telecentric on the reduction conjugate side.

37 Claims, 37 Drawing Sheets

(51) Int. Cl.
  *G02F 1/1335* (2006.01)
  *G02B 27/09* (2006.01)
  *G02B 13/22* (2006.01)
  *G02B 15/177* (2006.01)

(52) U.S. Cl.
  CPC ... *G02B 27/0988* (2013.01); *G02F 1/133509* (2013.01); *G03B 2205/0046* (2013.01); *G03B 2205/0053* (2013.01)

(58) Field of Classification Search
  CPC .... G03B 2205/0046; G03B 2205/0053; G02F 1/133509
  See application file for complete search history.

(56) References Cited

U.S. PATENT DOCUMENTS

2002/0176058 A1    11/2002   Yasui et al.
2003/0103268 A1    6/2003   Nishikawa et al.

FOREIGN PATENT DOCUMENTS

| JP | 2002-182110 A | 6/2002 |
| JP | 2002-182111 A | 6/2002 |
| JP | 2002-350727 A | 12/2002 |
| JP | 2004-226510 A | 8/2004 |
| JP | 2011-069959 A | 4/2011 |

* cited by examiner

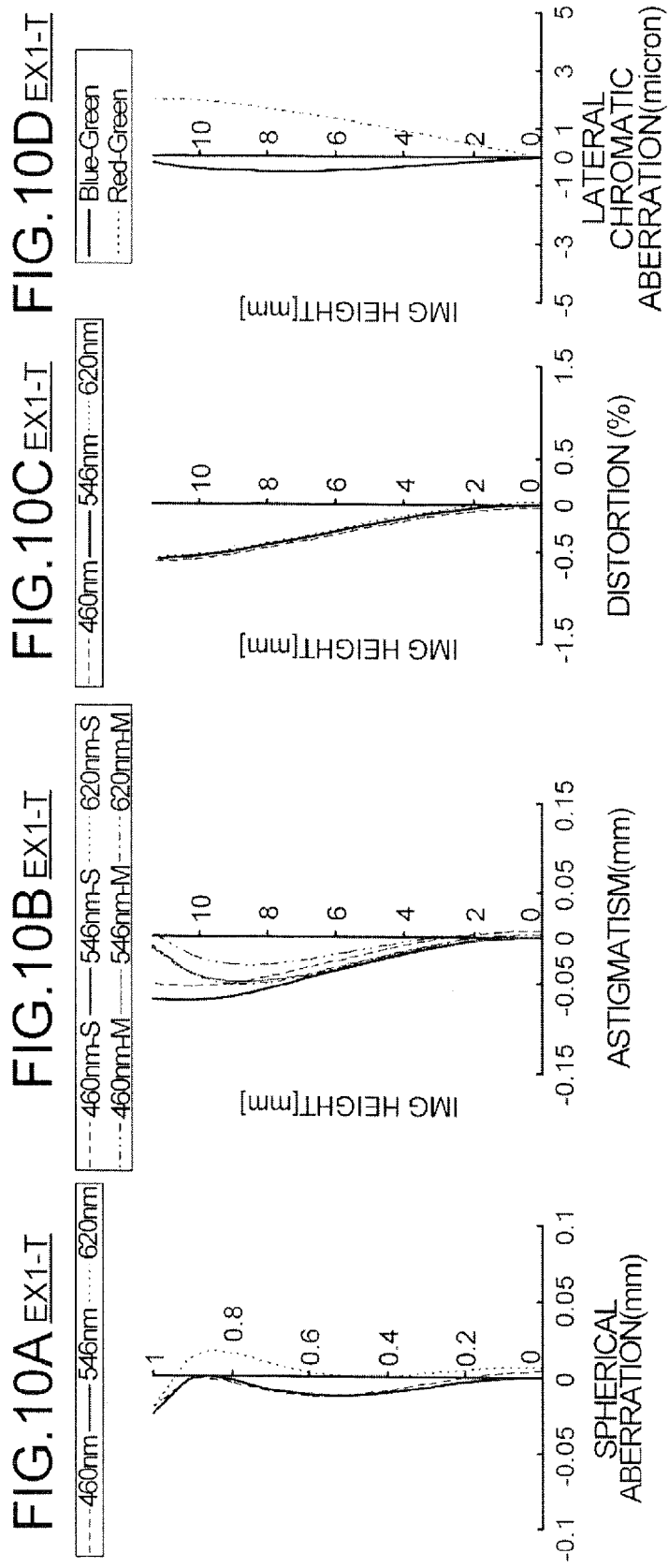

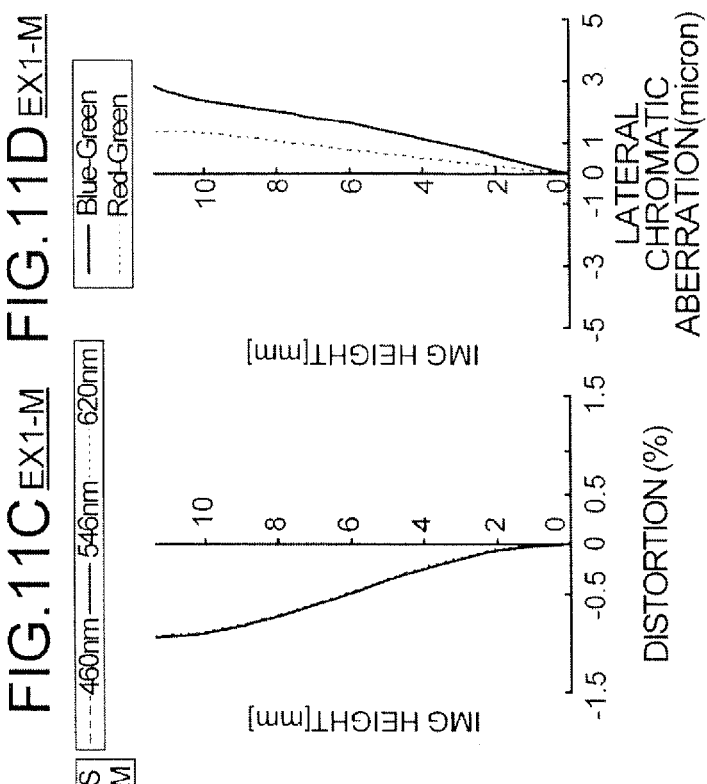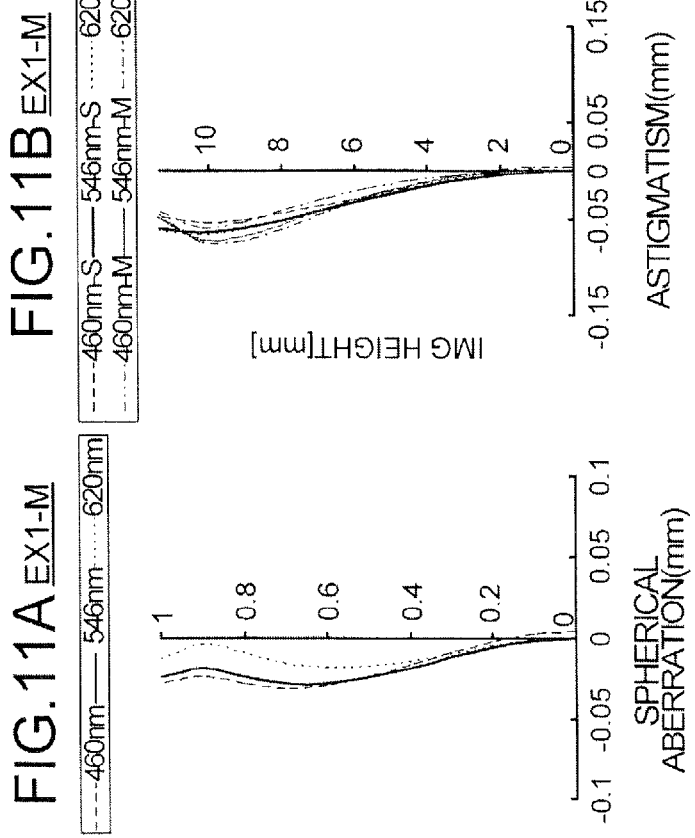

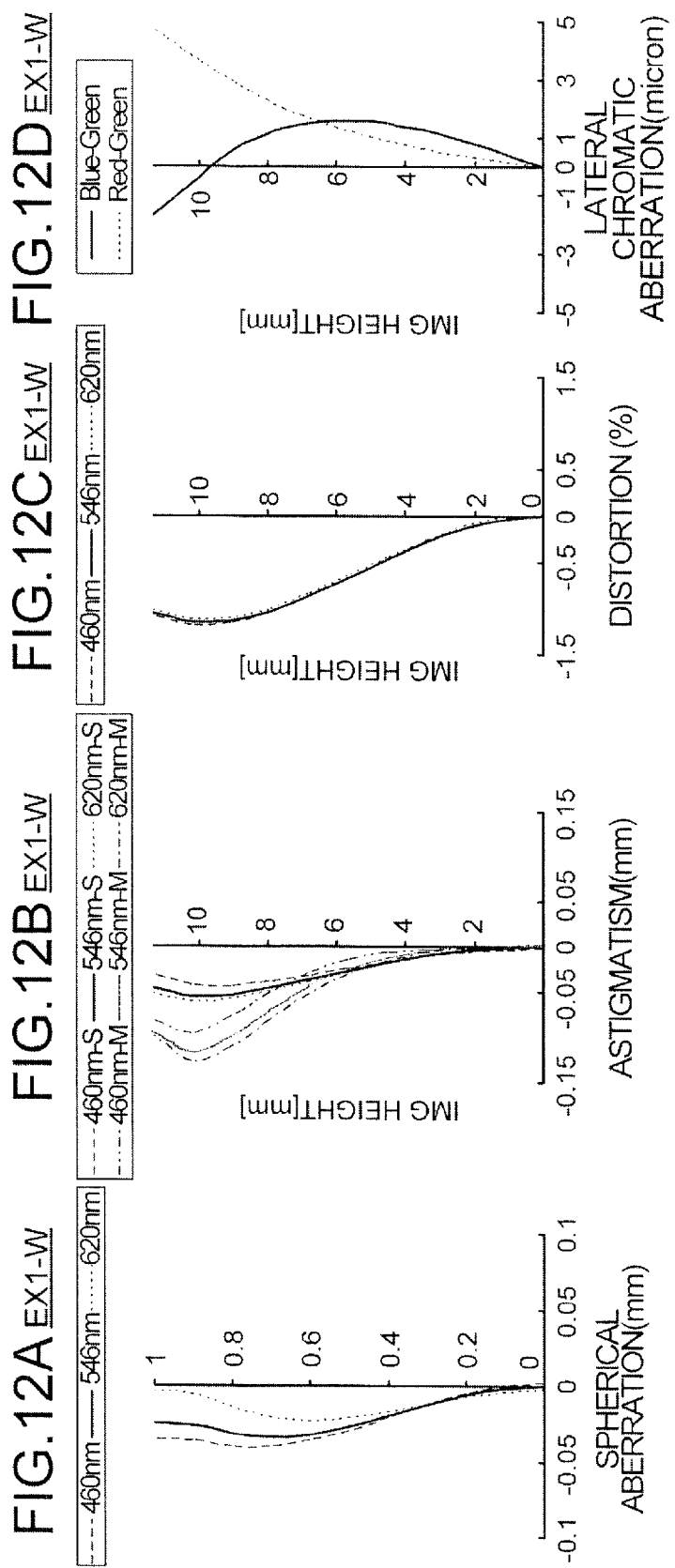

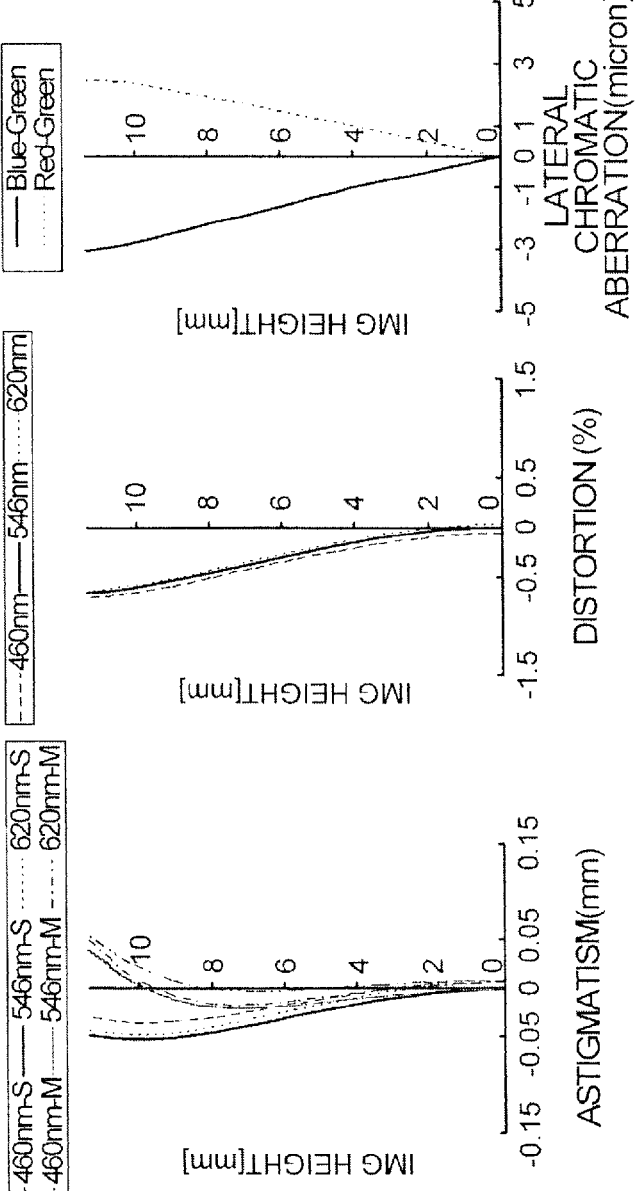

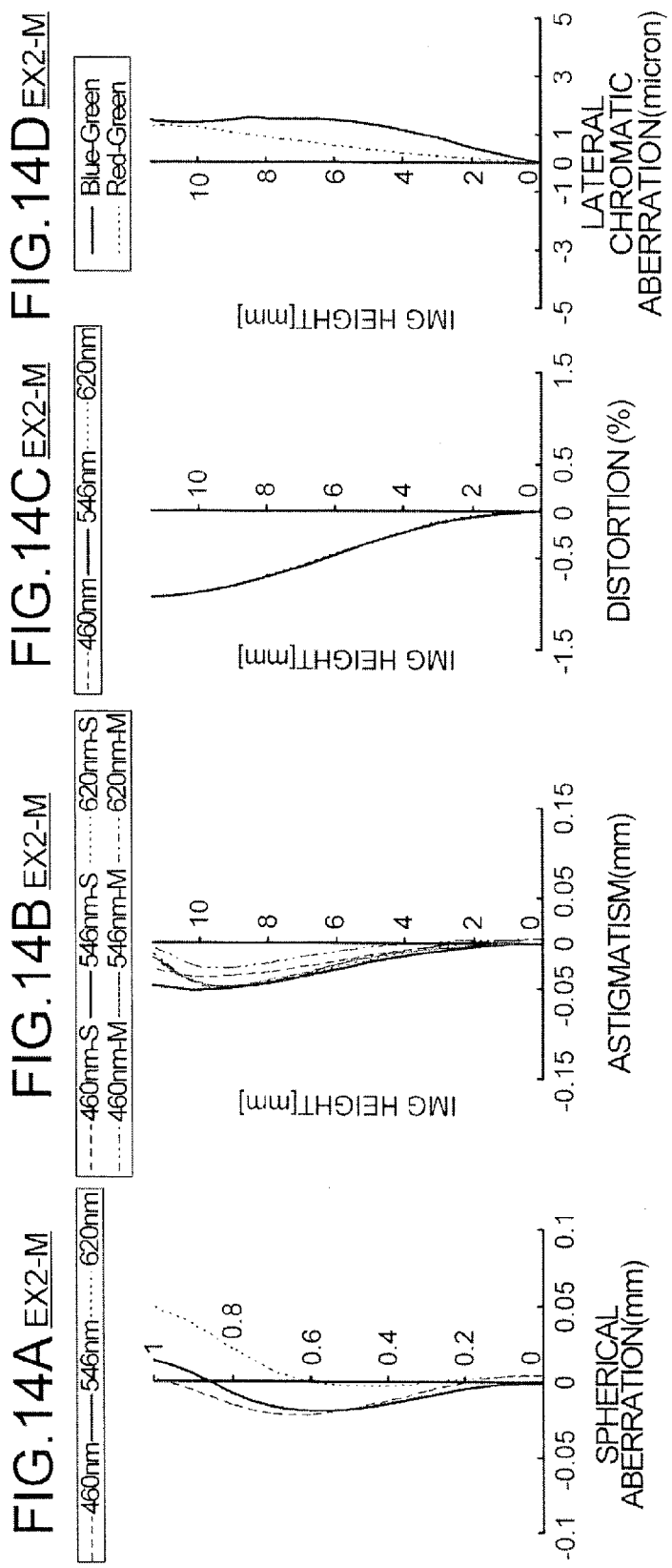

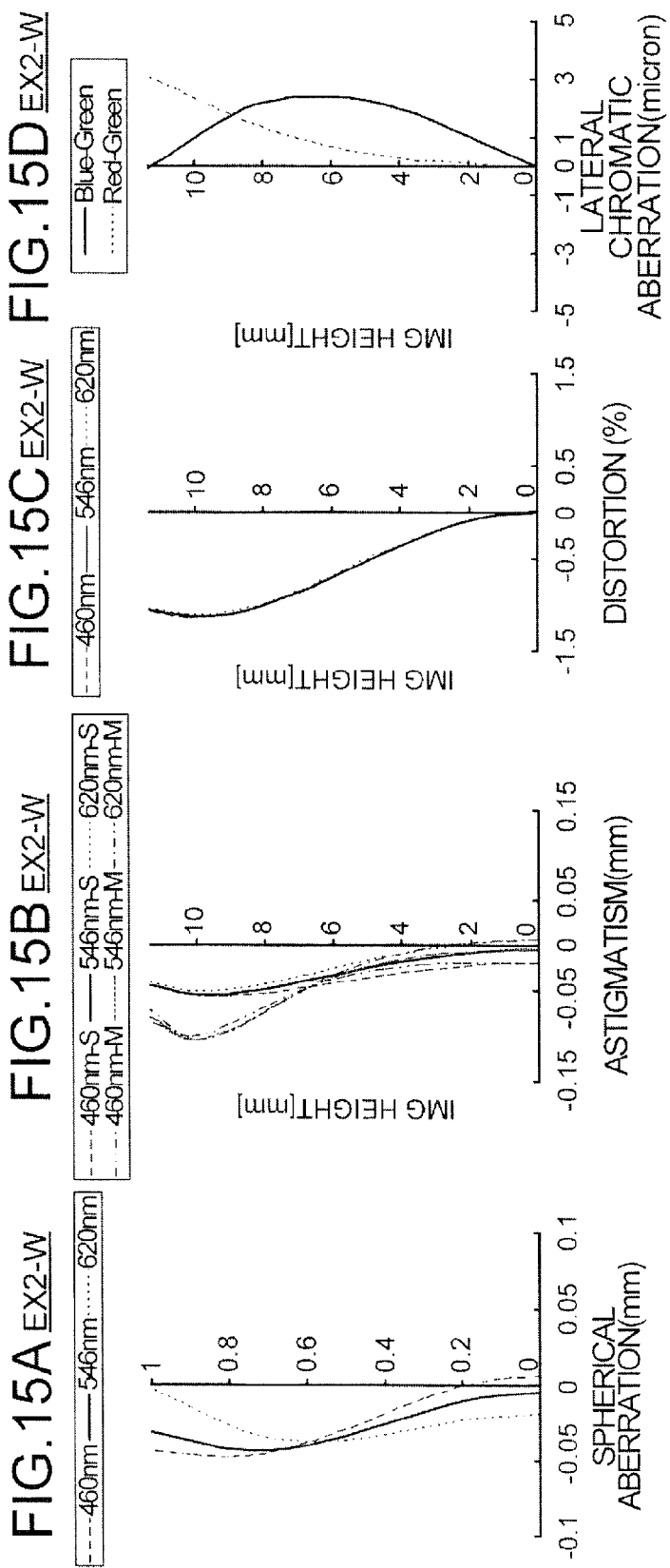

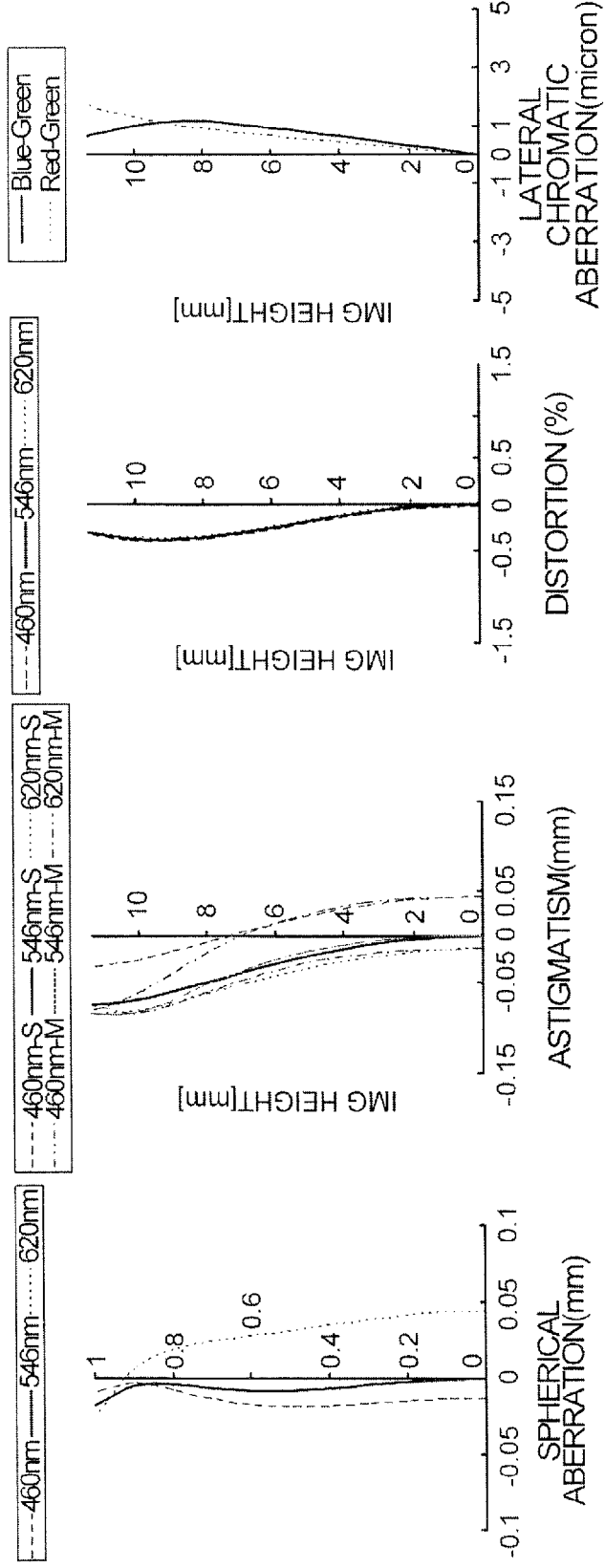

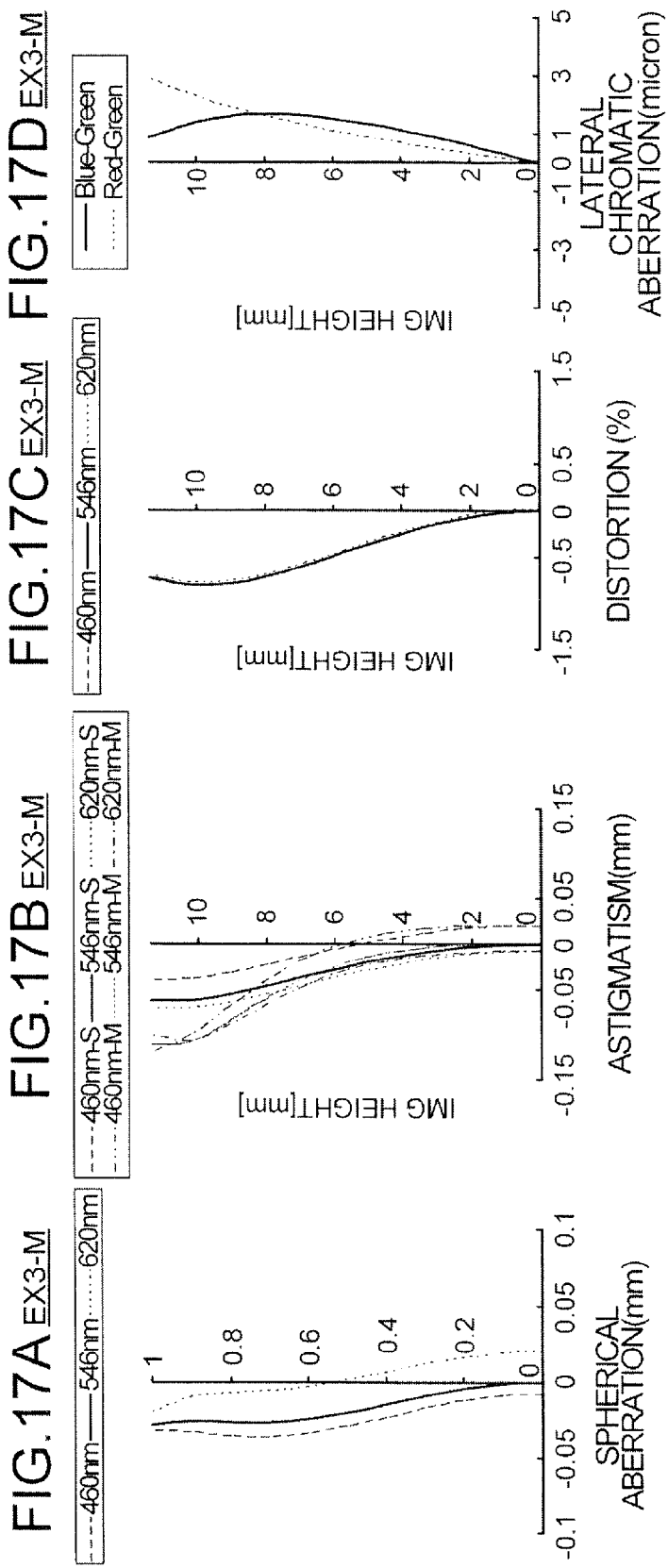

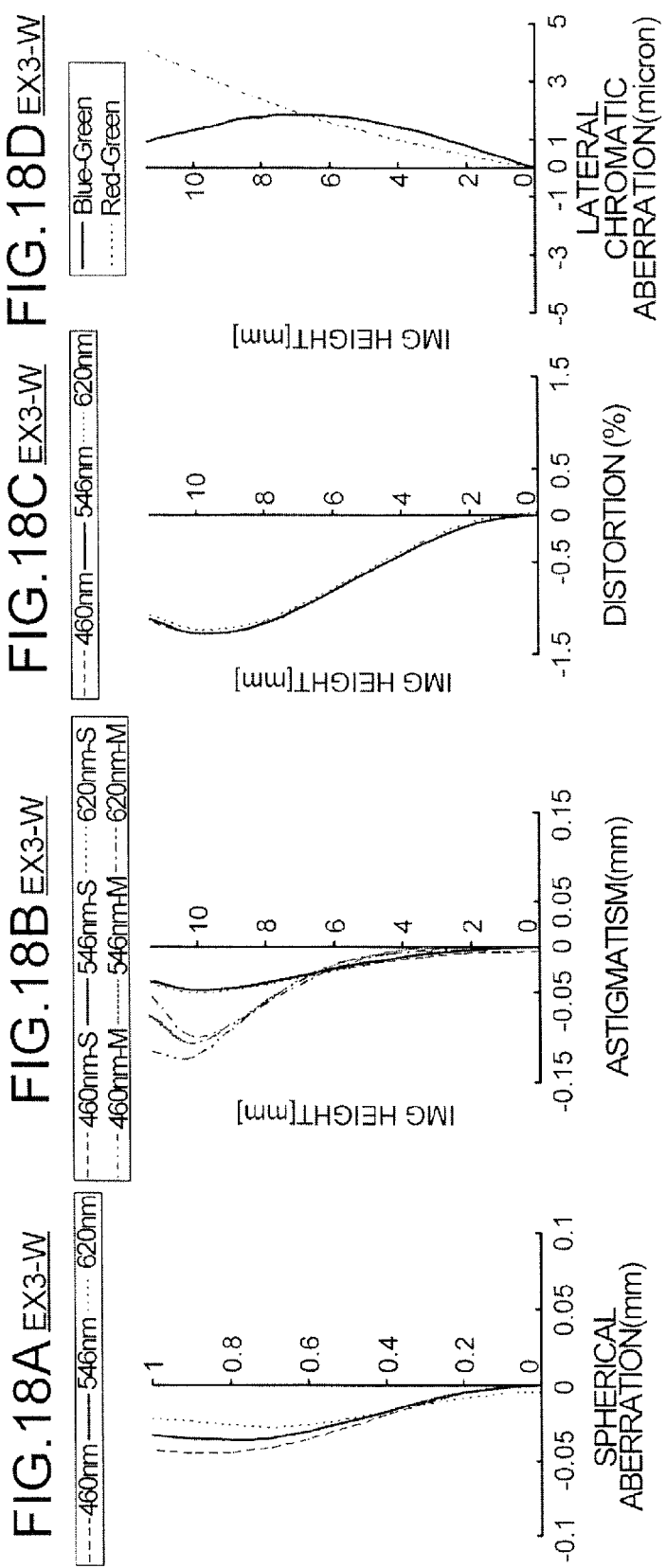

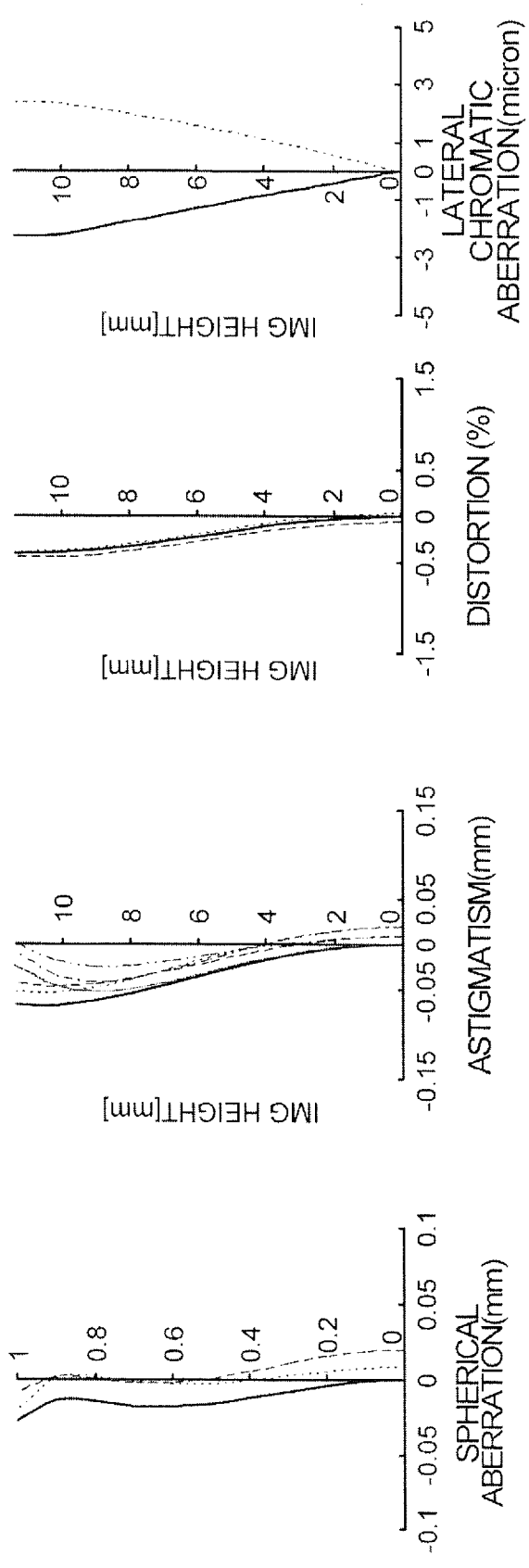
FIG.19A EX4-T  FIG.19B EX4-T  FIG.19C EX4-T  FIG.19D EX4-T

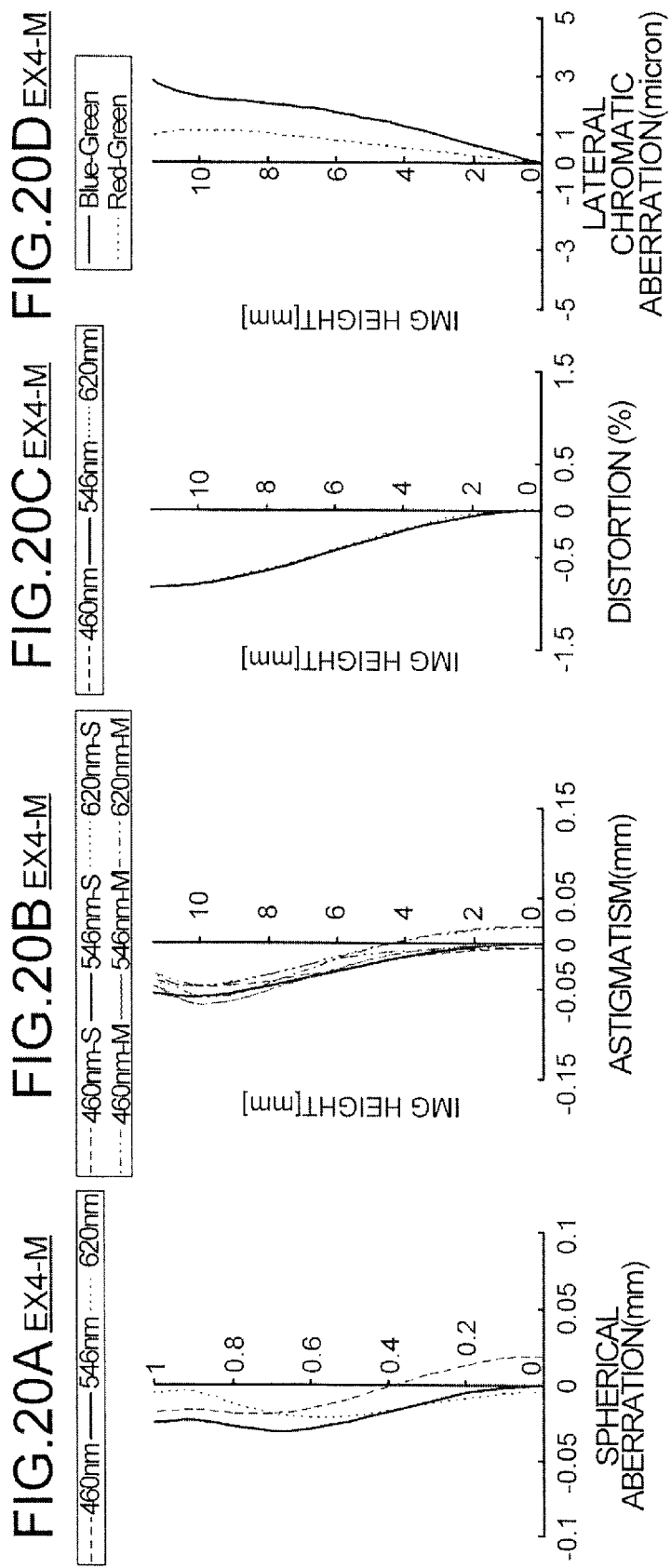

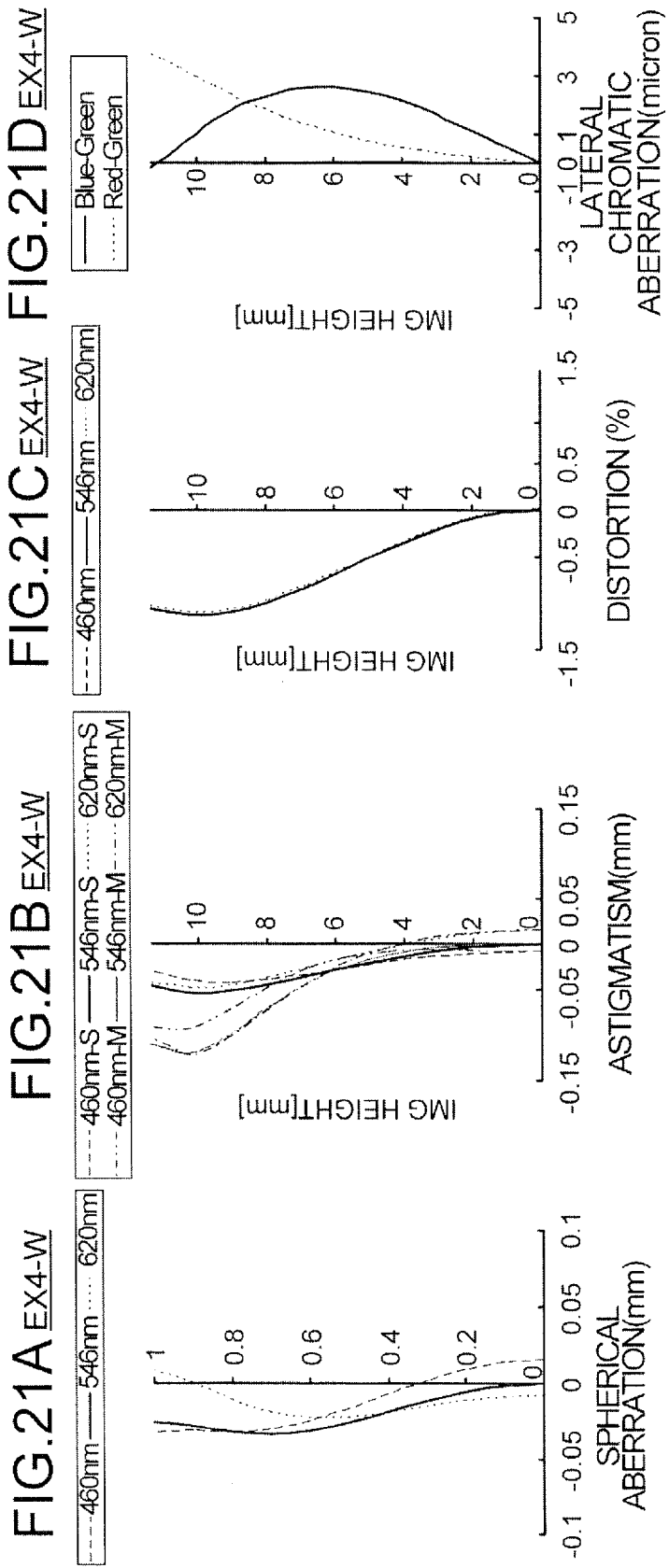

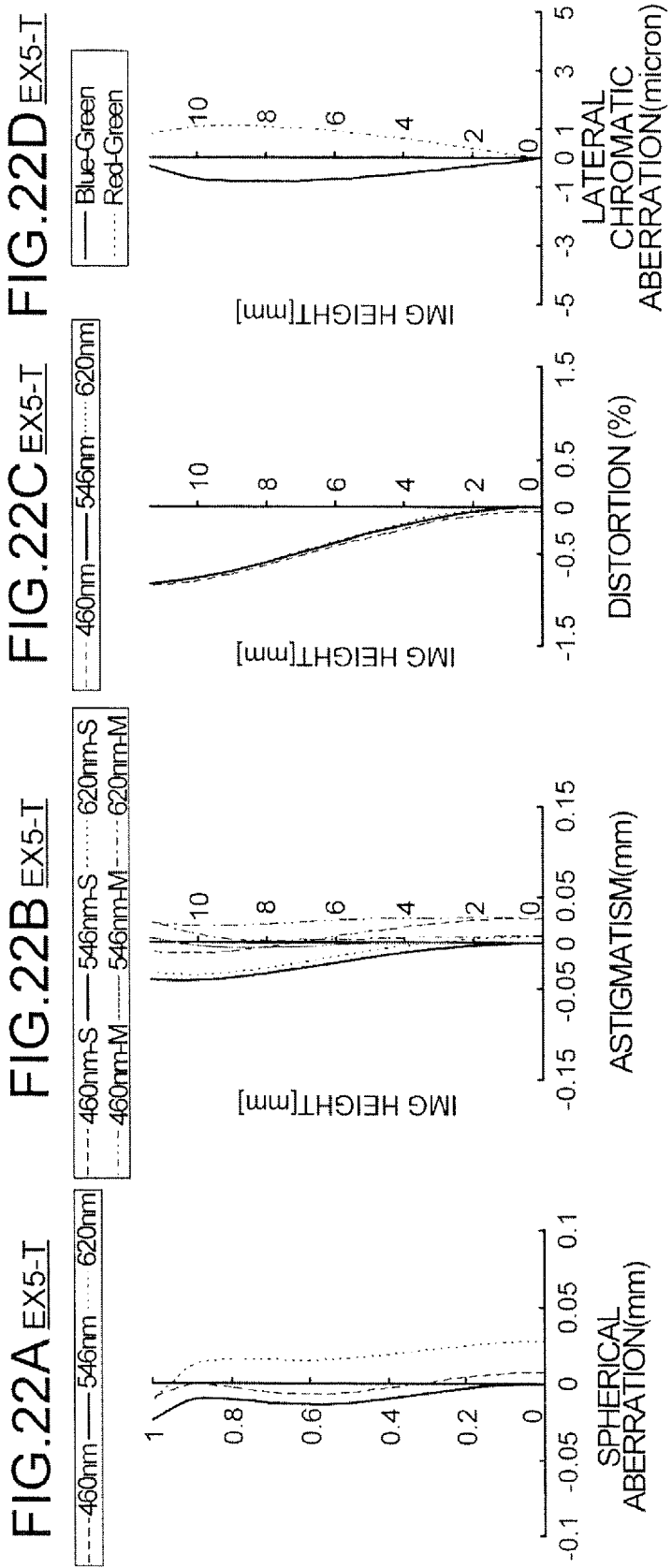

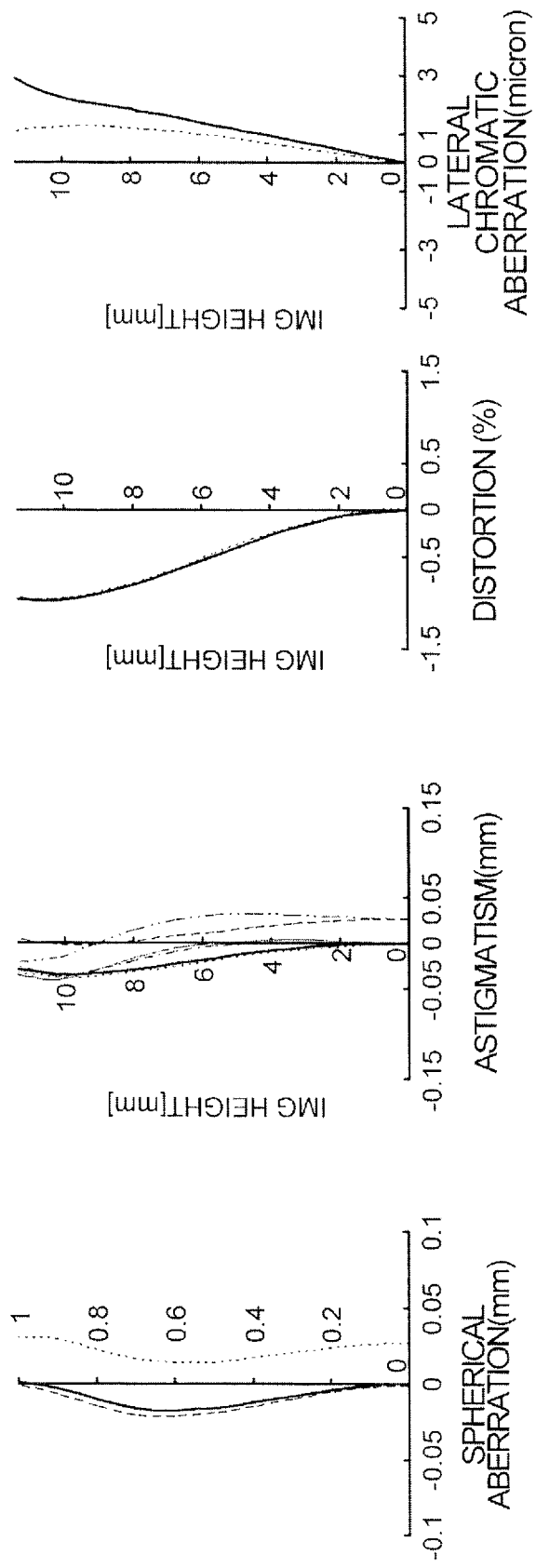

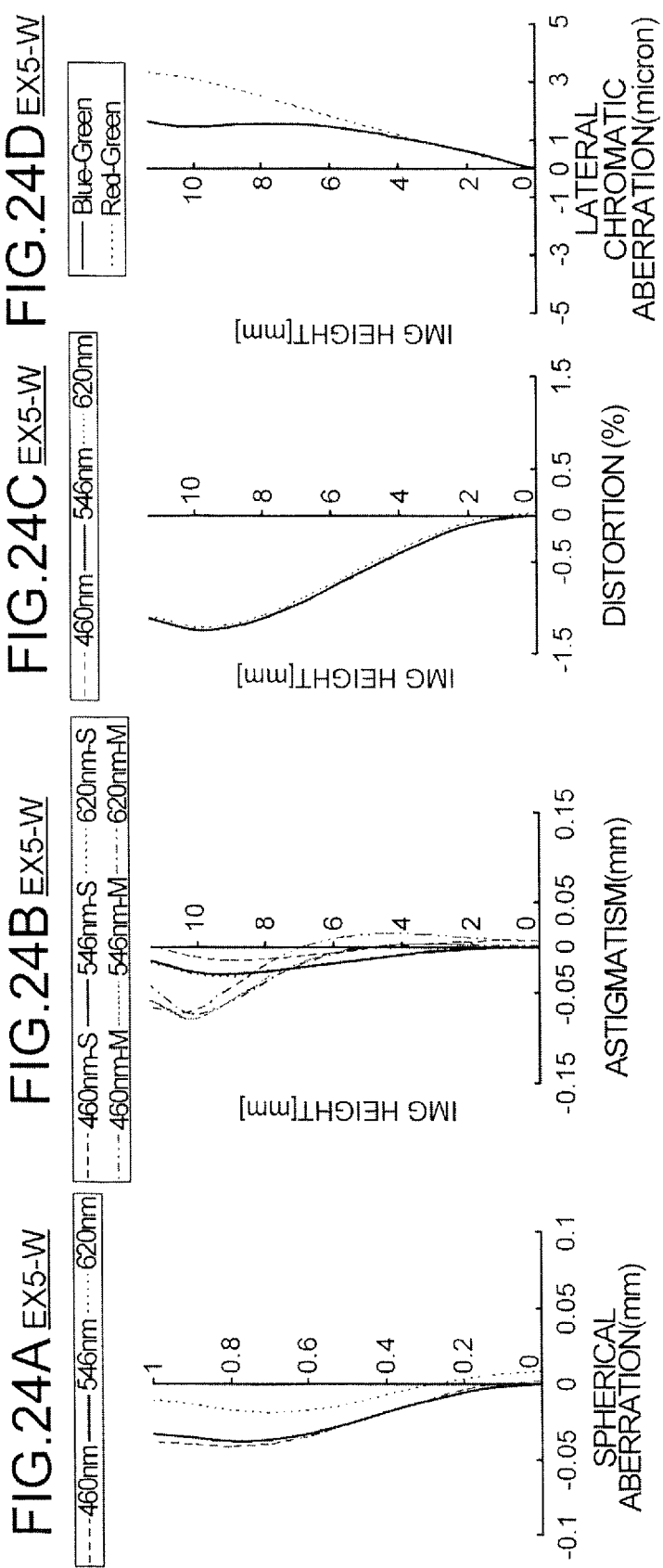

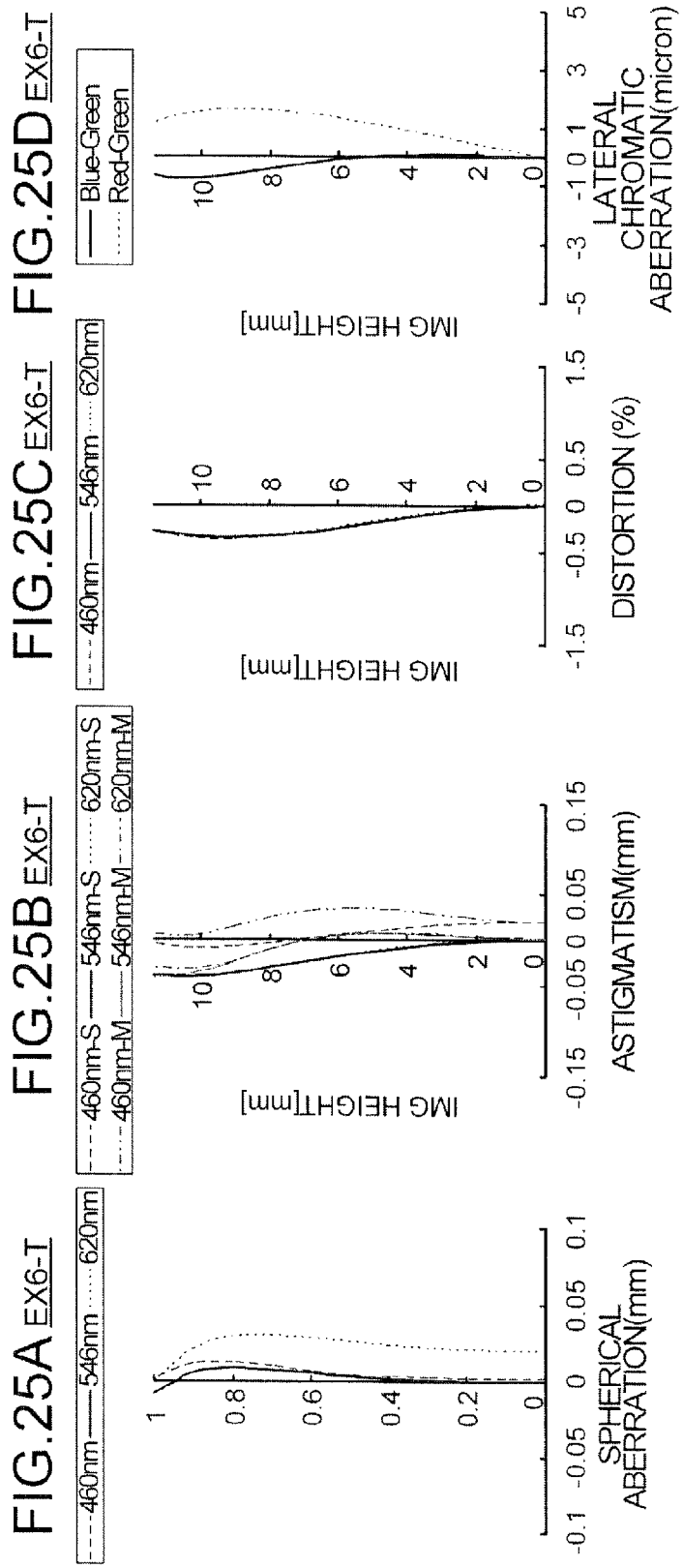

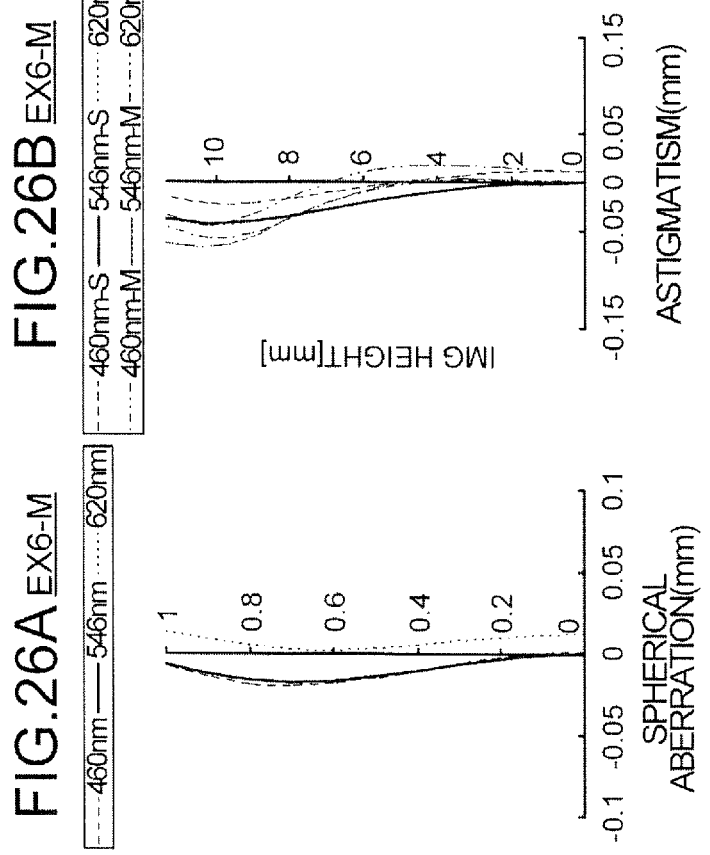

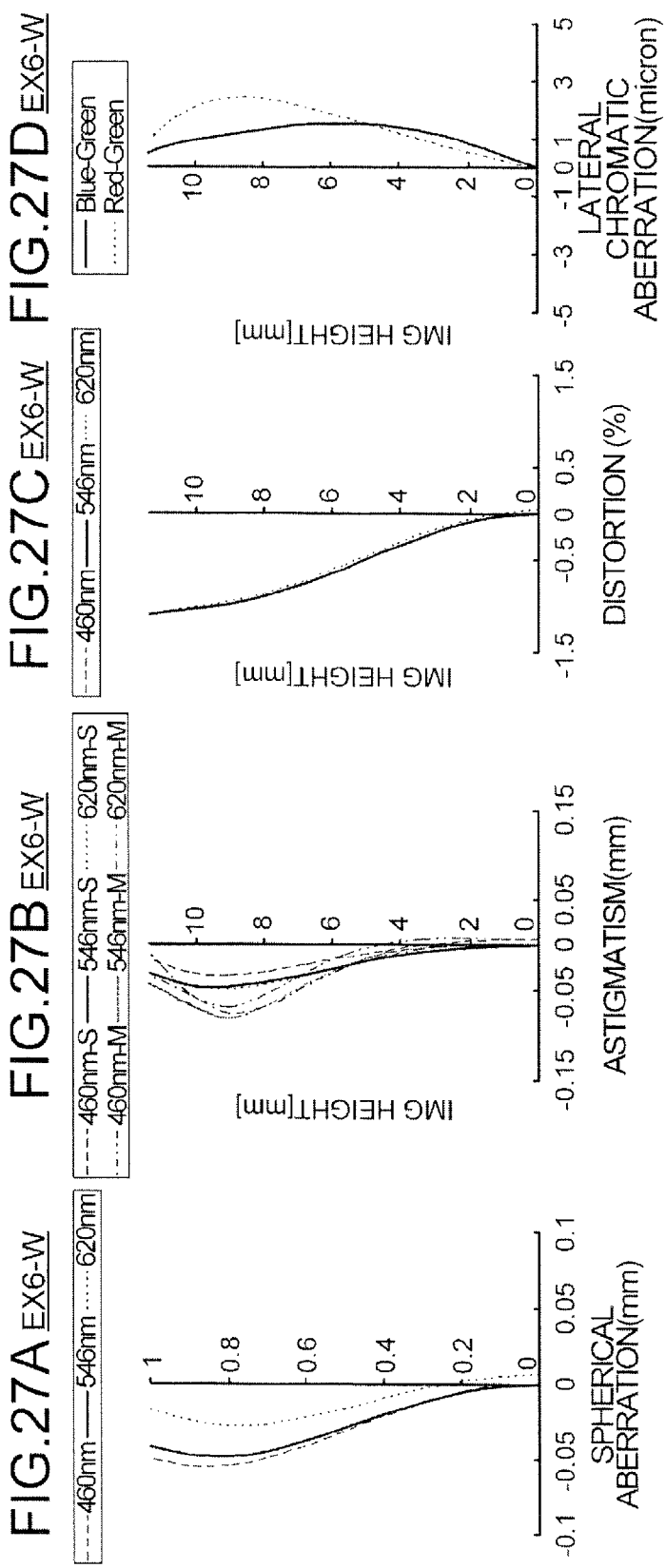

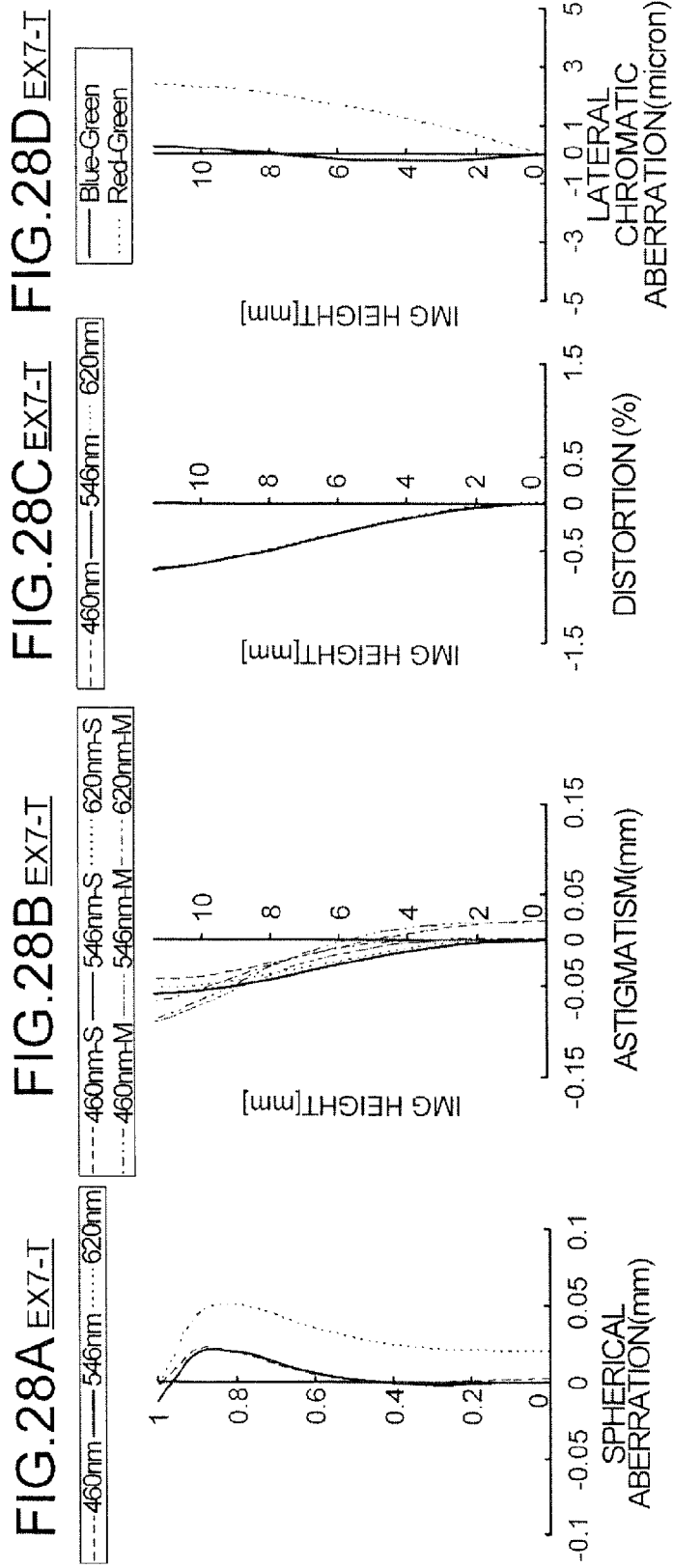

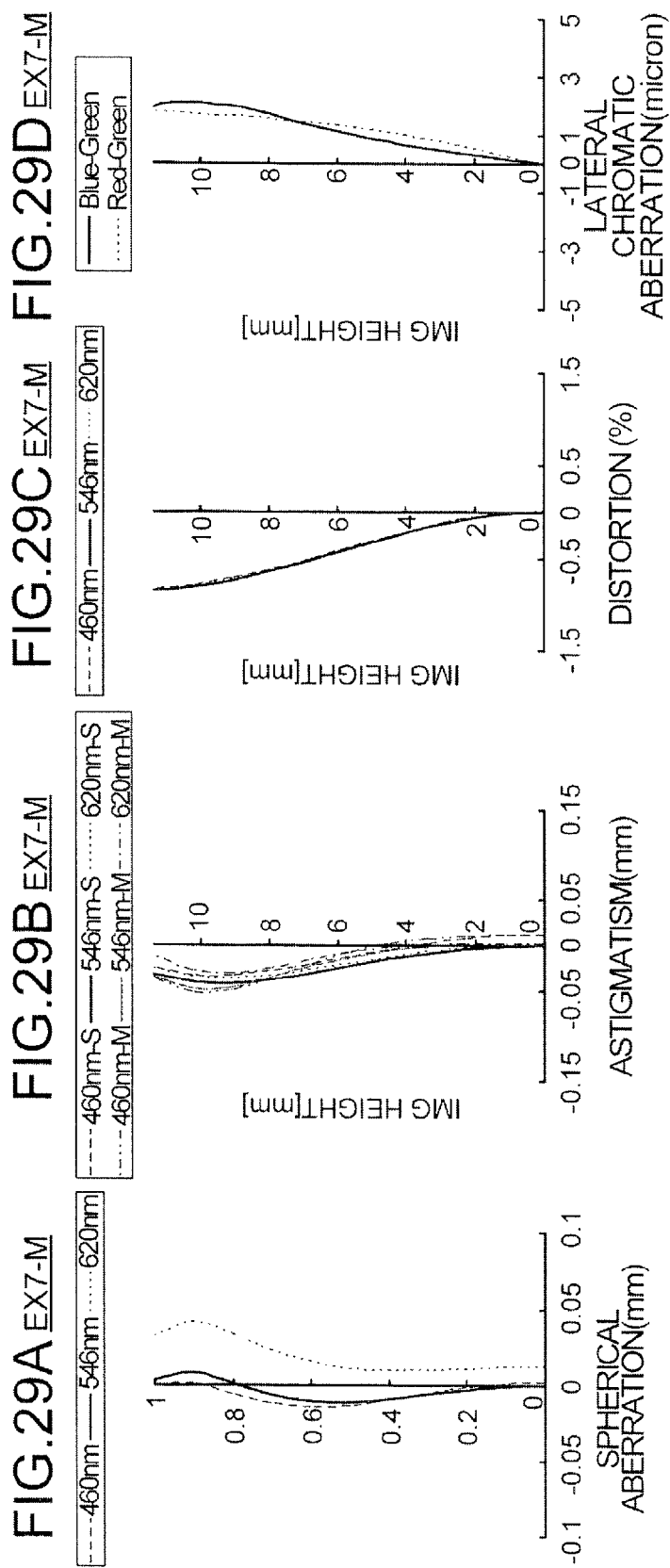

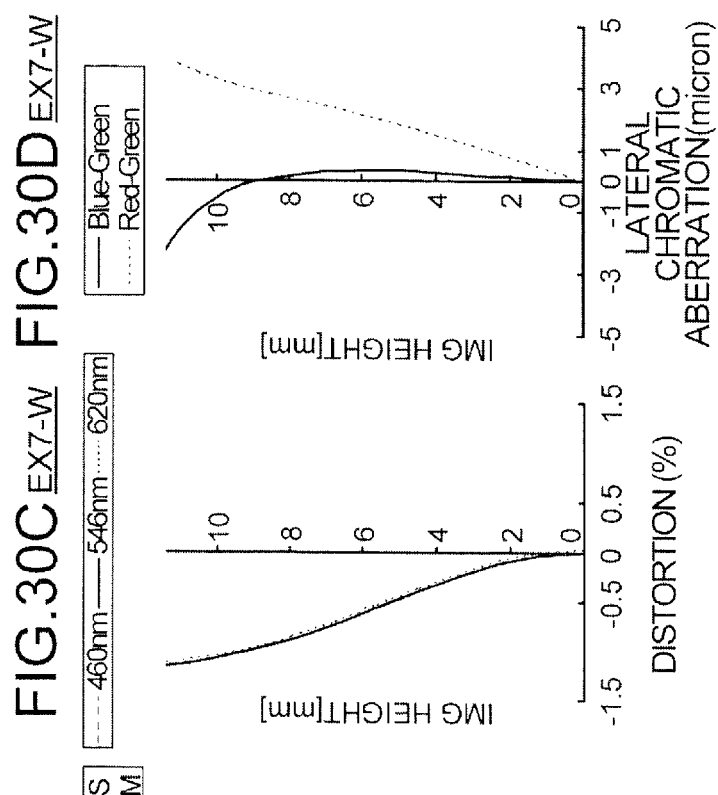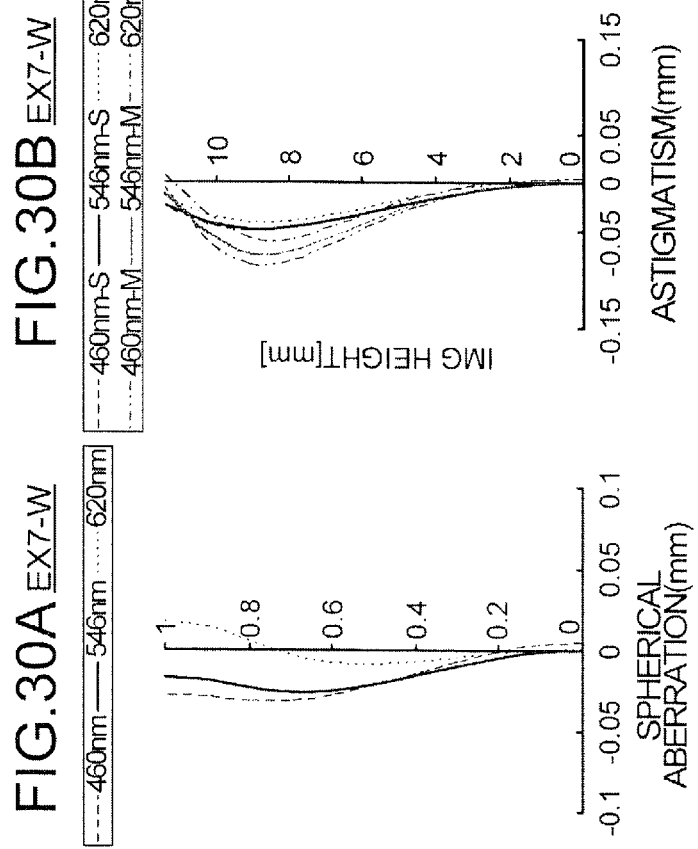

FIG.31A EX8-T  FIG.31B EX8-T  FIG.31C EX8-T  FIG.31D EX8-T

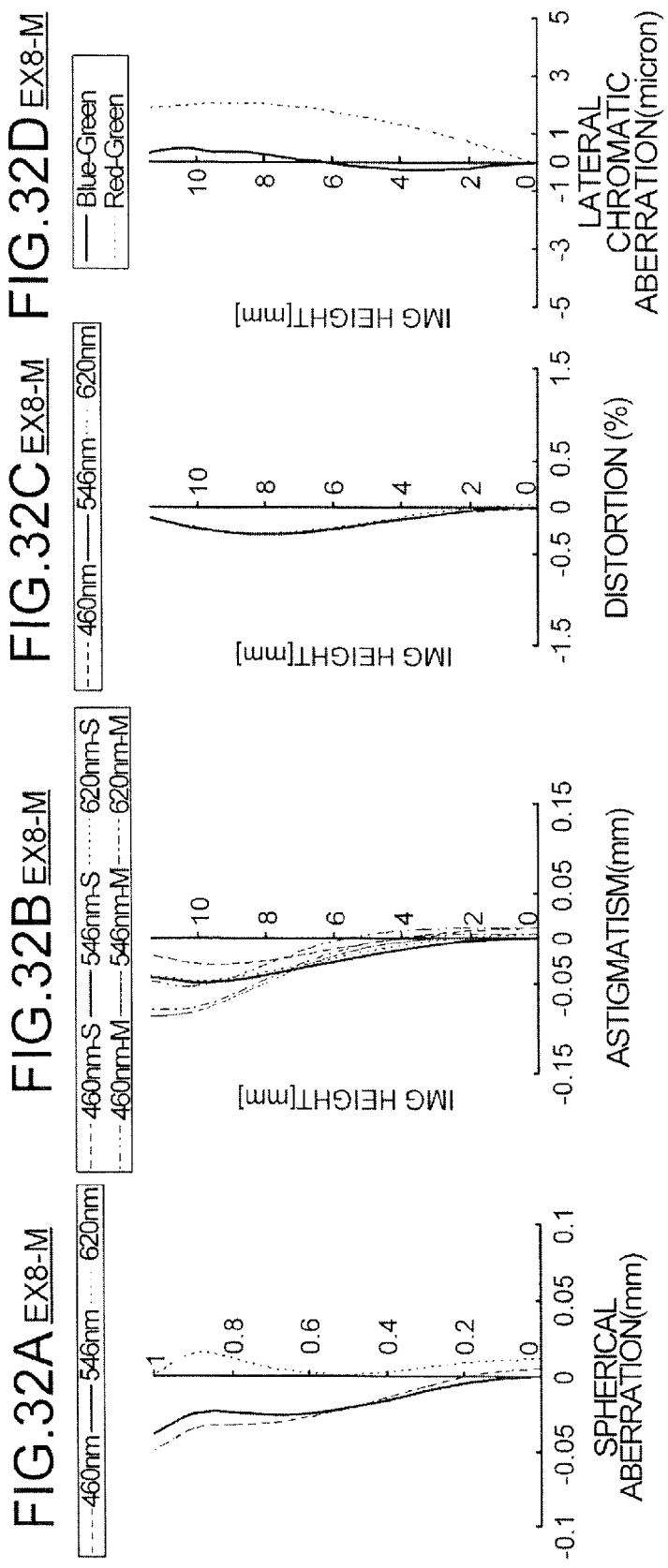

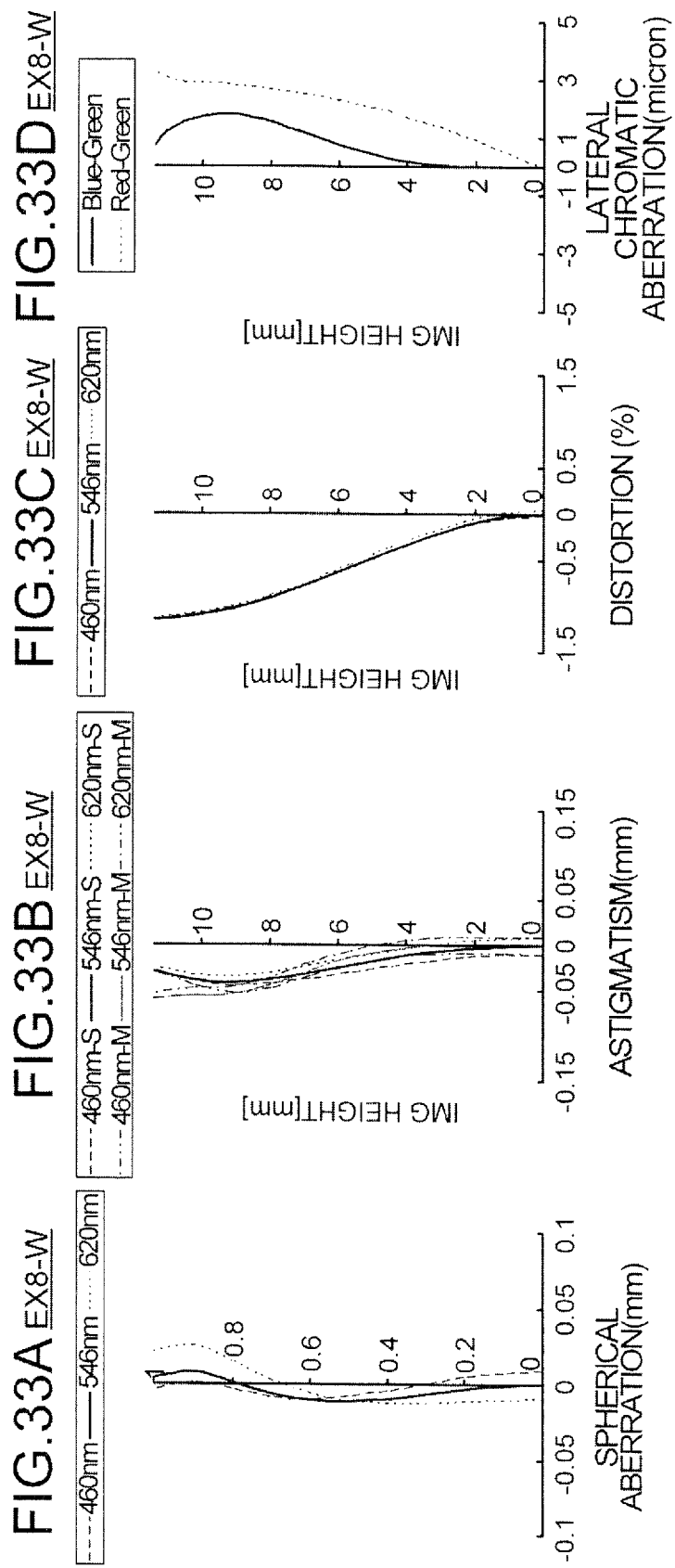

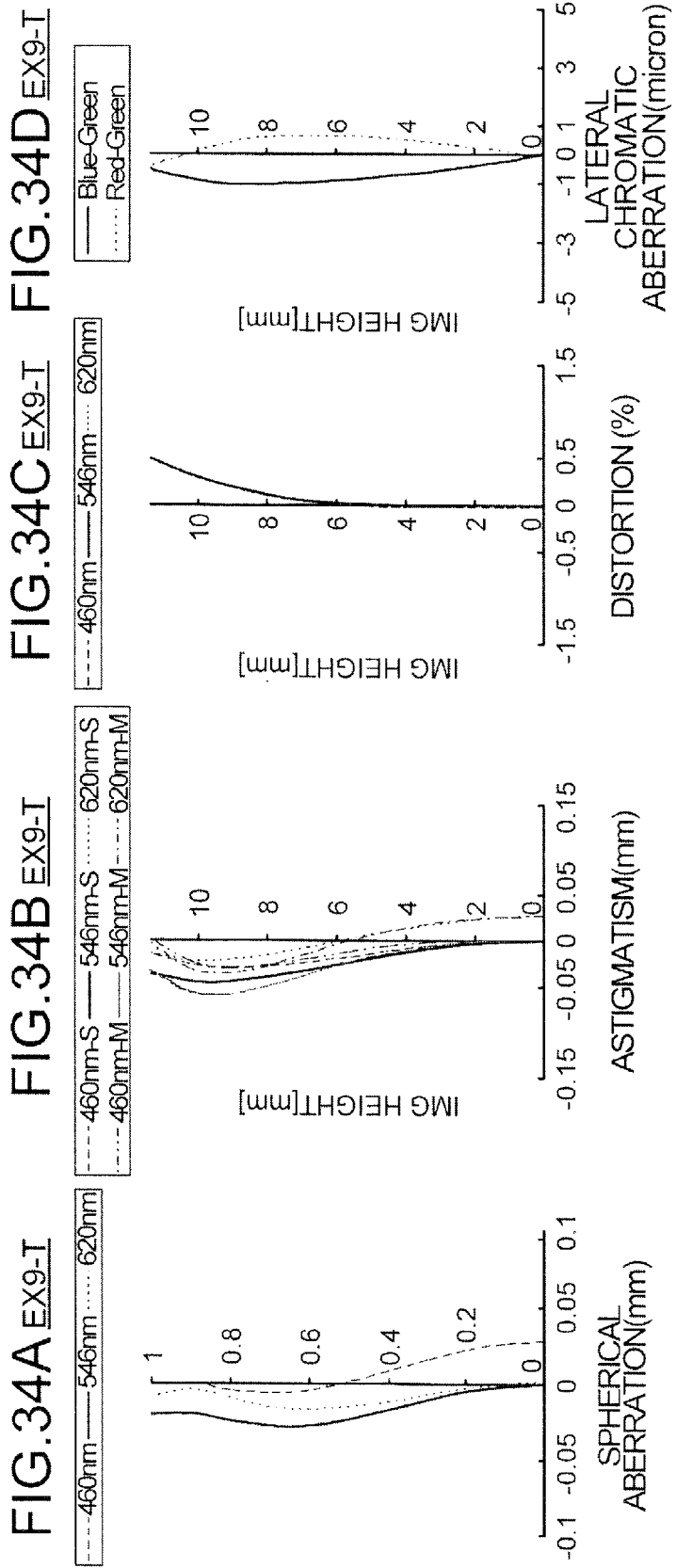

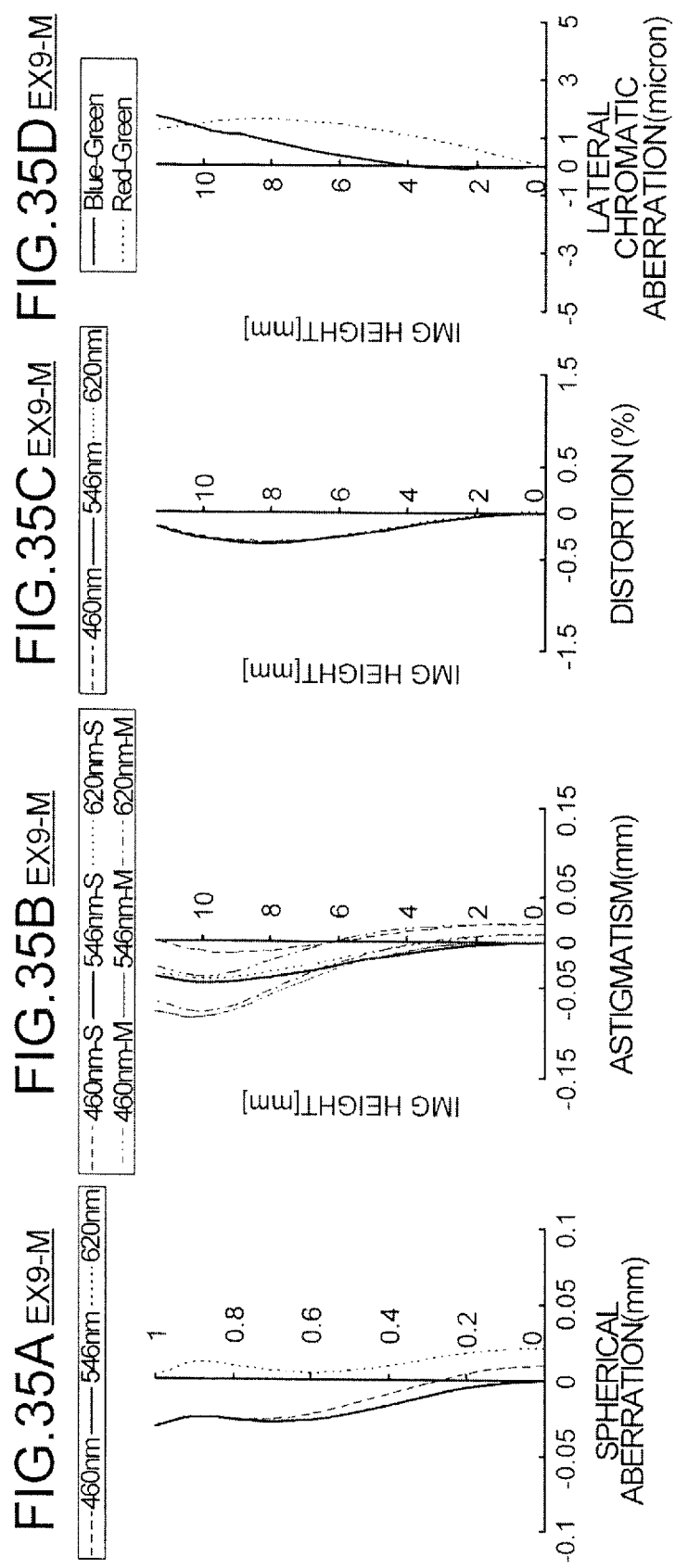

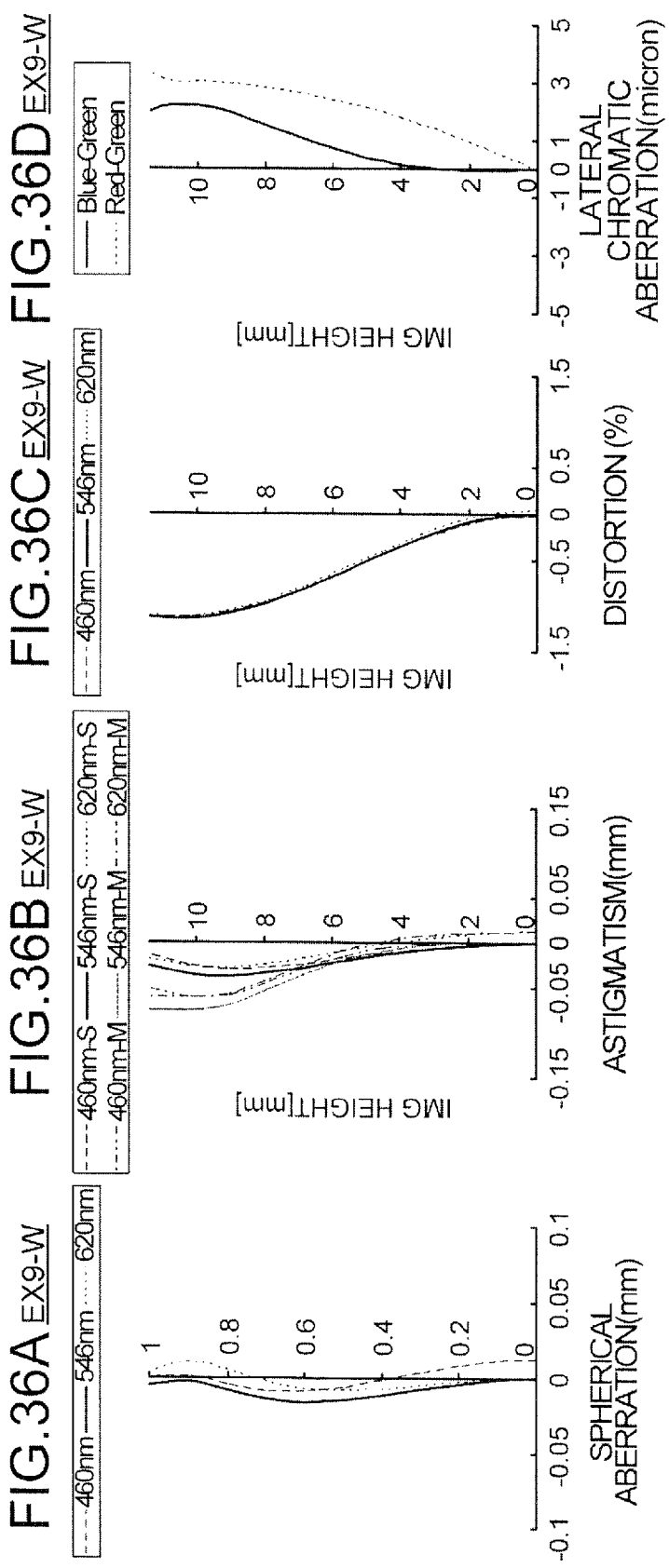

PROJECTION LENS SYSTEM HAVING MAGNIFICATION CHANGING FUNCTION AND PROJECTOR

TECHNICAL FIELD

The present invention relates to a projection lens system having a magnification changing function and a projector. More particularly, the present invention relates, for example, to a projection zoom lens system having a wide angle of view suitable for projection of an image displayed on an image display device, such as a digital micro-mirror device and an LCD (liquid crystal display), onto a screen on an enlarged scale, and to a projector provided with the projection zoom lens system.

BACKGROUND ART

Zoom lens systems suitable as a projection lens system have been proposed in Patent Literatures 1 to 3, etc. For example, Patent Literature 1 describes a zoom lens system having a six-group design with a negative-negative-positive-negative-positive-positive arrangement, where first and sixth lens groups remain stationary during zooming, an aperture stop is disposed between third and fourth lens groups, and a diffractive optical element is used to correct chromatic aberrations. Patent Literature 2 describes a zoom lens system having a six-group design with a negative-negative-positive-negative-positive-positive arrangement, where first, third, and fifth lens groups remain stationary during zooming. This zoom lens system it is a projection lens system having a wide angle of view and advantageous in achieving compactness, which makes it suitable for use in portable data projectors. Patent Literature 3 describes a zoom lens system having a six-group design with a negative-positive-positive-negative-(positive or negative)-positive arrangement, where movable lens groups movable during zooming and the refractive power arrangement of each lens group are appropriately set. This is a compact zoom lens having a long backfocus, where various aberrations are satisfactorily corrected.

CITATION LIST

Patent Literature

Patent Literature 1: JP-A-2002-182110
Patent Literature 2: JP-A-2011-69959
Patent Literature 3: JP-A-2002-350727

SUMMARY OF INVENTION

Technical Problem

Unfortunately, however, it is difficult to obtain sufficient optical performance with the conventional zoom constructions proposed in Patent Literatures 1 to 3. For example, Patent Literature 1 describes a zoom lens system in which lateral chromatic aberration is satisfactorily corrected by using a diffractive optical element. However, since diffractive optical elements themselves are high in cost, it is difficult to obtain a high optical performance without increasing the cost of the objection lens system. With the zoom lens system described in Patent Literature 2, during zooming from a wide-angle side to a telephoto side, an F-number which is about 2.4 at a wide-angle end varies up to 3.6 at a telephoto end at the maximum, and thus it is impossible to obtain sufficient brightness. In addition, distortion at the largest angle of view is as large as 2.5%, and thus the zoom lens system of Patent Literature 2 is not suitable as a projection lens system for use in cinemas.

Further, in the zoom lens systems described in Patent Literatures 1 and 2, lens elements included in lens groups disposed closer to an enlargement conjugate side than an aperture stop and liable to be large in size are often formed of highly refractive lens materials. Use of such highly refractive lens materials for front lens elements is effective for compactness, but such lens materials are low in transmissivity, and thus are not suitable for projection lens systems for use in cinemas, where high brightness is required of projection lens systems. In addition, since many of such lens materials are expensive, even if a compact projection lens system is achieved using such lens materials, the resulting compact projection lens system will be high in cost.

As described in Patent Literature 3, the arrangement used in a wide-angle projection lens system having a comparatively short focal length is led by a negative lens group, as in a negative-positive-positive-negative-positive-positive arrangement and a negative-positive-positive-negative-negative-positive arrangement. Unfortunately, however, to achieve a wide-angle projection lens system with the design described in Patent Literature 3 while securing a long backfocus, it is necessary to give a large negative refractive power to the first lens group disposed on the most enlargement-conjugate side, that is, disposed closest to the enlargement conjugate side. Thus, for satisfactory correction of various aberrations such as lateral chromatic aberration and curvature of field, it is necessary to make the diameter of the first lens group disposed on the most enlargement-conjugate side, and this consequently increases the size of the projection lens system.

The present invention has been made against this background, and an object thereof is to provide a compact wide-angle projection lens system having a magnification changing function that is capable of coping with high-resolution image display devices and has satisfactory aberration correcting performance, and a projector provided therewith.

Solution to Problem

To achieve the above object, according to a first aspect of the present invention, a projection lens system includes, in order from an enlargement conjugate side, a first lens group having a negative refractive power, a second lens group having a negative refractive power, a third lens group having a positive refractive power, a fourth lens group having a negative refractive power, a fifth lens group, and a sixth lens group having a positive refractive power, the projection lens system achieving zooming by varying distances between lens groups. Here, at least the second lens group, the third lens group, and the fifth lens group each move during zooming, the third lens group moves from the enlargement conjugate side to a reduction conjugate side during zooming from a telephoto end to a wide-angle end, an aperture stop is disposed between a most reduction-conjugate-side surface of the third lens group and a most enlargement-conjugate-side surface of the fifth lens group, and the projection lens system is substantially telecentric on the reduction conjugate side.

According to a second aspect of the present invention, in the projection lens system according to the first aspect described above, the fifth lens group has a positive refractive power.

According to a third aspect of the present invention, in the projection lens system according to the second aspect described above, the first lens group remains stationary except during focusing.

According to a fourth aspect of the present invention, in the projection lens system according to the second aspect described above, the first lens group remains stationary except during focusing, and in addition to the second lens group, the third lens group, and the fifth lens group, the fourth lens group moves during zooming from the telephoto end to the wide-angle end.

According to a fifth aspect of the present invention, in the projection lens system according to any one of the second to fourth aspects described above, the fourth lens group includes, in order from the enlargement conjugate side, two or more negative lens elements and a positive lens element.

According to a sixth aspect of the present invention, in the projection lens system according to any one of the second to fifth aspects described above, a most enlargement-conjugate-side lens element in the first lens group has a negative refractive power.

According to a seventh aspect of the present invention, in the projection lens system according to any one of the second to sixth aspects described above, conditional formula (1) below is fulfilled:

$$1.57 < np < 1.65 \quad (1)$$

where np represents an average value of refractive indices for a d-line of lens elements constituting the first lens group, the second lens group, and the third lens group.

According to an eighth aspect of the present invention, in the projection lens system according to any one of the second to seventh aspects described above, conditional formula (2) below is fulfilled:

$$0.33 < |\phi 1/\phi w| < 0.50 \quad (2)$$

where $\phi 1$ represents a refractive power of the first lens group, and $\phi w$ represents a refractive power of the entire projection lens system at the wide-angle end.

According to a ninth aspect of the present invention, in the projection lens system according to any one of the second to eighth aspects described above, at least one lens element having a negative refractive power included in the fourth lens group fulfills conditional formulae (3) and (4) below:

$$0.645 < \theta g\_F + 0.001682 \times \upsilon d < 0.695 \quad (3)$$

$$60 < \upsilon d < 100 \quad (4)$$

where $\theta g\_F$ represents a partial dispersion ratio of a material of a lens element, $$\theta g\_F = (Ng - NF)/(NF - NC)$$

Ng represents a refractive index for a g-line,
NF represents a refractive index for an F-line,
NC represents a refractive index for a C-line, and
$\upsilon d$ represents an Abbe number of the material of the lens element.

According to a tenth aspect of the present invention, in the projection lens system according to any one of the second to ninth aspects described above, the first lens group includes at least one lens element having a positive refractive power, and conditional formula (5) below is fulfilled:

$$0.33 < |\phi 1p/\phi 1| < 0.59 \quad (5)$$

where $\phi 1p$ represents an average refractive power of a lens element having a positive refractive power included in the first lens group, and $\phi 1$ represents a refractive power of the first lens group.

According to an eleventh aspect of the present invention, in the projection lens system according to any one of the second to tenth aspects described above, conditional formula (6) below is fulfilled:

$$0.053 < \phi x \times |\Delta 5| < 0.105 \quad (6)$$

where $\phi x$ represents a composite refractive power, at the telephoto end, of from a lens group disposed to the reduction conjugate side of the aperture stop through the fifth lens group, and $\Delta 5$ represents a movement amount of the fifth lens group during zooming from the telephoto end to the wide-angle end.

According to a twelfth aspect of the present invention, in the projection lens system according to the first aspect described above, the fifth lens group has a negative refractive power or is afocal.

According to a thirteenth aspect of the present invention, in the projection lens system according to the twelfth aspect described above, the first lens group remains stationary except during focusing.

According to a fourteenth aspect of the present invention, in the projection lens system according to the twelfth aspect described above, the first lens group remains stationary except during focusing, and in addition to the second lens group, the third lens group, and the fifth lens group, the fourth lens group moves during zooming from the telephoto end to the wide-angle end.

According to a fifteenth aspect of the present invention, in the projection lens system according to any one of the twelfth to fourteenth aspects described above, a most enlargement-conjugate-side lens element in the first lens group has a negative refractive power.

According to a sixteenth aspect of the present invention, in the projection lens system according to any one of the twelfth to fifteenth aspects described above, conditional formula (1) below is fulfilled:

$$1.57 < np < 1.65 \quad (1)$$

where np represents an average value of refractive indices for the d-line of lens elements constituting the first lens group, the second lens group, and the third lens groups.

According to a seventeenth aspect of the present invention, in the projection lens system according to any one of the twelfth to sixteenth aspects described above, conditional formula (2) below is fulfilled:

$$0.33 < |\phi 1/\phi w| < 0.50 \quad (2)$$

where $\phi 1$ represents a refractive power of the first lens group, and $\phi w$ represents a refractive power of the entire projection lens system at the wide-angle end.

According to an eighteenth aspect of the present invention, in the projection lens system according to any one of the twelfth to seventeenth aspects described above, the fourth lens group includes, in order from the enlargement conjugate side, one or more negative lens elements and a positive lens element, and at least one lens element having a negative refractive power included in the fourth lens group fulfills conditional formulae (3) and (4) below:

$$0.645 < \theta g\_F + 0.001682 \times vd < 0.695 \quad (3)$$

$$60 < vd < 100 \quad (4)$$

where

θg_F represents a partial dispersion ratio of a material of a lens element, $$\theta g\_F = (Ng - NF)/(NF - NC)$$

Ng represents a refractive index for the g-line,
NF represents a refractive index for the F-line,
NC represents a refractive index for the C-line, and
vd represents an Abbe number of the material of the lens element.

According to a nineteenth aspect of the present invention, a projector includes an image display device that displays an image, a light source, an illumination optical system that directs light from the light source to the image display device, and the projection lens system according to any one of the first to eighteenth aspects of the present invention which projects the image displayed on the image display device onto a screen surface on an enlarged scale.

Advantageous Effects of Invention

According to the present invention, since settings for the movement of the third lens group during zooming, the position of the aperture stop, etc. are appropriate, it is possible to cope with high-resolution image display devices, to obtain satisfactory aberration performance, and to achieve a wider angle of view and further compactness.

BRIEF DESCRIPTION OF THE DRAWINGS

FIGS. 10A to 10D are aberration diagrams of Example 1 at a telephoto end;
FIGS. 11A to 11D are aberration diagrams of Example 1 at a middle position;
FIGS. 12A to 12D are aberration diagrams of Example 1 at a wide-angle end;
FIGS. 13A to 13D are aberration diagrams of Example 2 at the telephoto end;
FIGS. 14A to 14D are aberration diagrams of Example 2 at the middle position;
FIGS. 15A to 15D are aberration diagrams of Example 2 at the wide-angle end;
FIGS. 16A to 16D are aberration diagrams of Example 3 at the telephoto end;
FIGS. 17A to 17D are aberration diagrams of Example 3 at the middle position;
FIGS. 18A to 18D are aberration diagrams of Example 3 at the wide-angle end;
FIGS. 19A to 19D are aberration diagrams of Example 4 at the telephoto end;
FIGS. 20A to 20D are aberration diagrams of Example 4 at the middle position;
FIGS. 21A to 21D are aberration diagrams of Example 4 at the wide-angle end;
FIGS. 22A to 22D are aberration diagrams of Example 5 at the telephoto end;
FIGS. 23A to 23D are aberration diagrams of Example 5 at the middle position;
FIGS. 24A to 24D are aberration diagrams of Example 5 at the wide-angle end;
FIGS. 25A to 25D are aberration diagrams of Example 6 at the telephoto end;
FIGS. 26A to 26D are aberration diagrams of Example 6 at the middle position;
FIGS. 27A to 27D are aberration diagrams of Example 6 at the wide-angle end;
FIGS. 28A to 28D are aberration diagrams of Example 7 at the telephoto end;
FIGS. 29A to 29D are aberration diagrams of Example 7 at the middle position;
FIGS. 30A to 30D are aberration diagrams of Example 7 at the wide-angle end;
FIGS. 31A to 31D are aberration diagrams of Example 8 at the telephoto end;
FIGS. 32A to 32D are aberration diagrams of Example 8 at the middle position;
FIGS. 33A to 33D are aberration diagrams of Example 8 at the wide-angle end;
FIGS. 34A to 34D are aberration diagrams of Example 9 at the telephoto end;
FIGS. 35A to 35D are aberration diagrams of Example 9 at the middle position;
FIGS. 36A to 36D are aberration diagrams of Example 9 at the wide-angle end.

DESCRIPTION OF EMBODIMENTS

Figure 1:
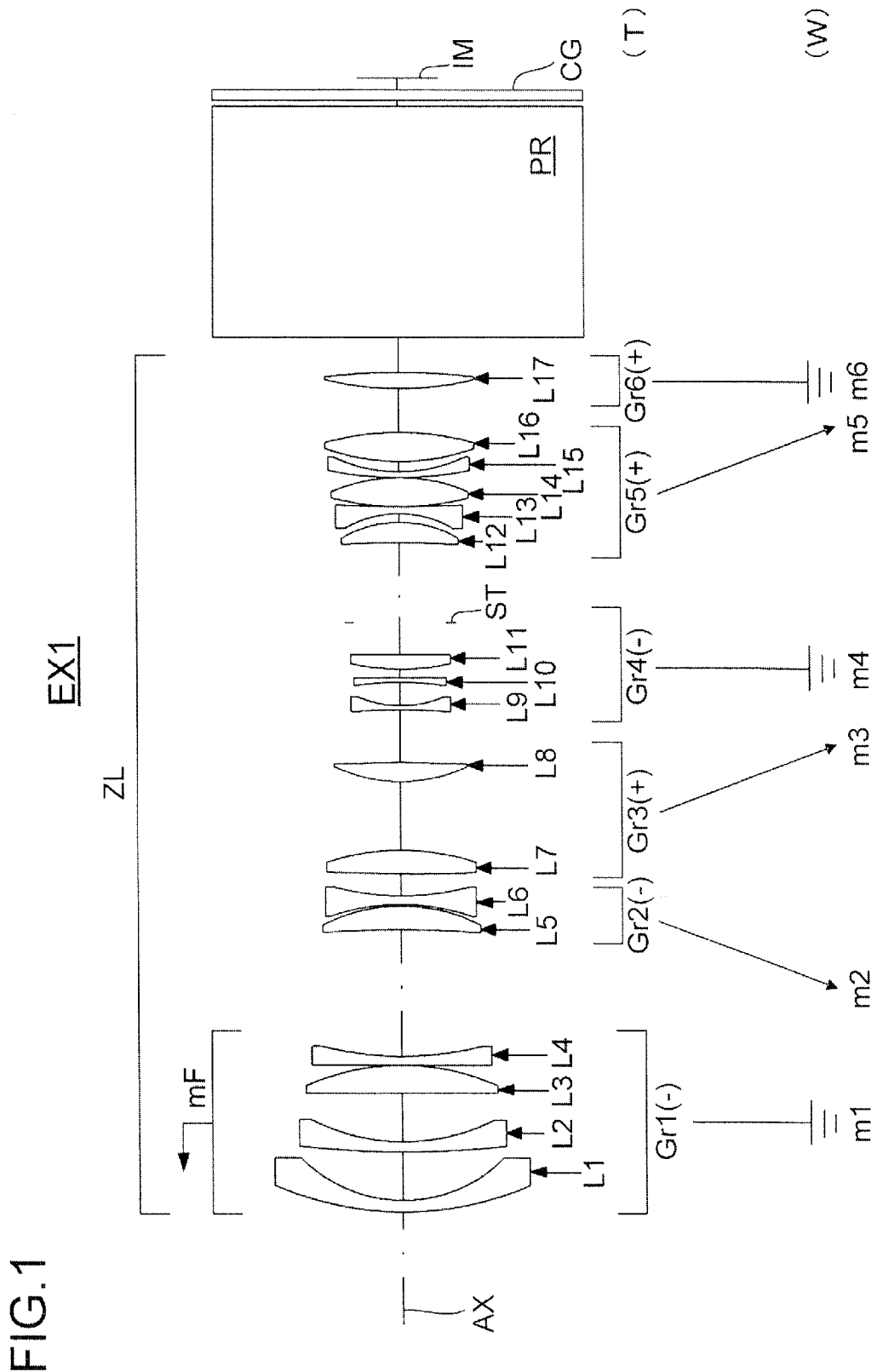
FIG. 1 is a lens construction diagram of a first embodiment (Example 1)
Figure 2:
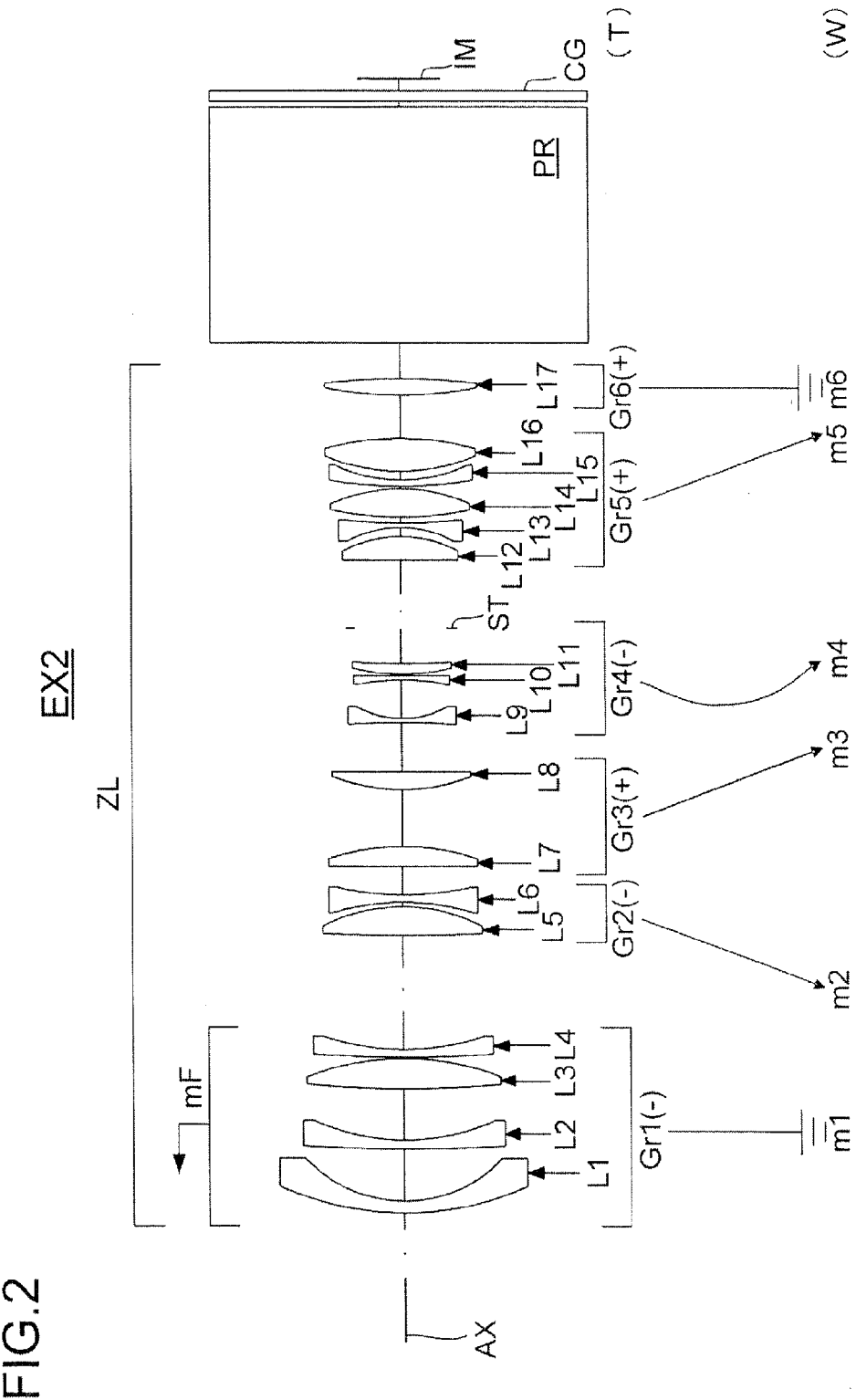
FIG. 2 is a lens construction diagram of a second embodiment (Example 2)
Figure 3:
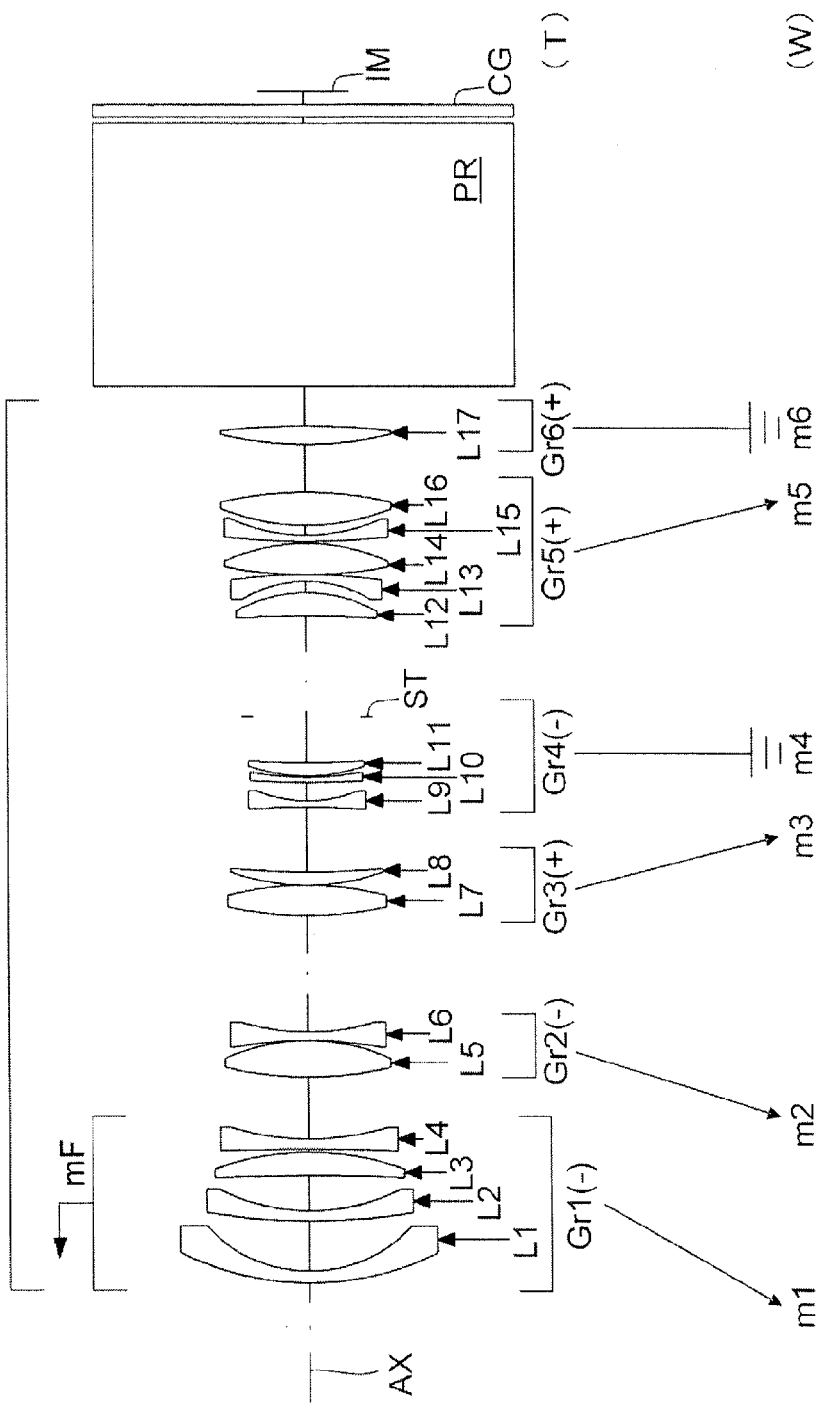
FIG. 3 is a lens construction diagram of a third embodiment (Example 3)
Figure 4:
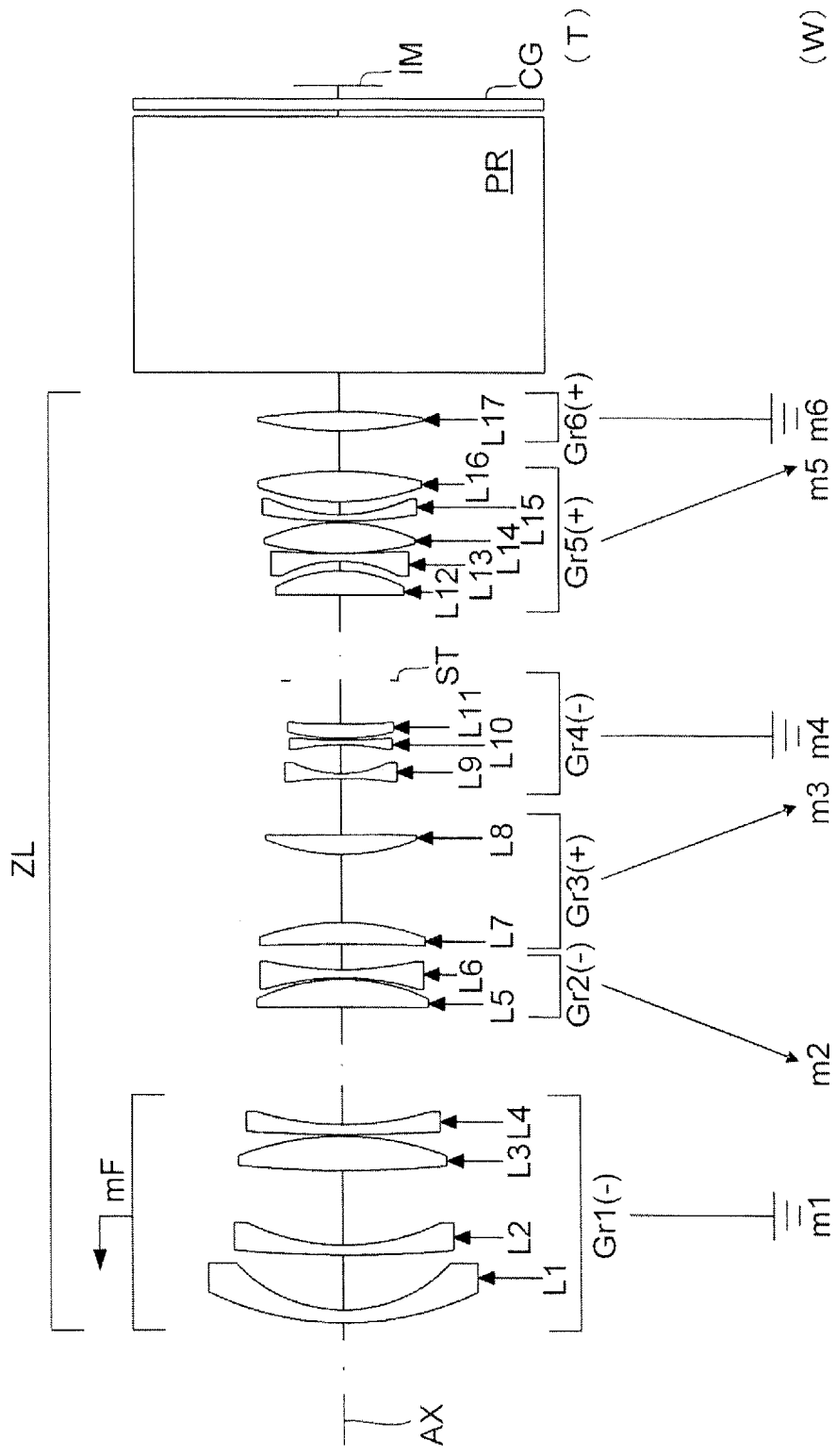
FIG. 4 is a lens construction diagram of a fourth embodiment (Example 4)
Figure 5:
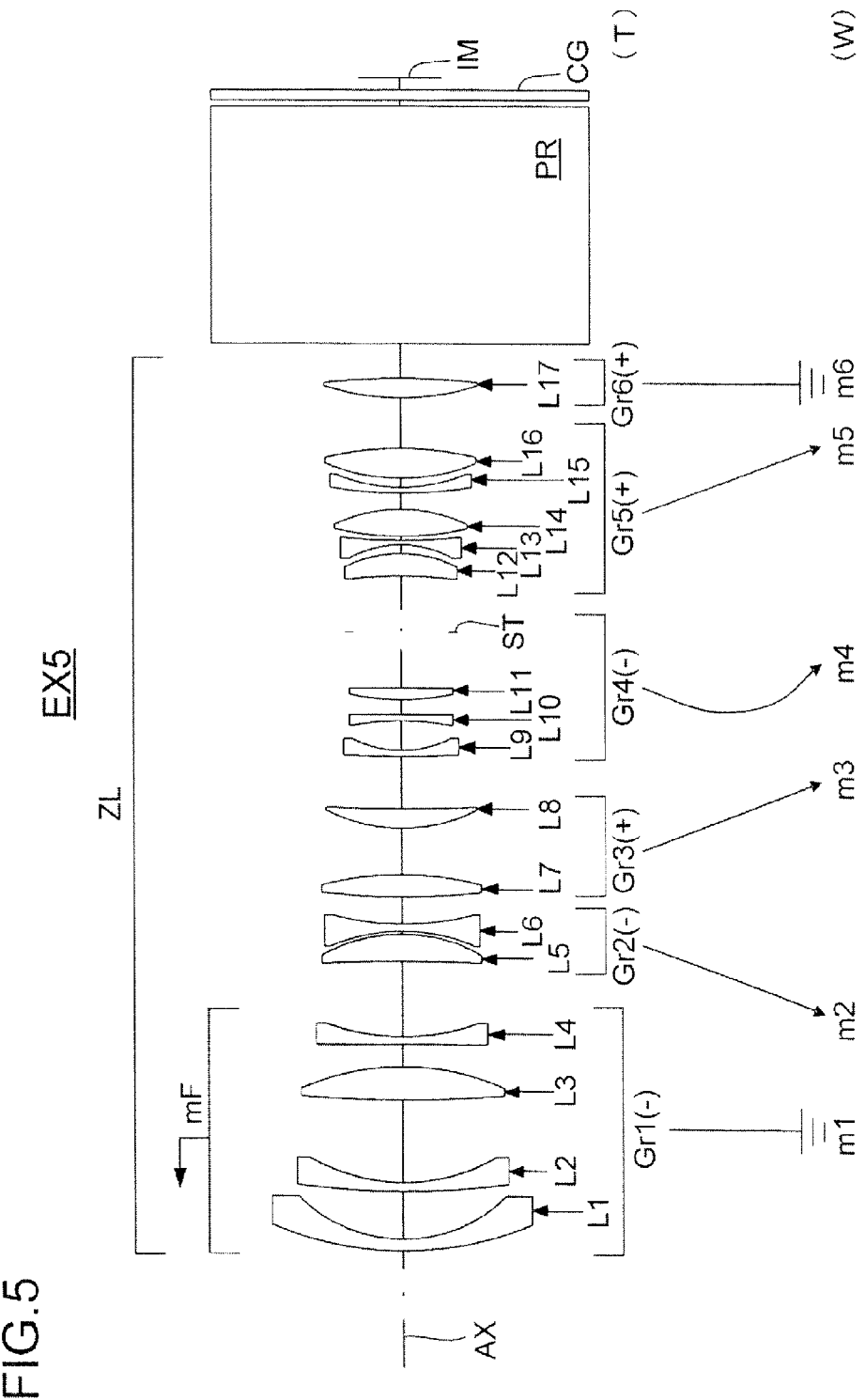
FIG. 5 is a lens construction diagram of a fifth embodiment (Example 5)
Figure 6:
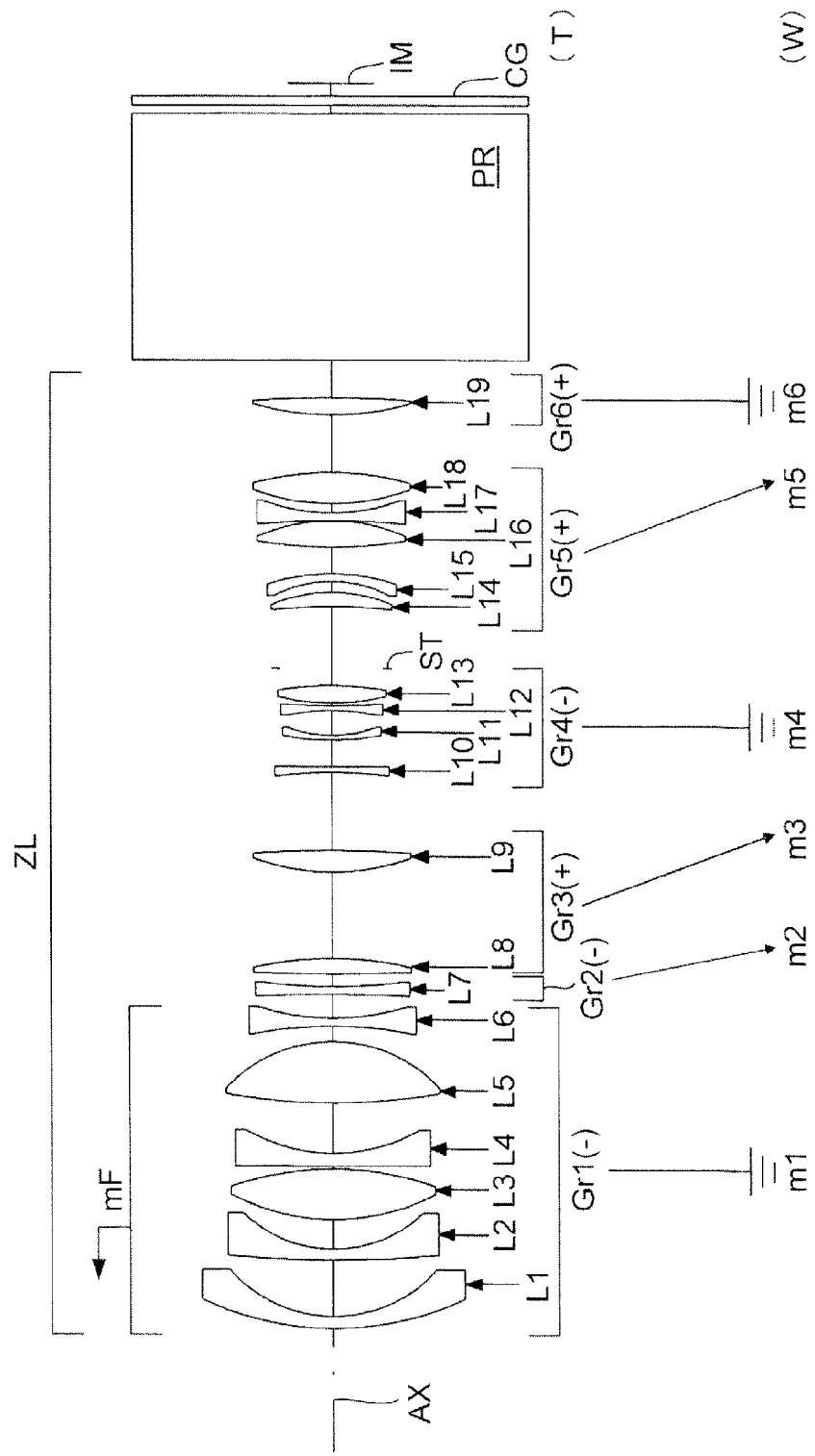
FIG. 6 is a lens construction diagram of a sixth embodiment (Example 6)
Figure 7:
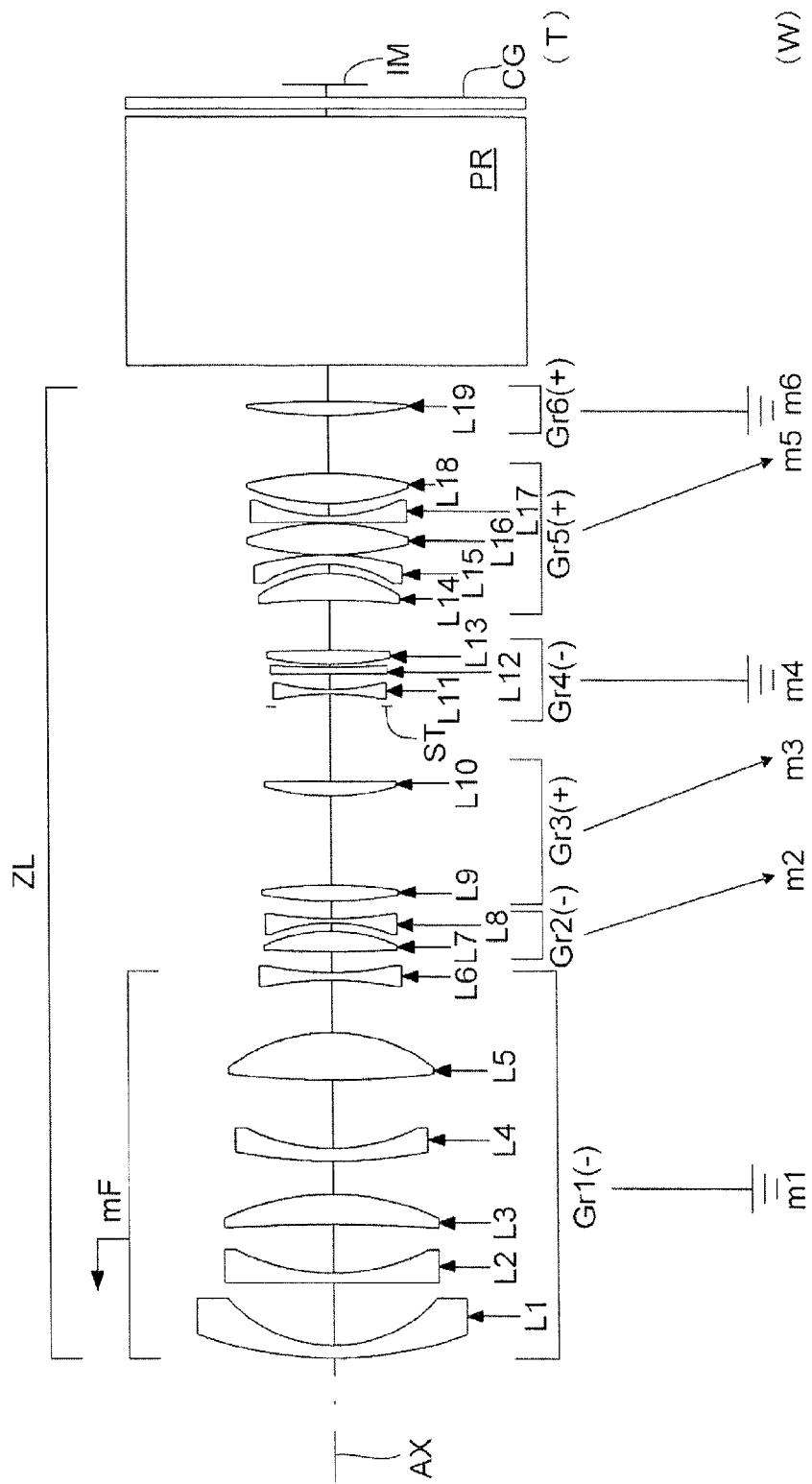
FIG. 7 is a lens construction diagram of a seventh embodiment (Example 7)
Figure 8:
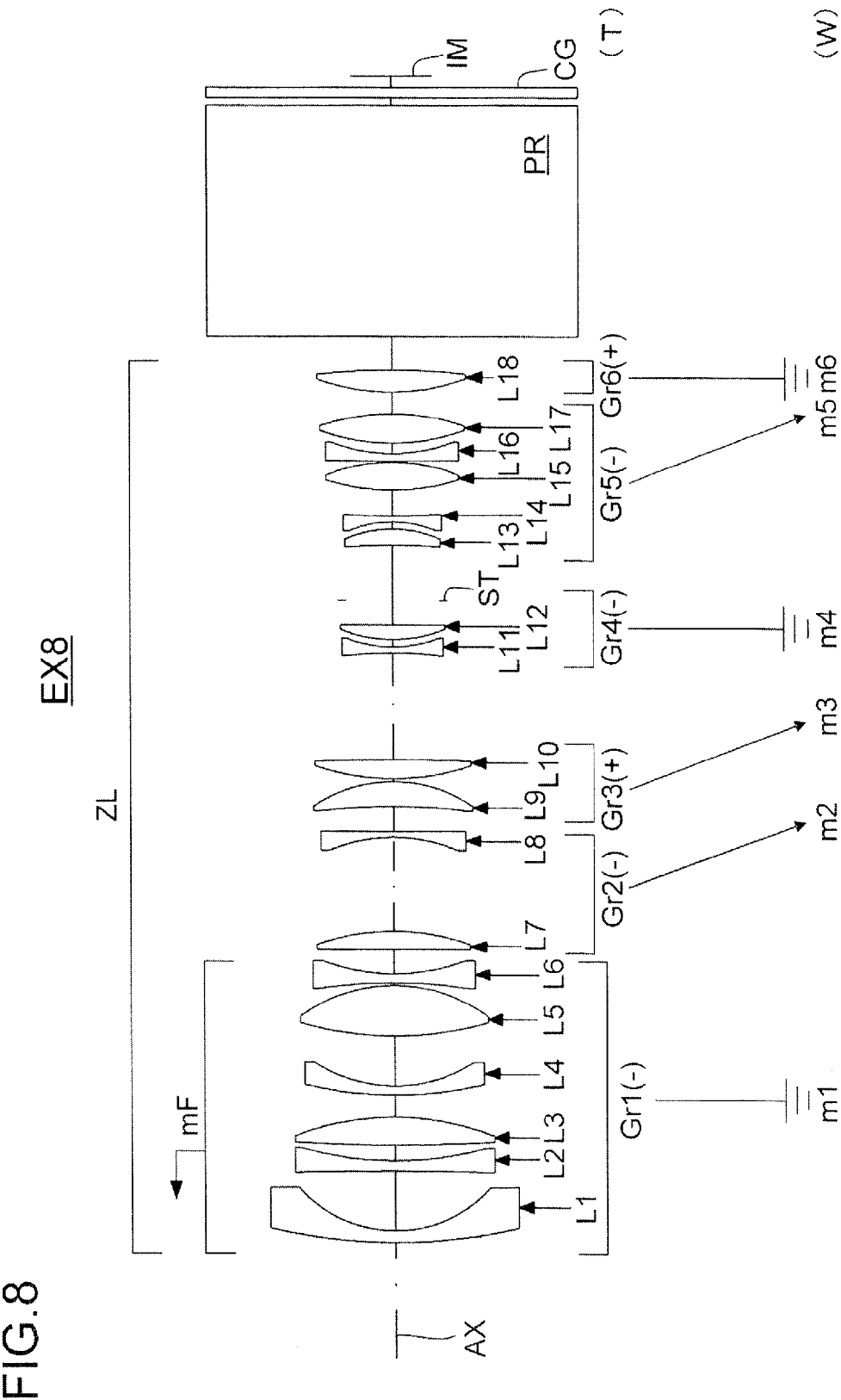
FIG. 8 is a lens construction diagram of a eighth embodiment (Example 8)
Figure 9:
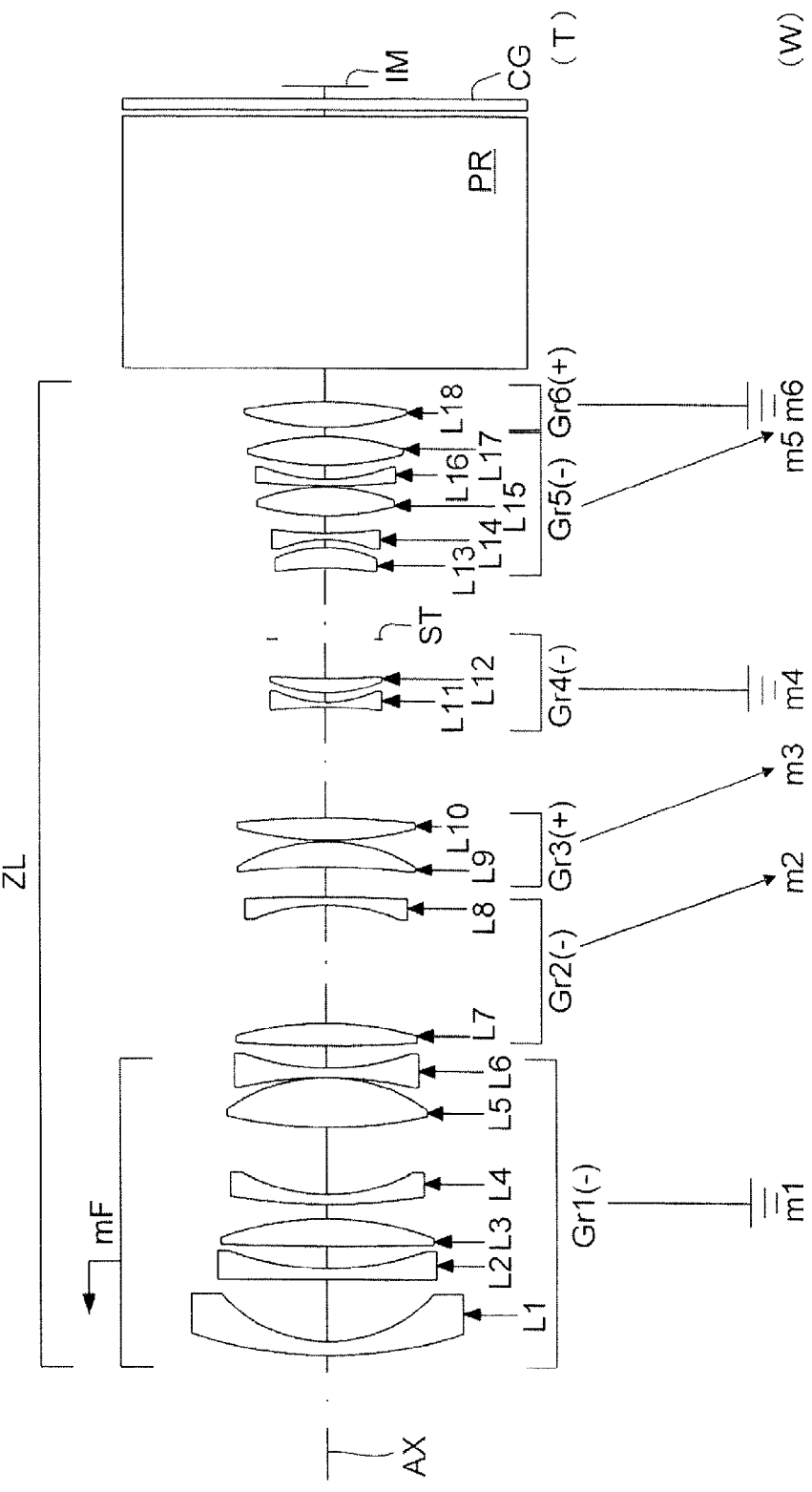
FIG. 9 is a lens construction diagram of a ninth embodiment (Example 9)

Hereinafter, a projection lens system, a projector, etc. according to the present invention will be described. A projection lens system according to the present invention is a projection lens system that includes, in order from the enlargement conjugate side, a first lens group having a negative refractive power, a second lens group having a negative refractive power, a third lens group having a positive refractive power, a fourth lens group having a negative refractive power, a fifth lens group, and a sixth lens group having a positive refractive power, and the projection lens system has a magnification changing function for achieving zooming (magnification change) by varying distances between the lens groups. Here, two types of zooming constructions are adopted which are different from each other in view of refractive power arrangement; that is, type A in which the fifth lens group has a positive refractive power, and type B in which the fifth lens group has a refractive power other than the refractive power that the fifth lens group has in type A. Thus, a variable magnification optical system having a six-group design with a negative-negative-positive-negative-positive-positive arrangement is a projection lens system of type A, while a variable magnification optical system having a six-group design with a negative-negative-positive-negative-negative-positive arrangement is a projection lens system of type B. Projection lens systems of type B include a case where the refractive power of the fifth lens group is neither positive nor negative, in addition to a case where the refractive power of the fifth lens group is negative. Specifically, for example, there are included a case where the fifth lens group is an afocal system, and a case where the fifth lens group has an optical effect such that even though the refractive power of the fifth lens group is zero with respect to on-axis light, the refractive power of the fifth lens group is not zero with respect to off-axis light.

Examples of variable magnification optical systems constituting the projection lens systems of type A and type B include lens systems having a variable focal length, such as zoom lens systems and varifocal lens systems. The terms "enlargement conjugate side" and "reduction conjugate side" used herein describe directions regarding the variable magnification optical system. The "enlargement conjugate side" is a direction in which an optical image is projected onto a screen or the like on an enlarged scale, a direction opposite to the "enlargement conjugate side" is the "reduction conjugate side", that is, a direction in which the image display device (such as a digital micro-mirror device) for displaying an original optical image is disposed.

The projection lens systems of types A and B according to the present invention are characterized in that they are configured such that at least the second, third, and fifth lens groups each move during zooming and such that the third lens group moves from the enlargement conjugate side to the reduction conjugate side during zooming from the telephoto end to the wide-angle end, and further, the projection lens systems are also characterized in that an aperture stop is disposed between the most reduction-conjugate-side surface of the third lens group and the most enlargement-conjugate-side surface of the fifth lens group, and that the projection lens systems are substantially telecentric on the reduction conjugate side. The adoption of the refractive power arrangements of types A and B helps disperse the negative refractive power, which is conventionally concentrated on the first lens group, to the second lens group, and as a result, a wider angle of view can be achieved while reducing increase in size of a diameter of the first lens group. Further, the movement of the fifth lens group during zooming makes it possible to greatly change a marginal-light-ray passing position, and this in particular makes it possible to reduce variation of lateral chromatic aberration resulting from zooming. Moreover, the disposition of the aperture stop between the reduction conjugate side of the third lens group and the enlargement conjugate side of the fifth lens group makes it possible to maintain satisfactory telecenetricity of the entire optical system.

According to the distinctive constructions of the projection lens systems described above, the adoption of the constructions where settings for the movement of the third lens group during zooming, the position of the aperture stop, and the like are appropriate makes it possible to cope with high-resolution image display devices, to obtain satisfactory aberration performance, and to achieve a wider angle of view and further compactness. And the adoption of the projection lens systems in projectors contributes to achieving higher performance, higher functionality, and further compactness of projectors. Descriptions will now be given of conditions and the like for obtaining these advantages in a balanced manner, and for achieving higher optical performance, further compactness, etc.

In types A and B, it is desirable that the first lens group remain stationary except during focusing. By keeping the first lens group stationary during zooming, it is possible to reduce variation in length of the entire optical system resulting from zooming. Furthermore, the number of components that move is reduced, so that a simple zooming mechanism can be achieved.

In types A and B, it is desirable that the first lens group remain stationary except during focusing, and that the fourth lens group, in addition to the second, third, and fifth lens groups, moves during zooming from the telephoto end to the wide-angle end. The above advantages can be obtained by keeping the first lens group stationary during zooming, and the movement of the fourth lens group disposed close to the aperture stop during zooming makes it possible to correct difference in focal length between different wavelengths, and thus to reduce variation in longitudinal chromatic aberration resulting from zooming.

In type A, it is desirable that the fourth lens group include, in order from the enlargement conjugate side, two or more negative lens elements and a positive lens element. If a strong positive refractive power exists near the aperture stop, it will cause the variable magnification optical system to have spherical aberration in an under direction, which results in degraded resolution. An effective method of preventing this is to arrange lens elements having a negative refractive power in a row in the fourth lens group that is disposed close to the aperture stop, which makes it possible to firmly correct the spherical aberration to an over side, and as a result, high resolution can be obtained.

In types A and B, it is desirable that a lens element having a negative refractive power be disposed on the most enlargement conjugate side of the first lens group. By disposing a lens element having a negative refractive power in the first lens group, it is possible to achieve an effect of reducing the focal length by moving a rear principal point of the projection lens systems to the reduction conjugate side, and by disposing the lens element having a negative refractive power on the enlargement conjugate side, it is possible to obtain constructions advantageous to achieve a wider angle of view.

In types A and B, it is desirable that conditional formula (1) below be fulfilled:

$$1.57 < np < 1.65 \tag{1}$$

where np represents an average value of refractive indices for the d-line of lens elements constituting the first, second, and third lens groups.

Highly refractive lens materials are generally low in transmissivity, and in particular, the first lens group tends to have a comparatively large diameter and a comparatively large central thickness. Thus, if the lens elements constituting the first lens group are made of a lens material having such strong refractive power that an upper limit of conditional formula (1) is exceeded, that is, above the upper limit, the transmissivity of the entire optical system is degraded, which makes the optical system unsuitable as a projection lens system of which high brightness is required. Furthermore, such a lens material is expensive, and thus, if such a high-refractive lens material is often used in the first lens group, it will result in high cost. On the other hand, if a lower limit of conditional formula (1) is not reached, that is, below the lower limit, it is impossible to obtain a satisfactory effect of correcting aberrations (such as curvature of field) in each lens group, which results in lower resolution.

In types A and B, it is desirable that conditional formula (2) below is fulfilled:

$$0.33<|\phi1/\phi w|<0.50 \tag{2}$$

where $\phi1$ represents a refractive power of the first lens group, and $\phi w$ represents a refractive power of the entire projection lens system at the wide-angle end.

If an upper limit of conditional formula (2) is exceeded, the negative refractive power of the first lens group becomes too strong, and this makes it difficult to correct curvature of field generated in an over direction. On the other hand, if a lower limit of conditional formula (2) is not reached, the negative refractive power of the first lens group becomes too weak. This makes it difficult to achieve a short focal length in the entire optical system, and results in a construction that is disadvantageous in achieving a wider angle of view. In addition, it becomes difficult to concurrently correct both curvature of field and distortion.

In type A, it is desirable that at least one of the lens elements having a negative refractive power included in the fourth lens group fulfill conditional formulae (3) and (4) below; in type B, it is desirable that the fourth lens group include, in order from the enlargement conjugate side, one or more negative lens elements and a positive lens element, and that at least one of the lens elements having a negative refractive power included in the fourth lens group fulfill conditional formulae (3) and (4) below:

$$0.645<\theta g\_F+0.001682\times vd<0.695 \tag{3}$$

$$60<vd<100 \tag{4}$$

where $\theta g\_F$ represents a partial dispersion ratio of material of the lens element, $$\theta g\_F=(Ng-NF)/(NF-NC)$$

Ng represents a refractive index for the g-line.

NF represents a refractive index for the F-line,

NC represents a refractive index for the C-line, and vd represents an Abbe number of the material of the lens element.

In the fourth lens group, which is disposed close to the aperture stop, if a lens material having anomalous dispersibility defined by conditional formulae (3) and (4) is used for a lens element having a negative refractive power, a focal point of short-wavelength light moves to the over side, and thus, longitudinal chromatic aberration can be corrected. Glass in general has properties indicated as being distributed close to a line represented by $\theta g\_F=0.645+0.001682\times vd$ on a plane defined by a horizontal axis indicating Abbe number vd and a vertical axis indicating partial dispersion ratio $\theta g\_F$. Such glass as has a partial dispersion ratio $\theta g\_F$ that is above this line and an Abbe number that is greater than a lower limit of conditional formula (4) is called anomalous dispersion glass.

The lens material used for a lens element having a negative refractive power included in the four lens group preferably has large anomalous dispersibility. Specifically, it is still more preferable that conditional formula (3a) below be fulfilled. Conditional formula (3a) defines a still more preferable conditional range of the condition range defined by conditional formula (3) presented above:

$$0.675<\theta g\_F+0.001682\times vd<0.695 \tag{3a}$$

Such lens elements as exceed upper limits of conditional formulae (3) and (4) are difficult to produce from ordinary quartz glass, and it is necessary to use fluorite glass, for example. Unfortunately, however, since fluorite glass is vulnerable to temperature variation, and thus, it is not suitable for use near the aperture stop where light has a small beam diameter. Furthermore, since fluorite glass has low workability and is very expensive, its use in a large optical system such as a projection lens system increases the cost and thus is not suitable.

In type A, it is desirable that the first lens group include at least one lens element having a positive refractive power, and that conditional formula (5) be fulfilled:

$$0.33<|\phi1p/\phi1|<0.59 \tag{5}$$

where $\phi1p$ represents an average refractive power of a lens element having a positive refractive power included in the first lens group, and $\phi1$ represents a refractive power of the first lens group.

If a lower limit of conditional formula (5) is not reached, it makes it difficult to correct distortion in the under direction due to a negative lens element included in the first lens group by using the at least one positive lens element. On the other hand, if an upper limit of conditional formula (5) is exceeded, the at least one positive lens element in the first lens group has a large curvature and high decentering sensitivity even with preferably designed performance, and this may cause a production error to affect a projected image.

In type A, it is desirable that conditional formula (6) below be fulfilled:

$$0.053<|\phi x\times\Delta5|<\mathbf{0.105} \tag{6}$$

where $\phi x$ represents a composite refractive power, at the telephoto end, of from a lens group disposed to the reduction conjugate side of the aperture stop through the fifth lens group, $\Delta5$ represents a movement amount of the fifth lens group during zooming from the telephoto end to the wide-angle end.

If an upper limit of conditional formula (6) is exceeded, F number of the variable magnification optical system changes greatly during zooming, and the F number becomes large particularly at the telephoto end, making it impossible to obtain satisfactory brightness which is required of a projection lens system. On the other hand, if a lower limit of conditional formula (6) is not reached, it becomes impossible to obtain a satisfactory effect of correcting chromatic aberration (for example, lateral chromatic aberration) on the enlargement conjugate side of the aperture stop. Here, for example, the composite refractive power $\phi x$ in conditional formula (6) is composite refractive power of the fourth and fifth lens groups at the telephoto end if the aperture stop is disposed on the most reduction conjugate side of the third lens group, and the composite refractive power $\phi x$ in conditional formula (6) is composite refractive power of the fifth lens group alone at the telephoto end if the aperture stop is disposed on the most reduction conjugate side of the fourth lens group.

Next, descriptions will be given of specific optical constructions for a projection lens system having a magnification changing function, dealing with first to ninth embodiments. FIG. 1 to FIG. 9 are lens construction diagrams corresponding to zoom lens systems ZL of the first to ninth embodiments, respectively, and the figures each illustrate lens arrangement at the telephoto end (T), etc. in a form of optical section. Movement loci mk (k=1 to 6) in FIG. 1 to FIG. 9 schematically indicate movement or stationary condition of a k-th lens group Grk during zooming from the telephoto end (T) to the wide-angle end (W). For example, a sixth lens group Gr6, a prism PR (for example, TIR (Total Internal Reflection) prism, a color separating/combining prism, etc.) disposed on the reduction conjugate side of the sixth lens group Gr6, and a cover glass CG of the image display device are all stationary during zooming. Arrows mF in FIG. 1 to FIG. 9 each indicate a moving direction of a first lens group Gr1 during focusing when a projection distance varies from a remote distance to a close distance. However, this is not meant to limit the focusing method.

The zoom lens systems ZL of the first to ninth embodiments (FIG. 1 to FIG. 9) are each a zoom lens system for projectors that achieves zooming by moving at least a second lens group Gr2, a third lens group Gr3, and a fifth lens group Gr5 along an optical axis AX, and each include six lens groups, that is, specifically, in order from the enlargement conjugate side, the first lens group Gr1 having a negative refractive power, the second lens group Gr2 having a negative refractive power, the third lens group Gr3 having a positive refractive power, a fourth lens group Gr4 having a negative refractive power, the fifth lens group Gr5, and the sixth lens group Gr6 having a positive refractive power. For example, the zoom lens systems ZL according to the first to seventh embodiments each have a six-group design with a negative-negative-positive-negative-positive-positive refractive power arrangement in order from the enlargement conjugate side, and the zoom lens systems ZL according to the eighth and ninth embodiments each have a six-group design with a negative-negative-positive-negative-negative-positive refractive power arrangement in order from the enlargement conjugate side.

Figure 37:
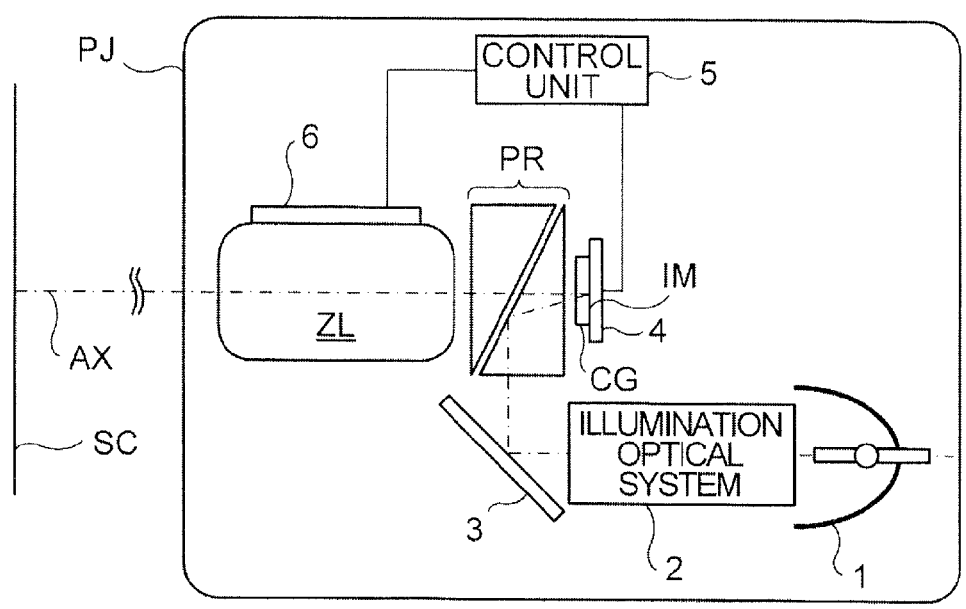
FIG. 37 is a schematic diagram showing an embodiment of a projector.

Next, a description will be given of a projector as an embodiment to which any one of the zoom lens systems ZL is applied as a projection lens system. FIG. 37 schematically shows an example of a construction of a projector PJ. The projector PJ includes a light source 1, an illumination optical system 2, a reflective mirror 3, a prism PR, an image display device 4, a control unit 5, an actuator 6, a zoom lens system (projection lens system) ZL, etc. The control unit 5 is a portion that administers overall control of the projector PJ. The image display device 4 is an image modulation device (for example, a digital micro-mirror device) that modulates light to produce an image, and is provided with a cover glass CG on its image display surface IM on which the image is displayed.

Light from the light source 1 (for example, a white light source such as a xenon lamp, a laser light source) is directed, via the illumination optical system 2, the reflective mirror 3, and the prism PR, to the image display device 4, where image light is formed. The prism PR is, for example, a TIR prism (or a color splitting/integrating prism, etc.), and separates illumination light and projection light from each other, for example. The image light formed at the image display device 4 is projected through the zoom lens system ZL toward a screen surface SC. That is, the image displayed on the image display device 4 is projected through the projection lens system ZL onto the screen surface SC on a magnified scale.

Each movable lens group in the zoom lens system ZL that moves for zooming or focusing is connected to the actuator 6 that moves each movable lens group along the optical axis AX to the enlargement conjugate side or to the reduction conjugate side. To the actuator 6, the control unit 5 is connected, which controls the movement of each movable lens group. The lens groups may instead be moved manually without the use of the control unit 5 and the actuator 6.

EXAMPLES

Hereinafter, the construction and other features of each of projection lens systems embodying the present invention will be described in more detail with reference to construction data etc. of examples. Examples 1 to 9 (EX1 to 9) presented below are numerical examples corresponding to the first to ninth embodiments described above, respectively, and optical construction diagrams (FIG. 1 to FIG. 9) showing the first to ninth embodiments each illustrate sectional shapes of lens elements, the lens arrangement, etc. of a corresponding one of Examples 1 to 9.

In the construction data of each example, listed as surface data are, from the leftmost column rightward, surface number i, radius of curvature CR (mm), axial face-to-face distance d (mm), refractive index nd for the d-line (with a wavelength of 587.56 nm), and Abbe number for the d-line. Listed as miscellaneous data are zoom ratio, and further, for each of different zoom positions T (TELE), M (MIDDLE), and W (WIDE), focal length (f, mm) of the entire system, half angle of view ($\omega$, °), maximum image height (Y', mm), F-number, backfocus (BF, mm), lens total length (mm), and variable axial distances di (i representing surface number, mm). Listed as zooming lens group data are focal length (mm) of each lens group, and movement amount (mm) of each lens group at the middle position (M) and the wide-angle end (W) with respect to the telephoto end (T).

The backfocus BF is an air-equivalent distance from a last surface of the lens system to a paraxial image plane IM. The lens total length is a sum of a distance from the foremost surface (i=1: beam restricting surface) to the last surface of the zoom lens system ZL and the backfocus BF. Values corresponding to the conditional formulae in the examples are listed in Table 1.

FIGS. 10A-10D to 36A-36D are aberration diagrams each corresponding to one of Examples 1 to 9 (EX1 to EX9), FIGS. 10A-10D, 13A-13D, 16A-16D, 19A-19D, 22A-22D, 25A-25D, 28A-28D, 31A-31D, and 34A-34D showing aberrations observed at the telephoto end (T), FIGS. 11A-11D, 14A-14D, 17A-17D, 20A-20D, 23A-23D, 26A-26D, 29A-29D, 32A-32D, and 35A-35D showing aberrations observed at the middle position (M, the middle focal length state), and FIGS. 12A-12D, 15A-15D, 18A-18D, 21A-21D, 24A-24D, 27A-27D, 30A-30D, 33A-33D, and 36A-36D showing aberrations observed at the wide-angle end (W). FIGS. 10A to 36A show spherical aberration (mm), FIGS. 10B to 36B show astigmatism (mm), FIGS. 10C to 36C show distortion (%), and FIGS. 10D to 36D show lateral chromatic aberration ($\mu$m). In the aberration diagrams 10B to 36B, 10C to 36C, and 10D to 36D, the maximum image height Y', which is the maximum value of the image height IMG HEIGHT, is equivalent to half the diagonal length of the image display surface IM.

In each of the spherical aberration diagrams FIGS. 10A to 36A, the vertical axis indicates value of incidence height to the pupil when normalized by the maximum height (that is, relative pupil height), and the horizontal axis indicates spherical aberration amount for light rays of wavelengths of 460 nm, 546 nm, and 620 nm, where the spherical aberration amount is represented by a shift amount (scale of horizontal axis: −0.1 mm to 0.1 mm) from the paraxial image plane in the direction of the optical axis AX. In each of the spherical aberration diagrams, the correspondence between the wavelengths and the lines is as follows: the long dashed line indicates spherical aberration for the wavelength of 460 nm, the solid line indicates spherical aberration for the wavelength of 546 nm, and the short dashed line indicates spherical aberration for the wavelength of 620 nm.

In each of the astigmatism diagrams FIGS. 10B to 36B, the vertical axis indicates paraxial image height (IMG HEIGHT, unit: mm), and the horizontal axis indicates sagittal (S) image planes and meridional (M) image planes for the light rays of wavelengths of 460 nm, 546 nm, and 620 nm, where the sagittal (S) and meridional (M) image planes are each represented by a shift amount (scale of the horizontal axis: −0.15 mm to 0.15 mm) from the paraxial image plane in the direction of the optical axis AX. In each of the astigmatism diagrams, the correspondence between the wavelengths and the lines is as follows: the long dashed line indicates the S image plane for the wavelength of 460 nm, the dashed-two dotted line indicates the M image plane for the wavelength of 460 nm, the solid line indicates the S image plane for the wavelength of 546 nm, the pale solid line indicates the M image plane for the wavelength of 546 nm, the short dashed line indicates the S image plane for the wavelength of 620 nm, and the dashed-dotted line indicates the M image plane for the wavelength of 620 nm.

In each of the distortion diagrams FIGS. 10C to 36C, the vertical axis indicates paraxial image height (IMG HEIGHT, unit: mm), and the horizontal axis indicates distortion (scale of the horizontal axis: −1.5% to 1.5%) for the wavelengths of 460 nm, 546 nm, and 620 nm. In each of the distortion diagrams, the correspondence between the wavelengths and the lines is as follows: the long dashed line indicates the distortion for the wavelength of 460 nm, the solid line indicates the distortion for the wavelength of 546 nm, and the short dashed line indicates the distortion for the wavelength of 620 nm.

In each of the lateral chromatic aberration diagrams FIGS. 10D to 36D, the vertical axis indicates paraxial image height (IMG HEIGHT, unit: mm), and the horizontal axis indicates lateral chromatic aberration (Blue-Green) corresponding to a shift between the light rays of the wavelengths of 460 nm and 546 nm, and lateral chromatic aberration (Red-Green) corresponding to a shift between the light rays of the wavelengths of 620 nm and 546 nm (scale of the horizontal axis: −5 μm to 5 μm). In each of the spherical aberration diagrams, the correspondence between the wavelengths and the lines is as follows: the solid line indicates the lateral chromatic aberration (Blue-Green), and the dashed line indicates the lateral chromatic aberration (Red-Green).

In Examples 1 to 9, the projection distance is 10 m, the image circle is 22.7 mm (Y'=11.35), and the F number is 2.5. Examples 1 to 7 are of type A (having a six-group design of negative-negative-positive-negative-positive-positive arrangement), and Examples 8 and 9 are of type B (having a six-group design of negative-negative-positive-negative-negative-positive arrangement), and the sixth lens group Gr6 of each of Examples 1 to 9 is stationary with respect to a reduction-conjugate-side image plane IM. Optical members disposed in lens back, closer to the reduction conjugate side than the sixth lens group Gr6 is, are the prism PR both sides of which are flat, and the cover glass CG of the image display device 4. Further, Examples 1 to 9 each have an exit pupil distance of 800 mm or longer, and each have substantial telecentricity. Focusing with respect to the screen surface SC from a remote distance side to a close distance side is achieved by moving the first lens group Gr1 to the enlargement conjugate side (arrows mF in FIG. 1 to FIG. 9).

Example 1 has a six-group design with a negative-negative-positive-negative-positive-positive arrangement, which includes a first lens group Gr1 including four lens elements, a second lens group Gr2 including two lens elements, a third lens group Gr3 including two lens elements, a fourth lens group Gr4 including three lens elements, a fifth lens group Gr5 including five lens elements, and a sixth lens group Gr6 including one lens element, and hence 17 lens elements (a first lens element L1 to a seventeenth lens element L17) are included in Example 1. On a most enlargement conjugate side of the first lens group Gr1, the first lens element L1 which is negative is disposed, and the fourth lens group Gr4 is designed such that a negative lens element, a negative lens element, a positive lens element, and an aperture stop ST are arranged in this order from the enlargement conjugate side. Of the three lens elements constituting the fourth lens group Gr4, the ninth lens element L9 is a biconcave negative lens element, the tenth lens element L10 is a negative meniscus lens element that is concave on the enlargement conjugate side, and the eleventh lens element L11 is a biconvex positive lens element. The first lens group Gr1, the fourth lens group Gr4, and the sixth lens group Gr6 are stationary groups, while the second lens group Gr2, the third lens group Gr3, and the fifth lens group Gr5 are movable groups (arrows m1 to m6 in FIG. 1). During zooming from the telephoto end (T) to the wide-angle end (W), the second lens group Gr2 moves from the reduction conjugate side toward the enlargement conjugate side, and the third lens group Gr3 and the fifth lens group Gr5 move from the enlargement conjugate side toward the reduction conjugate side.

Example 2 has a six-group design with a negative-negative-positive-negative-positive-positive arrangement, which includes a first lens group Gr1 including four lens elements, a second lens group Gr2 including two lens elements, a third lens group Gr3 including two lens elements, a fourth lens group Gr4 including three lens elements, a fifth lens group Gr5 including five lens elements, and a sixth lens group Gr6 including one lens element, and hence a total of 17 lens elements (a first lens element L1 to a seventeenth lens element L17) are included in Example 2. On a most enlargement conjugate side of the first lens group Gr1, the first lens element L1 which is negative is disposed, and the fourth lens group Gr4 is designed such that a negative lens element, a negative lens element, a positive lens element, and an aperture stop ST are arranged in this order from the enlargement conjugate side. Of the three lens elements constituting the fourth lens group Gr4, the ninth lens element L9 is a biconcave negative lens element, the tenth lens element L10 is a biconcave negative lens element, and the eleventh lens element L11 is a positive meniscus lens element that is convex on the enlargement conjugate side. The first lens group Gr1 and the sixth lens group Gr6 are stationary groups, while the second lens group Gr2, the third lens group Gr3, the fourth lens group Gr4, and the fifth lens group Gr5 are movable groups (arrows m1 to m6 in FIG. 2). During zooming from the telephoto end (T) to the wide-angle end (W), the second lens group Gr2 moves from the reduction conjugate side toward the enlargement conjugate side, and the third lens group Gr3 and the fifth lens group Gr5 move from the enlargement conjugate side toward the reduction conjugate side. The fourth lens group Gr4 first moves from the reduction conjugate side toward the enlargement conjugate side, and then turns back along the way, to move from the enlargement conjugate side toward the reduction conjugate side. A lens material having high anomalous dispersibility is used for the negative lens elements of the fourth lens group Gr4 that includes the aperture stop ST, and further the fourth lens group Gr4 moves during zooming, as a result of which the longitudinal chromatic aberration is satisfactorily corrected over the entire zoom area.

Example 3 has a six-group design with a negative-negative-positive-negative-positive-positive arrangement, which includes a first lens group Gr1 including four lens elements, a second lens group Gr2 including two lens elements, a third lens group Gr3 including two lens elements, a fourth lens group Gr4 including three lens elements, a fifth lens group Gr5 including five lens elements, and a sixth lens group Gr6 including one lens element, and hence a total of 17 lens elements (a first lens element L1 to a seventeenth lens element L17) are included in Example 3. On a most enlargement conjugate side of the first lens group Gr1, the first lens element L1 which is negative is disposed, and the fourth lens group Gr4 is designed such that a negative lens element, a negative lens element, a positive lens element, and an aperture stop ST are arranged in this order from the enlargement conjugate side. Of the three lens elements constituting the fourth lens group Gr4, the ninth lens element L9 is a biconcave negative lens element, the tenth lens element L10 is a negative meniscus lens element that is concave on the reduction conjugate side, and the eleventh lens element L11 is a positive meniscus lens element that is convex on the enlargement conjugate side. The fourth lens group Gr4 and the sixth lens group Gr6 are stationary groups, while the first lens group Gr1, the second lens group Gr2, the third lens group Gr3, and the fifth lens group Gr5 are movable groups (arrows m1 to m6 in FIG. 3). During zooming from the telephoto end (T) to the wide-angle end (W), the first lens group Gr1 and the second lens group Gr2 move from the reduction conjugate side toward the enlargement conjugate side, and the third lens group Gr3 and the fifth lens group Gr5 move from the enlargement conjugate side toward the reduction conjugate side. The first lens group Gr1, which has a strong negative refractive power, moves during zooming, and thereby the first lens group Gr1 greatly contributes to achievement of a wider angle of view.

Example 4 has a six-group design with a negative-negative-positive-negative-positive-positive arrangement, which includes a first lens group Gr1 including four lens elements, a second lens group Gr2 including two lens elements, a third lens group Gr3 including two lens elements, a fourth lens group Gr4 including three lens elements, a fifth lens group Gr5 including five lens elements, and a sixth lens group Gr6 including one lens element, and hence a total of 17 lens elements (a first lens element L1 to a seventeenth lens element L17) are included in Example 4. On a most enlargement conjugate side of the first lens group Gr1, the first lens element L1 which is negative is disposed, and the fourth lens group Gr4 is designed such that a negative lens element, a negative lens element, a positive lens element, and an aperture stop ST are arranged in this order from the enlargement conjugate side. Of the three lens elements constituting the fourth lens group Gr4, the ninth lens element L9 is a biconcave negative lens element, the tenth lens element L10 is a biconcave negative lens element, and the eleventh lens element L11 is a positive meniscus lens element that is convex on the enlargement conjugate side. The first lens group Gr1, the fourth lens group Gr4, and the sixth lens group Gr6 are stationary groups, while the second lens group Gr2, the third lens group Gr3, and the fifth lens group Gr5 are movable groups (arrows m1 to m6 in FIG. 4).

During zooming from the telephoto end (T) to the wide-angle end (W), the second lens group Gr2 moves from the reduction conjugate side toward the enlargement conjugate side, and the third lens group Gr3 and the fifth lens group Gr5 move from the enlargement conjugate side toward the reduction conjugate side. The first lens group Gr1 has weak refractive power, a lens material having a high refractive index is used for the first to third lens groups Gr1 to Gr3, and further, a lens material having high anomalous dispersibility is used for the negative lens elements of the fourth lens group Gr4, as a result of which the various aberrations are satisfactorily corrected in the entire zoom area, and a high resolution is achieved.

Example 5 has a six-group design with a negative-negative-positive-negative-positive-positive arrangement, which includes a first lens group Gr1 including four lens elements, a second lens group Gr2 including two lens elements, a third lens group Gr3 including two lens elements, a fourth lens group Gr4 including three lens elements, a fifth lens group Gr5 including five lens elements, and a sixth lens group Gr6 including one lens element, and hence a total of 17 lens elements (a first lens element L1 to a seventeenth lens element L17) are included in Example 5. On a most enlargement conjugate side of the first lens group Gr1, the first lens element L1 which is negative is disposed, and the fourth lens group Gr4 is designed such that a negative lens element, a negative lens element, a positive lens element, and an aperture stop ST are arranged in this order from the enlargement conjugate side. Of the three lens elements constituting the fourth lens group Gr4, the ninth lens element L9 is a negative meniscus lens element that is concave on the reduction conjugate side, the tenth lens element L10 is a biconcave negative lens element, and the eleventh lens element L11 is a positive meniscus lens element that is convex on the enlargement conjugate side. The first lens group Gr1 and the sixth lens group Gr6 are stationary groups, while the second lens group Gr2, the third lens group Gr3, the fourth lens group Gr4, and the fifth lens group Gr5 are movable groups (arrows m1 to m6 in FIG. 5). During zooming from the telephoto end (T) to the wide-angle end (W), the second lens group Gr2 moves from the reduction conjugate side toward the enlargement conjugate side, and the third lens group Gr3 and the fifth lens group Gr5 move from the enlargement conjugate side toward the reduction conjugate side. The fourth lens group Gr4 first moves from the reduction conjugate side toward the enlargement conjugate side, and then turns back along the way, to move from the enlargement conjugate side toward the reduction conjugate side. The negative lens elements of the fourth lens group Gr4 have comparatively low anomalous dispersibility, with only a small achromatic effect derived from the lens materials, but by moving during zooming, the fourth lens group Gr4 contributes to satisfactory correction of longitudinal chromatic aberration.

Example 6 has a six-group design with a negative-negative-positive-negative-positive-positive arrangement, which includes a first lens group Gr1 including six lens elements, a second lens group Gr2 including one lens element, a third lens group Gr3 including two lens elements, a fourth lens group Gr4 including four lens elements, a fifth lens group Gr5 including five lens elements, and a sixth lens group Gr6 including one lens element, and hence a total of 19 lens elements (a first lens element L1 to a nineteenth lens element L19) are included in Example 6. On a most enlargement conjugate side of the first lens group Gr1, the first lens element L1 which is negative is disposed, and the fourth lens group Gr4 is designed such that a negative lens element, a negative lens element, a negative lens element, a positive lens element, and an aperture stop ST are arranged in this order from the enlargement conjugate side. Of the four lens elements constituting the fourth lens group Gr4, the tenth lens element L10 is a biconcave negative lens element, the eleventh lens element L11 is a negative meniscus lens element that is concave on the reduction conjugate side, the twelfth lens element L12 is a biconcave negative lens element, and the thirteenth lens element L13 is a biconvex positive lens element. The first lens group Gr1, the fourth lens group Gr4, and the sixth lens group Gr6 are stationary groups, while the second lens group Gr2, the third lens group Gr3, and the fifth lens group Gr5 are movable groups (arrows m1 to m6 in FIG. 6). During zooming from the telephoto end (T) to the wide-angle end (W), the second lens group Gr2, the third lens group Gr3, and the fifth lens group Gr5 move from the enlargement conjugate side toward the reduction conjugate side. The fifth lens group Gr5 moves greatly during zooming, and as a result, difference between lateral chromatic aberration at the telephoto end (T) and at the wide-angle end (W) is reduced.

Example 7 has a six-group design with a negative-negative-positive-negative-positive-positive arrangement, which includes a first lens group Gr1 including six lens elements, a second lens group Gr2 including two lens elements, a third lens group Gr3 including two lens elements, a fourth lens group Gr4 including three lens elements, a fifth lens group Gr5 including five lens elements, and a sixth lens group Gr6 including one lens element, and hence a total of 19 lens elements (a first lens element L1 to a nineteenth lens element L19) are included in Example 7. On a most enlargement conjugate side of the first lens group Gr1, the first lens element L1 which is negative is disposed, and the fourth lens group Gr4 is designed such that an aperture stop ST, a negative lens element, a negative lens element, and a positive lens element are arranged in this order from the enlargement conjugate side. Of the three lens elements constituting the fourth lens group Gr4, the eleventh lens element L11 is a biconcave negative lens element, the twelfth lens element L12 is a biconcave negative lens element, and the thirteenth lens element L13 is a biconvex positive lens element. The first lens group Gr1, the fourth lens group Gr4, and the sixth lens group Gr6 are stationary groups, while the second lens group Gr2, the third lens group Gr3, and the fifth lens group Gr5 are movable groups (arrows m1 to m6 in FIG. 7). During zooming from the telephoto end (T) to the wide-angle end (W), the second lens group Gr2, the third lens group Gr3, and the fifth lens group Gr5 move from the enlargement conjugate side toward the reduction conjugate side.

Example 8 has a six-group design with a negative-negative-positive-negative-negative-positive arrangement, which includes a first lens group Gr1 including six lens elements, a second lens group Gr2 including two lens elements, a third lens group Gr3 including two lens elements, a fourth lens group Gr4 including two lens elements, a fifth lens group Gr5 including five lens elements, and a sixth lens group Gr6 including one lens element, and hence a total of 18 lens elements (a first lens element L1 to a eighteenth lens element L18) are included in Example 8. On a most enlargement conjugate side of the first lens group Gr1, the first lens element L1 which is negative is disposed, and the fourth lens group Gr4 is designed such that a negative lens element, a positive lens element, and an aperture stop ST are arranged in this order from the enlargement conjugate side. Of the two lens elements constituting the fourth lens group Gr4, the eleventh lens element L11 is a biconcave negative lens element, and the twelfth lens element L12 is a positive meniscus lens element that is convex on the enlargement conjugate side. The first lens group Gr1, the fourth lens group Gr4, and the sixth lens group Gr6 are stationary groups, while the second lens group Gr2, the third lens group Gr3, and the fifth lens group Gr5 are movable groups (arrows m1 to m6 in FIG. 8). During zooming from the telephoto end (T) to the wide-angle end (W), the second lens group Gr2, the third lens group Gr3, and the fifth lens group Gr5 move from the enlargement conjugate side toward the reduction conjugate side. The fifth lens group Gr5 has weak refractive power, and is substantially afocal.

Example 9 has a six-group design with a negative-negative-positive-negative-negative-positive arrangement, which includes a first lens group Gr1 including six lens elements, a second lens group Gr2 including two lens elements, a third lens group Gr3 including two lens elements, a fourth lens group Gr4 including two lens elements, a fifth lens group Gr5 including five lens elements, and a sixth lens group Gr6 including one lens element, and hence a total of 18 lens elements (a first lens element L1 to a eighteenth lens element L18) are included in Example 9. On a most enlargement conjugate side of the first lens group Gr1, the first lens element L1 which is negative is disposed, and the fourth lens group Gr4 is designed such that a negative lens element, a positive lens element, and an aperture stop ST are arranged in this order from the enlargement conjugate side. Of the two lens elements constituting the fourth lens group Gr4, the eleventh lens element L11 is a biconcave negative lens element, and the twelfth lens element L12 is a positive meniscus lens element that is convex on the enlargement conjugate side. The first lens group Gr1, the fourth lens group Gr4, and the sixth lens group Gr6 are stationary groups, while the second lens group Gr2, the third lens group Gr3, and the fifth lens group Gr5 are movable groups (arrows m1 to m6 in FIG. 9). During zooming from the telephoto end (T) to the wide-angle end (W), the second lens group Gr2, the third lens group Gr3, and the fifth lens group Gr5 move from the enlargement conjugate side toward the reduction conjugate side. The fifth lens group Gr5 has strong refractive power, and a composite focal length of the fifth lens group Gr5 is −500 mm.

In cases where the zoom lens system ZL of any of the examples is used as a projection lens system in the projector PJ (which is, for example, a liquid crystal projector), the screen surface (projection surface) SC serves as the image plane and the image display surface IM (for example the liquid crystal panel surface) serves as the object plane in each example, in practice; however, the lens system is optically designed as a reduction system, and its optical performance is evaluated at the image display surface (reduction-conjugate-side image plane) IM, with the screen surface SC (see FIG. 37) regarded as the object plane. As will be understood from the obtained optical performance, the zooming lens systems ZL of the examples are suitably used not only as projection lens systems for use in projectors but also as imaging lens systems for use in imaging devices (for example, video cameras and digital cameras).

Example 1

Unit: mm

Surface Data

| i | CR | d | nd | vd |
|---|---|---|---|---|
| 0(SC) | ∞ | 10260.00 | | |
| 1 | ∞ | 0.00 | | |
| 2 | 84.54 | 3.66 | 1.6700 | 47.20 |
| 3 | 37.43 | 14.91 | | |
| 4 | 253.14 | 2.97 | 1.5638 | 60.83 |
| 5 | 52.45 | 14.62 | | |
| 6 | -3691.81 | 8.32 | 1.5317 | 48.84 |
| 7 | -63.87 | 0.20 | | |
| 8 | 3809.96 | 2.90 | 1.7408 | 27.76 |
| 9 | 86.61 | Variable | | |
| 10 | -287.90 | 7.34 | 1.5168 | 64.20 |
| 11 | -43.53 | 0.51 | | |
| 12 | -55.68 | 2.48 | 1.4875 | 70.44 |
| 13 | 70.97 | Variable | | |
| 14 | 2270.20 | 6.74 | 1.5638 | 60.83 |
| 15 | -63.42 | 21.08 | | |
| 16 | 42.76 | 5.69 | 1.5168 | 64.20 |
| 17 | -1143.25 | Variable | | |
| 18 | -129.81 | 1.36 | 1.4970 | 81.61 |
| 19 | 28.96 | 7.21 | | |
| 20 | -56.23 | 1.25 | 1.4970 | 81.61 |
| 21 | -460.62 | 2.42 | | |
| 22 | 53.86 | 4.63 | 1.6889 | 31.16 |
| 23 | -1483.86 | 9.67 | | |
| 24(ST) | ∞ | Variable | | |
| 25 | -293.59 | 6.49 | 1.4970 | 81.61 |
| 26 | -29.94 | 2.75 | | |
| 27 | -26.99 | 1.86 | 1.7859 | 43.93 |
| 28 | 229.63 | 0.20 | | |
| 29 | 70.04 | 8.75 | 1.4970 | 81.61 |
| 30 | -44.59 | 0.20 | | |
| 31 | 98.69 | 1.95 | 1.8340 | 37.35 |
| 32 | 41.85 | 2.78 | | |
| 33 | 52.77 | 9.13 | 1.4970 | 81.61 |
| 34 | -72.71 | Variable | | |
| 35 | 84.05 | 5.07 | 1.4970 | 81.61 |
| 36 | -171.01 | 10.50 | | |
| 37 | ∞ | 70.00 | 1.5168 | 64.20 |
| 38 | ∞ | 5.00 | | |
| 39 | ∞ | 3.00 | 1.4875 | 70.44 |
| 40 | ∞ | 0.50 | | |
| 41(IM) | ∞ | | | |

Miscellaneous Data
Zoom Ratio 1.38

| | TELE | MIDDLE | WIDE |
|---|---|---|---|
| Focal Length | 23.77 | 20.22 | 17.20 |
| Half Angle of View ω | 25.52 | 29.31 | 33.41 |
| Maximum Image Height | 11.35 | 11.35 | 11.35 |
| F Number | 2.50 | 2.50 | 2.50 |
| BF | 64.17 | 64.17 | 64.17 |
| Entire Lens System Length | 320.15 | 320.15 | 320.15 |
| d9 | 37.93 | 35.17 | 26.84 |
| d13 | 7.01 | 16.68 | 31.62 |
| d17 | 16.26 | 9.36 | 2.74 |
| d24 | 24.48 | 31.25 | 37.27 |
| d34 | 13.18 | 6.41 | 0.40 |

Zoom Lens Group Data

| | Group Movement Amount (From TELE) | | |
|---|---|---|---|
| Group/Surface | MIDDLE | WIDE | Focal Length |
| Gr1/1-9 | 0.00 | 0.00 | -50.21 |
| Gr2/10-13 | -2.76 | -11.09 | -181.95 |
| Gr3/14-17 | 6.90 | 13.53 | 51.89 |
| Gr4/18-24 | 0.00 | 0.00 | -75.20 |
| Gr5/25-34 | 6.77 | 12.78 | 134.43 |
| Gr6/35-36 | 0.00 | 0.00 | 113.81 |

Example 2

Unit: mm

Surface Data

| i | CR | d | nd | vd |
|---|---|---|---|---|
| 0(SC) | ∞ | 10260.00 | | |
| 1 | ∞ | 0.00 | | |
| 2 | 80.15 | 3.49 | 1.7234 | 37.99 |
| 3 | 35.54 | 15.42 | | |
| 4 | 439.09 | 2.84 | 1.6584 | 50.85 |
| 5 | 59.30 | 15.07 | | |
| 6 | 317.90 | 8.99 | 1.6129 | 36.96 |
| 7 | -68.98 | 0.21 | | |
| 8 | 368.60 | 2.53 | 1.7847 | 25.72 |
| 9 | 68.58 | Variable | | |
| 10 | 712.28 | 8.28 | 1.5168 | 64.20 |
| 11 | -45.07 | 1.18 | | |
| 12 | -60.61 | 2.40 | 1.6031 | 60.69 |
| 13 | 73.40 | Variable | | |
| 14 | -1400.48 | 5.84 | 1.5168 | 64.20 |
| 15 | -57.68 | 16.73 | | |
| 16 | 45.19 | 5.41 | 1.6385 | 55.45 |
| 17 | 3772.59 | Variable | | |
| 18 | -227.89 | 1.44 | 1.4370 | 95.10 |
| 19 | 26.28 | 11.33 | | |
| 20 | -54.14 | 1.25 | 1.4370 | 95.10 |
| 21 | 360.49 | 0.42 | | |
| 22 | 50.91 | 3.33 | 1.7283 | 28.32 |
| 23 | 343.50 | 10.66 | | |
| 24(ST) | ∞ | Variable | | |
| 25 | -344.96 | 7.05 | 1.4970 | 81.61 |
| 26 | -30.19 | 2.64 | | |
| 27 | -27.30 | 1.53 | 1.8061 | 40.73 |
| 28 | 198.78 | 1.53 | | |
| 29 | 74.45 | 8.40 | 1.4970 | 81.61 |
| 30 | -42.30 | 0.86 | | |
| 31 | 98.72 | 1.94 | 1.8340 | 37.35 |
| 32 | 41.12 | 2.69 | | |
| 33 | 50.47 | 9.60 | 1.4970 | 81.61 |
| 34 | -72.88 | Variable | | |
| 35 | 83.91 | 5.17 | 1.4970 | 81.61 |
| 36 | -159.56 | 10.50 | | |
| 37 | ∞ | 70.00 | 1.5168 | 64.20 |
| 38 | ∞ | 5.00 | | |
| 39 | ∞ | 3.00 | 1.4875 | 70.44 |
| 40 | ∞ | 0.50 | | |
| 41(IM) | ∞ | | | |

Miscellaneous Data
Zoom Ratio 1.38

| | TELE | MIDDLE | WIDE |
|---|---|---|---|
| Focal Length | 23.70 | 20.15 | 17.14 |
| Half Angle of View ω | 25.54 | 29.33 | 33.43 |
| Maximum Image Height | 11.35 | 11.35 | 11.35 |
| F Number | 2.50 | 2.50 | 2.50 |
| BF | 64.17 | 64.17 | 64.17 |
| Entire Lens System Length | 313.21 | 313.21 | 313.21 |
| d9 | 33.89 | 29.96 | 23.63 |
| d13 | 8.50 | 18.21 | 31.28 |
| d17 | 14.85 | 8.19 | 2.55 |
| d24 | 20.65 | 27.31 | 32.95 |
| d36 | 12.92 | 7.14 | 0.40 |

-continued

Unit: mm

Zoom Lens Group Data

Group Movement Amount
(From TELE)

| Group/Surface | MIDDLE | WIDE | Focal Length |
|---|---|---|---|
| Gr1/1-9 | 0.00 | 0.00 | -49.59 |
| Gr2/10-13 | -3.93 | -10.26 | -175.94 |
| Gr3/14-17 | 5.79 | 12.52 | 48.39 |
| Gr4/18-24 | -0.87 | 0.22 | -68.98 |
| Gr5/25-34 | 5.79 | 12.52 | 135.19 |
| Gr6/35-36 | 0.00 | 0.00 | 111.11 |

Example 3

Unit: mm

Surface Data

| i | CR | d | nd | vd |
|---|---|---|---|---|
| 0(SC) | ∞ | 10260.00 | | |
| 1 | ∞ | 0.00 | | |
| 2 | 65.06 | 3.23 | 1.6584 | 50.85 |
| 3 | 32.36 | 13.44 | | |
| 4 | 153.24 | 2.59 | 1.6031 | 60.69 |
| 5 | 45.57 | 9.13 | | |
| 6 | -1262.37 | 6.59 | 1.6727 | 32.17 |
| 7 | -64.76 | 0.69 | | |
| 8 | -368.36 | 2.56 | 1.8052 | 25.46 |
| 9 | 57.76 | Variable | | |
| 10 | 81.61 | 9.58 | 1.5168 | 64.20 |
| 11 | -46.54 | 0.20 | | |
| 12 | -86.56 | 1.96 | 1.6031 | 60.69 |
| 13 | 52.03 | Variable | | |
| 14 | 89.89 | 8.01 | 1.5168 | 64.20 |
| 15 | -74.21 | 0.20 | | |
| 16 | 53.73 | 3.34 | 1.5168 | 64.20 |
| 17 | 156.03 | Variable | | |
| 18 | -117.53 | 1.41 | 1.4970 | 81.61 |
| 19 | 31.12 | 4.95 | | |
| 20 | 179.83 | 1.33 | 1.5168 | 64.20 |
| 21 | 56.79 | 0.57 | | |
| 22 | 39.44 | 3.55 | 1.7283 | 28.32 |
| 23 | 160.10 | 12.46 | | |
| 24(ST) | ∞ | Variable | | |
| 25 | -158.86 | 5.96 | 1.4970 | 81.61 |
| 26 | -32.42 | 3.15 | | |
| 27 | -27.65 | 1.66 | 1.8061 | 40.73 |
| 28 | -170.11 | 0.28 | | |
| 29 | 104.08 | 8.62 | 1.4970 | 81.61 |
| 30 | -39.93 | 0.20 | | |
| 31 | 174.76 | 1.97 | 1.8340 | 37.35 |
| 32 | 42.00 | 2.56 | | |
| 33 | 50.52 | 8.84 | 1.4970 | 81.61 |
| 34 | -85.99 | Variable | | |
| 35 | 84.43 | 5.12 | 1.4970 | 81.61 |
| 36 | -163.74 | 10.50 | | |
| 37 | ∞ | 70.00 | 1.5168 | 64.20 |
| 38 | ∞ | 5.00 | | |
| 39 | ∞ | 3.00 | 1.4875 | 70.44 |
| 40 | ∞ | 0.50 | | |
| 41(IM) | ∞ | | | |

Miscellaneous Data
Zoom Ratio 1.41

| | TELE | MIDDLE | WIDE |
|---|---|---|---|
| Focal Length | 23.88 | 20.18 | 16.99 |
| Half Angle of View ω | 25.42 | 29.35 | 33.74 |
| Maximum Image Height | 11.35 | 11.35 | 11.35 |

-continued

Unit: mm

| | | | |
|---|---|---|---|
| F Number | 2.50 | 2.50 | 2.50 |
| BF | 64.17 | 64.17 | 64.17 |
| Entire Lens System Length | 294.28 | 294.84 | 298.90 |
| d9 | 16.78 | 17.20 | 19.58 |
| d15 | 31.38 | 39.07 | 47.05 |
| d19 | 17.56 | 10.02 | 3.71 |
| d26 | 27.45 | 33.69 | 39.84 |
| d37 | 12.80 | 6.56 | 0.40 |

Zoom Lens Group Data

Group Movement Amount
(From TELE)

| Group/Surface | MIDDLE | WIDE | Focal Length |
|---|---|---|---|
| Gr1/1-9 | -0.56 | -4.62 | -33.98 |
| Gr2/10-13 | -0.15 | -1.83 | -1613.27 |
| Gr3/14-17 | 7.54 | 13.85 | 53.11 |
| Gr4/18-24 | 0.00 | 0.00 | -86.99 |
| Gr5/25-34 | 6.24 | 12.40 | 141.39 |
| Gr6/35-36 | 0.00 | 0.00 | 112.53 |

Example 4

Unit: mm

Surface Data

| i | CR | d | nd | vd |
|---|---|---|---|---|
| 0(SC) | ∞ | 10260.00 | | |
| 1 | ∞ | 0.00 | | |
| 2 | 73.04 | 3.49 | 1.7234 | 37.99 |
| 3 | 35.59 | 14.93 | | |
| 4 | 268.21 | 2.84 | 1.7015 | 41.15 |
| 5 | 51.93 | 20.55 | | |
| 6 | 266.61 | 9.15 | 1.6129 | 36.96 |
| 7 | -69.18 | 0.68 | | |
| 8 | 303.32 | 2.82 | 1.8467 | 23.78 |
| 9 | 70.31 | Variable | | |
| 10 | 4120.14 | 7.83 | 1.5168 | 64.20 |
| 11 | -45.38 | 0.23 | | |
| 12 | -63.82 | 2.43 | 1.6031 | 60.69 |
| 13 | 79.68 | Variable | | |
| 14 | -991.16 | 5.84 | 1.5168 | 64.20 |
| 15 | -56.89 | 18.77 | | |
| 16 | 45.82 | 5.35 | 1.6385 | 55.45 |
| 17 | 5260.67 | Variable | | |
| 18 | -133.56 | 1.38 | 1.4370 | 95.10 |
| 19 | 25.59 | 8.02 | | |
| 20 | -49.49 | 1.48 | 1.4370 | 95.10 |
| 21 | 342.04 | 0.40 | | |
| 22 | 48.92 | 4.19 | 1.7408 | 27.76 |
| 23 | 610.68 | 11.99 | | |
| 24(ST) | ∞ | Variable | | |
| 25 | -557.08 | 6.80 | 1.4875 | 70.44 |
| 26 | -30.20 | 2.63 | | |
| 27 | -27.51 | 1.86 | 1.8061 | 40.73 |
| 28 | 222.05 | 0.32 | | |
| 29 | 71.89 | 8.51 | 1.4970 | 81.61 |
| 30 | -41.77 | 0.20 | | |
| 31 | 100.01 | 1.92 | 1.8061 | 33.27 |
| 32 | 40.14 | 3.28 | | |
| 33 | 51.24 | 8.84 | 1.4970 | 81.61 |
| 34 | -82.70 | Variable | | |
| 35 | 84.59 | 5.52 | 1.4970 | 81.61 |
| 36 | -127.73 | 10.50 | | |
| 37 | ∞ | 70.00 | 1.5168 | 64.20 |
| 38 | ∞ | 5.00 | | |
| 39 | ∞ | 3.00 | 1.4875 | 70.44 |
| 40 | ∞ | 0.50 | | |
| 41(IM) | ∞ | | | |

-continued

Unit: mm

Miscellaneous Data
Zoom Ratio 1.38

|  | TELE | MIDDLE | WIDE |
|---|---|---|---|
| Focal Length | 23.71 | 20.15 | 17.14 |
| Half Angle of View ω | 25.54 | 29.33 | 33.43 |
| Maximum Image Height | 11.35 | 11.35 | 11.35 |
| F Number | 2.50 | 2.50 | 2.50 |
| BF | 64.17 | 64.17 | 64.17 |
| Entire Lens System Length | 315.14 | 315.14 | 315.14 |
| d9 | 31.81 | 28.73 | 20.60 |
| d13 | 6.94 | 16.48 | 30.74 |
| d17 | 15.44 | 8.99 | 2.85 |
| d24 | 23.59 | 29.15 | 34.11 |
| d34 | 10.92 | 5.36 | 0.40 |

Zoom Lens Group Data

| | Group Movement Amount (From TELE) | | |
|---|---|---|---|
| Group/Surface | MIDDLE | WIDE | Focal Length |
| Gr1/1-9 | 0.00 | 0.00 | −50.95 |
| Gr2/10-13 | −3.08 | −11.21 | −183.29 |
| Gr3/14-17 | 6.45 | 12.59 | 49.31 |
| Gr4/18-24 | 0.00 | 0.00 | −65.80 |
| Gr5/25-34 | 5.56 | 10.52 | 144.34 |
| Gr6/35-36 | 0.00 | 0.00 | 102.99 |

Example 5

Unit: mm

Surface Data

| i | CR | d | nd | vd |
|---|---|---|---|---|
| 0(SC) | ∞ | 10240.00 | | |
| 1 | ∞ | 0.00 | | |
| 2 | 83.80 | 3.65 | 1.6584 | 50.85 |
| 3 | 37.40 | 14.19 | | |
| 4 | 182.56 | 2.97 | 1.7440 | 44.90 |
| 5 | 49.19 | 24.26 | | |
| 6 | 237.44 | 10.00 | 1.5955 | 39.22 |
| 7 | −64.86 | 6.57 | | |
| 8 | −2981.07 | 2.49 | 1.8052 | 25.46 |
| 9 | 63.80 | Variable | | |
| 10 | −905.08 | 8.34 | 1.5168 | 64.20 |
| 11 | −40.96 | 0.51 | | |
| 12 | −51.16 | 2.23 | 1.4970 | 81.61 |
| 13 | 73.90 | Variable | | |
| 14 | 156.01 | 6.74 | 1.5168 | 64.20 |
| 15 | −79.08 | 14.14 | | |
| 16 | 45.22 | 5.56 | 1.6385 | 55.45 |
| 17 | 365.67 | Variable | | |
| 18 | 645.48 | 1.55 | 1.4875 | 70.44 |
| 19 | 27.15 | 9.09 | | |
| 20 | −64.94 | 1.64 | 1.4875 | 70.44 |
| 21 | 934.06 | 4.64 | | |
| 22 | 53.01 | 3.31 | 1.7618 | 26.61 |
| 23 | 227.23 | 17.16 | | |
| 24(ST) | ∞ | Variable | | |
| 25 | −151.14 | 6.86 | 1.4970 | 81.61 |
| 26 | −30.07 | 2.57 | | |
| 27 | −27.25 | 1.61 | 1.8061 | 40.73 |
| 28 | 196.43 | 1.15 | | |
| 29 | 73.67 | 7.90 | 1.4875 | 70.44 |
| 30 | −41.87 | 5.02 | | |
| 31 | 102.13 | 1.91 | 1.8340 | 37.35 |
| 32 | 42.71 | 2.61 | | |
| 33 | 52.45 | 9.04 | 1.4970 | 81.61 |

-continued

Unit: mm

| 34 | −73.01 | Variable | | |
|---|---|---|---|---|
| 35 | 70.02 | 5.62 | 1.4970 | 81.61 |
| 36 | −173.34 | 10.51 | | |
| 37 | ∞ | 70.00 | 1.5168 | 64.20 |
| 38 | ∞ | 5.00 | | |
| 39 | ∞ | 3.00 | 1.4875 | 70.44 |
| 40 | ∞ | 0.50 | | |
| 41(IM) | ∞ | | | |

Miscellaneous Data
Zoom Ratio 1.38

|  | TELE | MIDDLE | WIDE |
|---|---|---|---|
| Focal Length | 23.76 | 20.21 | 17.19 |
| Half Angle of View ω | 25.54 | 29.33 | 33.45 |
| Maximum Image Height | 11.35 | 11.35 | 11.35 |
| F Number | 2.50 | 2.50 | 2.50 |
| BF | 64.17 | 64.17 | 64.17 |
| Entire Lens System Length | 325.09 | 325.09 | 325.09 |
| d9 | 21.91 | 19.64 | 17.16 |
| d13 | 8.07 | 16.79 | 27.27 |
| d17 | 15.70 | 8.19 | 2.17 |
| d24 | 16.75 | 24.47 | 30.59 |
| d34 | 15.16 | 8.49 | 0.40 |

Zoom Lens Group Data

| | Group Movement Amount (From TELE) | | |
|---|---|---|---|
| Group/Surface | MIDDLE | WIDE | Focal Length |
| Gr1/1-9 | 0.00 | 0.00 | −40.52 |
| Gr2/10-13 | −2.27 | −4.75 | −233.52 |
| Gr3/14-17 | 6.45 | 14.44 | 48.92 |
| Gr4/18-24 | −1.06 | 0.91 | −82.79 |
| Gr5/25-34 | 6.67 | 14.76 | 176.52 |
| Gr6/35-36 | 0.00 | 0.00 | 100.83 |

Example 6

Unit: mm

Surface Data

| i | CR | d | nd | vd |
|---|---|---|---|---|
| 0(SC) | ∞ | 10070.00 | | |
| 1 | ∞ | 0.00 | | |
| 2 | 74.19 | 3.62 | 1.7015 | 41.15 |
| 3 | 34.36 | 15.88 | | |
| 4 | 268.64 | 3.34 | 1.6031 | 60.69 |
| 5 | 32.56 | 8.58 | | |
| 6 | 55.23 | 14.22 | 1.6129 | 36.96 |
| 7 | −73.91 | 0.78 | | |
| 8 | 13540.96 | 3.60 | 1.8467 | 23.78 |
| 9 | 43.63 | 14.44 | | |
| 10 | 164.09 | 17.36 | 1.4875 | 70.44 |
| 11 | −35.77 | 4.20 | | |
| 12 | −100.00 | 2.27 | 1.6031 | 60.69 |
| 13 | 61.58 | Variable | | |
| 14 | −429.94 | 2.07 | 1.6031 | 60.69 |
| 15 | 129.83 | Variable | | |
| 16 | 356.33 | 4.51 | 1.6727 | 32.17 |
| 17 | −86.40 | 24.46 | | |
| 18 | 57.92 | 6.15 | 1.6385 | 55.45 |
| 19 | −262.96 | Variable | | |
| 20 | −92.64 | 1.74 | 1.6180 | 63.40 |
| 21 | 2816.66 | 7.39 | | |
| 22 | 67.95 | 1.51 | 1.6031 | 60.69 |
| 23 | 30.78 | 6.85 | | |
| 24 | −53.31 | 1.47 | 1.6031 | 60.69 |

-continued

Unit: mm

| | | | | |
|---|---|---|---|---|
| 25 | 120.96 | 1.07 | | |
| 26 | 59.77 | 4.96 | 1.6129 | 36.96 |
| 27 | −60.37 | 4.64 | | |
| 28(ST) | ∞ | Variable | | |
| 29 | −119.78 | 3.72 | 1.4970 | 81.61 |
| 30 | −39.88 | 3.51 | | |
| 31 | −29.53 | 1.87 | 1.8340 | 37.35 |
| 32 | −49.34 | 7.64 | | |
| 33 | 116.40 | 7.46 | 1.4970 | 81.61 |
| 34 | −47.31 | 0.20 | | |
| 35 | −175.91 | 2.26 | 1.8340 | 37.35 |
| 36 | 45.71 | 2.61 | | |
| 37 | 54.32 | 8.95 | 1.4970 | 81.61 |
| 38 | −66.16 | Variable | | |
| 39 | 69.15 | 5.03 | 1.4970 | 81.61 |
| 40 | −202.63 | 10.66 | | |
| 41 | ∞ | 70.00 | 1.5168 | 64.20 |
| 42 | ∞ | 5.00 | | |
| 43 | ∞ | 3.00 | 1.4875 | 70.44 |
| 44 | ∞ | 0.50 | | |
| 45(IM) | ∞ | | | |

Miscellaneous Data
Zoom Ratio 1.37

| | TELE | MIDDLE | WIDE |
|---|---|---|---|
| Focal Length | 22.72 | 19.38 | 16.54 |
| Half Angle of View ω | 26.54 | 30.36 | 34.46 |
| Maximum Image Height | 11.35 | 11.35 | 11.35 |
| F Number | 2.50 | 2.50 | 2.50 |
| BF | 64.33 | 64.33 | 64.33 |
| Entire Lens System Length | 330.17 | 330.17 | 330.17 |
| d13 | 6.64 | 13.70 | 18.40 |
| d15 | 3.69 | 4.41 | 7.24 |
| d19 | 22.61 | 14.83 | 7.29 |
| d28 | 18.01 | 25.84 | 33.53 |
| d38 | 16.52 | 8.69 | 1.01 |

Zoom Lens Group Data

| | Group Movement Amount (From TELE) | | |
|---|---|---|---|
| Group/Surface | MIDDLE | WIDE | Focal Length |
| Gr1/1-13 | 0.00 | 0.00 | −33.40 |
| Gr2/14-15 | 7.06 | 11.77 | −164.46 |
| Gr3/16-19 | 7.78 | 15.32 | 50.57 |
| Gr4/20-28 | 0.00 | 0.00 | −88.78 |
| Gr5/29-38 | 7.83 | 15.51 | 150.14 |
| Gr6/39-40 | 0.00 | 0.00 | 104.07 |

Example 7

Unit: mm

Surface Data

| i | CR | d | nd | vd |
|---|---|---|---|---|
| 0(SC) | ∞ | 10070.00 | | |
| 1 | ∞ | 0.00 | | |
| 2 | 95.96 | 3.67 | 1.6584 | 50.85 |
| 3 | 34.32 | 17.59 | | |
| 4 | ∞ | 3.03 | 1.6031 | 60.69 |
| 5 | 51.32 | 13.58 | | |
| 6 | −400.44 | 8.45 | 1.6727 | 32.17 |
| 7 | −61.84 | 9.44 | | |
| 8 | 122.58 | 3.42 | 1.8467 | 23.78 |
| 9 | 45.96 | 19.20 | | |

-continued

Unit: mm

| | | | | |
|---|---|---|---|---|
| 10 | 185.51 | 13.51 | 1.5168 | 64.20 |
| 11 | −41.48 | 14.57 | | |
| 12 | −82.46 | 2.17 | 1.5638 | 60.83 |
| 13 | 67.01 | Variable | | |
| 14 | 299.29 | 5.84 | 1.5182 | 58.96 |
| 15 | −41.53 | 2.00 | | |
| 16 | −41.67 | 1.73 | 1.6031 | 60.69 |
| 17 | 129.34 | Variable | | |
| 18 | 109.72 | 4.13 | 1.6129 | 36.96 |
| 19 | −128.80 | 25.42 | | |
| 20 | 53.18 | 4.00 | 1.5182 | 58.96 |
| 21 | 732.13 | Variable | | |
| 22(ST) | ∞ | 3.28 | | |
| 23 | −73.91 | 1.49 | 1.4970 | 81.61 |
| 24 | 56.97 | 4.51 | | |
| 25 | −340.59 | 1.52 | 1.6180 | 63.40 |
| 26 | 135.45 | 1.27 | | |
| 27 | 77.76 | 4.02 | 1.6477 | 33.84 |
| 28 | −157.05 | Variable | | |
| 29 | −157.41 | 7.40 | 1.4970 | 81.61 |
| 30 | −31.21 | 2.98 | | |
| 31 | −27.91 | 2.43 | 1.8061 | 40.73 |
| 32 | −66.79 | 0.20 | | |
| 33 | 70.05 | 8.87 | 1.4970 | 81.61 |
| 34 | −54.30 | 0.20 | | |
| 35 | 2102.87 | 2.09 | 1.8340 | 37.35 |
| 36 | 40.47 | 3.33 | | |
| 37 | 50.02 | 8.42 | 1.4970 | 81.61 |
| 38 | −96.76 | Variable | | |
| 39 | 88.10 | 4.38 | 1.4970 | 81.61 |
| 40 | −212.27 | 10.21 | | |
| 41 | ∞ | 70.00 | 1.5168 | 64.20 |
| 42 | ∞ | 5.00 | | |
| 43 | ∞ | 3.00 | 1.4875 | 70.44 |
| 44 | ∞ | 0.50 | | |
| 45(IM) | ∞ | | | |

Miscellaneous Data
Zoom Ratio 1.37

| | TELE | MIDDLE | WIDE |
|---|---|---|---|
| Focal Length | 22.72 | 19.38 | 16.54 |
| Half Angle of View ω | 26.54 | 30.36 | 34.46 |
| Maximum Image Height | 11.35 | 11.35 | 11.35 |
| F Number | 2.50 | 2.50 | 2.50 |
| BF | 63.87 | 63.87 | 63.87 |
| Entire Lens System Length | 335.17 | 335.17 | 335.17 |
| d13 | 6.01 | 15.93 | 23.31 |
| d17 | 4.88 | 4.22 | 5.95 |
| d21 | 21.67 | 12.42 | 3.31 |
| d28 | 14.11 | 22.20 | 29.58 |
| d38 | 16.49 | 8.40 | 1.02 |

Zoom Lens Group Data

| | Group Movement Amount (From TELE) | | |
|---|---|---|---|
| Group/Surface | MIDDLE | WIDE | Focal Length |
| Gr1/1-13 | 0.00 | 0.00 | −33.08 |
| Gr2/14-17 | 9.91 | 17.30 | −229.56 |
| Gr3/18-21 | 9.26 | 18.37 | 59.06 |
| Gr4/22-28 | 0.00 | 0.00 | −120.20 |
| Gr5/29-38 | 8.09 | 15.47 | 123.69 |
| Gr6/39-40 | 0.00 | 0.00 | 125.52 |

Example 8

Unit: mm

Surface Data

| i | CR | d | nd | vd |
|---|---|---|---|---|
| 0(SC) | ∞ | 10450.00 | | |
| 1 | ∞ | 0.00 | | |
| 2 | 141.53 | 3.66 | 1.6385 | 55.45 |
| 3 | 33.93 | 18.16 | | |
| 4 | −627.70 | 2.91 | 1.6031 | 60.69 |
| 5 | 79.73 | 5.25 | | |
| 6 | 694.43 | 8.22 | 1.7408 | 27.76 |
| 7 | −73.82 | 6.91 | | |
| 8 | 112.53 | 2.62 | 1.8052 | 25.46 |
| 9 | 39.49 | 14.90 | | |
| 10 | 84.43 | 15.41 | 1.5168 | 64.20 |
| 11 | −41.38 | 1.00 | | |
| 12 | −109.83 | 2.36 | 1.6031 | 60.69 |
| 13 | 49.19 | Variable | | |
| 14 | 1538.65 | 5.25 | 1.5168 | 64.20 |
| 15 | −65.39 | 28.58 | | |
| 16 | −43.69 | 1.98 | 1.7234 | 37.99 |
| 17 | −2165.25 | Variable | | |
| 18 | −208.65 | 7.79 | 1.5174 | 52.15 |
| 19 | −36.96 | 1.00 | | |
| 20 | 62.26 | 5.74 | 1.5168 | 64.20 |
| 21 | −675.14 | Variable | | |
| 22 | −100.60 | 1.65 | 1.4970 | 81.61 |
| 23 | 32.90 | 2.41 | | |
| 24 | 36.44 | 4.22 | 1.6990 | 30.05 |
| 25 | 307.65 | 7.52 | | |
| 26(ST) | ∞ | Variable | | |
| 27 | −193.78 | 4.68 | 1.4970 | 81.61 |
| 28 | −30.48 | 2.51 | | |
| 29 | −27.05 | 1.51 | 1.8061 | 40.73 |
| 30 | 112.25 | 8.29 | | |
| 31 | 61.09 | 8.48 | 1.4970 | 81.61 |
| 32 | −45.39 | 0.20 | | |
| 33 | 743.65 | 2.18 | 1.8340 | 37.35 |
| 34 | 41.64 | 3.40 | | |
| 35 | 58.38 | 8.77 | 1.4970 | 81.61 |
| 36 | −60.02 | Variable | | |
| 37 | 62.16 | 6.68 | 1.4970 | 81.61 |
| 38 | −136.99 | 10.21 | | |
| 39 | ∞ | 70.00 | 1.5168 | 64.20 |
| 40 | ∞ | 5.00 | | |
| 41 | ∞ | 3.00 | 1.4875 | 70.44 |
| 42 | ∞ | 0.50 | | |
| 43(IM) | ∞ | | | |

Miscellaneous Data
Zoom Ratio 1.38

| | TELE | MIDDLE | WIDE |
|---|---|---|---|
| Focal Length | 23.70 | 20.16 | 17.15 |
| Half Angle of View ω | 25.59 | 29.38 | 33.50 |
| Maximum Image Height | 11.35 | 11.35 | 11.35 |
| F Number | 2.50 | 2.50 | 2.50 |
| BF | 63.88 | 63.88 | 63.88 |
| Entire Lens System Length | 330.14 | 330.14 | 330.14 |
| d13 | 7.61 | 25.26 | 40.09 |
| d17 | 7.35 | 4.80 | 3.88 |
| d21 | 32.96 | 17.85 | 3.95 |
| d26 | 17.22 | 20.49 | 23.10 |
| d36 | 6.88 | 3.60 | 1.00 |

Zoom Lens Group Data

| | Group Movement Amount (From TELE) | | |
|---|---|---|---|
| Group/Surface | MIDDLE | WIDE | Focal Length |
| Gr1/1-13 | 0.00 | 0.00 | −35.52 |
| Gr2/14-17 | 17.65 | 32.48 | −238.60 |
| Gr3/18-21 | 15.11 | 29.01 | 48.07 |
| Gr4/22-26 | 0.00 | 0.00 | −450.17 |
| Gr5/27-36 | 3.27 | 5.88 | −97786.61 |
| Gr6/37-38 | 0.00 | 0.00 | 86.75 |

Example 9

Unit: mm

Surface Data

| i | CR | d | nd | vd |
|---|---|---|---|---|
| 0(SC) | ∞ | 10450.00 | | |
| 1 | ∞ | 0.00 | | |
| 2 | 102.69 | 3.69 | 1.6584 | 50.85 |
| 3 | 34.95 | 17.58 | | |
| 4 | −1740.25 | 2.94 | 1.6031 | 60.69 |
| 5 | 66.64 | 6.30 | | |
| 6 | 853.92 | 7.55 | 1.7408 | 27.76 |
| 7 | −75.86 | 4.00 | | |
| 8 | 127.82 | 2.59 | 1.8052 | 25.46 |
| 9 | 40.51 | 18.87 | | |
| 10 | 107.40 | 13.69 | 1.5168 | 64.20 |
| 11 | −42.06 | 0.20 | | |
| 12 | −88.67 | 2.47 | 1.6031 | 60.69 |
| 13 | 59.80 | Variable | | |
| 14 | 219.67 | 6.44 | 1.5168 | 64.20 |
| 15 | −77.34 | 32.97 | | |
| 16 | −48.48 | 2.07 | 1.7234 | 37.99 |
| 17 | −2044.78 | Variable | | |
| 18 | −156.72 | 7.17 | 1.5168 | 64.20 |
| 19 | −39.42 | 0.20 | | |
| 20 | 78.44 | 6.32 | 1.5168 | 64.20 |
| 21 | −168.35 | Variable | | |
| 22 | −99.70 | 1.48 | 1.4970 | 81.61 |
| 23 | 30.93 | 2.43 | | |
| 24 | 33.92 | 4.27 | 1.7174 | 29.50 |
| 25 | 209.18 | 10.95 | | |
| 26(ST) | 00 | Variable | | |
| 27 | −84.91 | 5.89 | 1.4970 | 81.61 |
| 28 | −29.00 | 2.49 | | |
| 29 | −25.93 | 1.49 | 1.8061 | 40.73 |
| 30 | 100.35 | 5.19 | | |
| 31 | 60.25 | 8.03 | 1.4970 | 81.61 |
| 32 | −44.15 | 0.21 | | |
| 33 | 218.30 | 1.86 | 1.8061 | 33.27 |
| 34 | 41.69 | 3.92 | | |
| 35 | 64.09 | 8.01 | 1.4970 | 81.61 |
| 36 | −63.23 | Variable | | |
| 37 | 65.43 | 7.30 | 1.4970 | 81.61 |
| 38 | −90.22 | 9.11 | | |
| 39 | ∞ | 70.00 | 1.5168 | 64.20 |
| 40 | ∞ | 5.00 | | |
| 41 | ∞ | 3.00 | 1.4875 | 70.44 |
| 42 | ∞ | 0.50 | | |
| 43(IM) | ∞ | | | |

Miscellaneous Data
Zoom Ratio 1.38

| | TELE | MIDDLE | WIDE |
|---|---|---|---|
| Focal Length | 23.71 | 20.17 | 17.15 |
| Half Angle of View ω | 25.58 | 29.38 | 33.49 |
| Maximum Image Height | 11.35 | 11.35 | 11.35 |
| F Number | 2.50 | 2.50 | 2.50 |
| BF | 62.78 | 62.78 | 62.78 |
| Entire Lens System Length | 330.15 | 330.15 | 330.15 |
| d13 | 6.20 | 25.13 | 39.33 |
| d17 | 8.77 | 5.26 | 4.45 |
| d21 | 31.28 | 15.86 | 2.47 |

-continued

Unit: mm

|  | | | |
|---|---|---|---|
| d26 | 19.89 | 21.00 | 21.57 |
| d36 | 2.69 | 1.57 | 1.00 |

Zoom Lens Group Data

| | Group Movement Amount (From TELE) | | |
|---|---|---|---|
| Group/Surface | MIDDLE | WIDE | Focal Length |
| Gr1/1-13 | 0.00 | 0.00 | −34.43 |
| Gr2/14-17 | 18.93 | 33.13 | −860.96 |
| Gr3/18-21 | 15.42 | 28.81 | 50.85 |
| Gr4/22-26 | 0.00 | 0.00 | −432.64 |
| Gr5/27-36 | 1.11 | 1.69 | −500.00 |
| Gr6/37-38 | 0.00 | 0.00 | 77.29 |

TABLE 1

| Conditional Formula | | Type A Example 1 | | Type A Example 2 | | Type A Example 3 |
|---|---|---|---|---|---|---|
| (1) np | | 1.577 | | 1.635 | | 1.615 |
| (2) $|\phi 1/\phi w|$ | | 0.343 | | 0.347 | | 0.500 |
| (3) $\theta g\_F + 0.001682 \times vd$ | L9 | 0.676 | L9 | 0.693 | L9 | 0.676 |
| (4) vd | | 81.610 | | 95.100 | | 81.610 |
| $\theta g\_F$ | | 0.539 | | 0.533 | | 0.539 |
| (3) $\theta g\_F + 0.001682 \times vd$ | L10 | 0.676 | L10 | 0.693 | L10 | 0.676 |
| (4) vd | | 81.610 | | 95.100 | | 81.610 |
| $\theta g\_F$ | | 0.539 | | 0.533 | | 0.539 |
| (5) $|\phi 1p/\phi 1|$ | | 0.414 | | 0.536 | | 0.338 |
| (6) $\phi x \times |\Delta 5|$ | | 0.095 | | 0.093 | | 0.088 |

| Conditional Formula | | Type A Example 4 | | Type A Example 5 | | Type A Example 6 |
|---|---|---|---|---|---|---|
| (1) np | | 1.649 | | 1.625 | | 1.645 |
| (2) $|\phi 1/\phi w|$ | | 0.337 | | 0.424 | | 0.495 |
| (3) $\theta g\_F + 0.001682 \times vd$ | L9 | 0.693 | L9 | 0.649 | L10 | 0.647 |
| (4) vd | | 95.100 | | 70.450 | | 63.400 |
| $\theta g\_F$ | | 0.533 | | 0.531 | | 0.540 |
| (3) $\theta g\_F + 0.001682 \times vd$ | L10 | 0.693 | L10 | 0.649 | L11 | 0.643 |
| (4) vd | | 95.100 | | 70.450 | | 60.690 |
| $\theta g\_F$ | | 0.533 | | 0.531 | | 0.541 |
| (3) $\theta g\_F + 0.001682 \times vd$ | | | | | L12 | 0.643 |
| (4) vd | | | | | | 60.690 |
| $\theta g\_F$ | | | | | | 0.541 |
| (5) $|\phi 1p/\phi 1|$ | | 0.568 | | 0.472 | | 0.585 |
| (6) $\phi x \times |\Delta 5|$ | | 0.073 | | 0.084 | | 0.103 |

| Conditional Formula | | Type A Example 7 | | Type B Example 8 | | Type B Example 9 |
|---|---|---|---|---|---|---|
| (1) np | | 1.615 | | 1.622 | | 1.623 |
| (2) $|\phi 1/\phi w|$ | | 0.500 | | 0.483 | | 0.498 |
| (3) $\theta g\_F + 0.001682 \times vd$ | L11 | 0.676 | L11 | 0.676 | L11 | 0.676 |
| (4) vd | | 81.610 | | 81.610 | | 81.610 |
| $\theta g\_F$ | | 0.539 | | 0.539 | | 0.539 |
| (3) $\theta g\_F + 0.001682 \times vd$ | L12 | 0.647 | | | | |
| (4) vd | | 63.400 | | | | |
| $\theta g\_F$ | | 0.540 | | | | |
| (5) $|\phi 1p/\phi 1|$ | | 0.403 | | | | |
| (6) $\phi x \times |\Delta 5|$ | | 0.053 | | | | |

LIST OF REFERENCE SIGNS

ZL zoom lens system (projection lens system)
Gr1 first lens group
Gr2 second lens group
Gr3 third lens group
Gr4 fourth lens group
Gr5 fifth lens group
Gr6 sixth lens group
ST aperture stop
PJ projector
PR prism
Lj j-th lens element (j=1, 2, 3 . . . )
SC screen surface
IM image display surface (reduction-conjugate-side image plane)
1 light source
2 illumination optical system
3 reflective mirror
4 image display device
5 control unit
6 actuator
AX optical axis

The invention claimed is:
1. A projection lens system, comprising, in order from an enlargement conjugate side:
   a first lens group having a negative refractive power;
   a second lens group having a negative refractive power;
   a third lens group having a positive refractive power;
   a fourth lens group having a negative refractive power;
   a fifth lens group; and
   a sixth lens group having a positive refractive power,
   the projection lens system achieving zooming by varying a distance between lens groups,
   wherein
   at least the second lens group, the third lens group, and the fifth lens group each move during zooming;
   the third lens group moves from the enlargement conjugate side to a reduction conjugate side during zooming from a telephoto end to a wide-angle end;
   an aperture stop is disposed between a most reduction-conjugate-side surface of the third lens group and a most enlargement-conjugate-side surface of the fifth lens group;
   the projection lens system is substantially telecentric on the reduction conjugate side; and
   the fourth lens group includes, in order from the enlargement conjugate side, two or more negative lens elements and a positive lens element.
2. The projection lens system according to claim 1, wherein
   the fifth lens group has a positive refractive power.
3. The projection lens system according to claim 2, wherein
   the first lens group remains stationary except during focusing.
4. The projection lens system according to claim 2, wherein
   the first lens group remains stationary except during focusing; and
   in addition to the second lens group, the third lens group, and the fifth lens group, the fourth lens group moves during zooming from the telephoto end to the wide-angle end.

5. The projection lens system according to claim 2, wherein
a most enlargement-conjugate-side lens element in the first lens group has a negative refractive power.

6. The projection lens system according to claim 2, wherein
conditional formula (1) below is fulfilled:

$$1.57 < np < 1.65$$

where
np represents an average value of refractive indices for a d-line of lens elements constituting the first lens group, the second lens group, and the third lens group.

7. The projection lens system according to claim 2, wherein
conditional formula (2) below is fulfilled:

$$0.33 < |\phi 1/\phi w| < 0.50$$

where
$\phi 1$ represents a refractive power of the first lens group, and
$\phi w$ represents a refractive power of the entire projection lens system at the wide-angle end.

8. The projection lens system according to claim 2, wherein
at least one of lens elements having a negative refractive power included in the fourth lens group fulfills conditional formulae (3) and (4) below:

$$0.645 < \theta g\_F + 0.001682 \times \upsilon d < 0.695$$

$$60 < \upsilon d < 100$$

where
$\theta g\_F$ represents a partial dispersion ratio of a material of the lens element, $$\theta g\_F = (Ng - NF)/(NF - NC)$$

Ng represents a refractive index for a g-line,
NF represents a refractive index for an F-line,
NC represents a refractive index for a C-line, and
$\upsilon d$ represents an Abbe number of the material of the lens element.

9. The projection lens system according to claim 2, wherein
the first lens group includes at least one lens element having a positive refractive power; and
conditional formula (5) below is fulfilled:

$$0.33 < |\phi 1p/\phi 1| < 0.59$$

where
$\phi 1p$ represents an average refractive power of a lens element having a positive refractive power included in the first lens group, and
$\phi 1$ represents a refractive power of the first lens group.

10. The projection lens system according to claim 2, wherein
conditional formula (6) below is fulfilled:

$$0.053 < \phi xx|\Delta 5| < 0.105$$

where
$\phi x$ represents a composite refractive power, at the telephoto end, of from a lens group disposed to the reduction conjugate side of the aperture stop through the fifth lens group, and
$\Delta 5$ represents a movement amount of the fifth lens group during zooming from the telephoto end to the wide-angle end.

11. The projection lens system according to claim 1, wherein
a most enlargement-conjugate-side lens element in the first lens group has a negative refractive power.

12. The projection lens system according to claim 1, wherein
conditional formula (1) below is fulfilled:

$$1.57 < np < 1.65$$

where
np represents an average value of refractive indices for a d-line of lens elements constituting the first lens group, the second lens group, and the third lens group.

13. The projection lens system according to claim 1, wherein
the first lens group includes at least one lens element having a positive refractive power; and
conditional formula (5) below is fulfilled:

$$0.33 < |\phi 1p/\phi 1| < 0.59$$

where
$\phi 1p$ represents an average refractive power of a lens element having a positive refractive power included in the first lens group, and
$\phi 1$ represents a refractive power of the first lens group.

14. The projection lens system according to claim 1, wherein
conditional formula (6) below is fulfilled:

$$0.053 < \phi xx|\Delta 5| < 0.105$$

where
$\phi x$ represents a composite refractive power, at the telephoto end, of from a lens group disposed to the reduction conjugate side of the aperture stop through the fifth lens group, and
$\Delta 5$ represents a movement amount of the fifth lens group during zooming from the telephoto end to the wide-angle end.

15. A projector, comprising:
an image display device that displays an image;
a light source;
an illumination optical system that directs light from the light source to the image display device; and
the projection lens system according to claim 1 which projects the image displayed on the image display device onto a screen surface on an enlarged scale.

16. A projection lens system, comprising, in order from an enlargement conjugate side:
a first lens group having a negative refractive power;
a second lens group having a negative refractive power;
a third lens group having a positive refractive power;
a fourth lens group having a negative refractive power;
a fifth lens group; and
a sixth lens group having a positive refractive power,
the projection lens system achieving zooming by varying a distance between lens groups,
wherein
at least the second lens group, the third lens group, and the fifth lens group each move during zooming;
the third lens group moves from the enlargement conjugate side to a reduction conjugate side during zooming from a telephoto end to a wide-angle end;
an aperture stop is disposed between a most reduction-conjugate-side surface of the third lens group and a most enlargement-conjugate-side surface of the fifth lens group;
the projection lens system is substantially telecentric on the reduction conjugate side; and conditional formula (1) below is fulfilled:

$$1.57<np<1.65$$

where np represents an average value of refractive indices for a d-line of lens elements constituting the first lens group, the second lens group, and the third lens group.

17. The projection lens system according to claim 16, wherein
the fifth lens group has a positive refractive power.

18. The projection lens system according to claim 17, wherein
the first lens group remains stationary except during focusing; and
in addition to the second lens group, the third lens group, and the fifth lens group, the fourth lens group moves during zooming from the telephoto end to the wide-angle end.

19. The projection lens system according to claim 17, wherein
a most enlargement-conjugate-side lens element in the first lens group has a negative refractive power.

20. The projection lens system according to claim 17, wherein
conditional formula (2) below is fulfilled:

$$0.33<|\phi 1/\phi w|<0.50$$

where
$\phi 1$ represents a refractive power of the first lens group, and
$\phi w$ represents a refractive power of the entire projection lens system at the wide-angle end.

21. The projection lens system according to claim 17, wherein
at least one of lens elements having a negative refractive power included in the fourth lens group fulfills conditional formulae (3) and (4) below:

$$0.645<\theta g\_F+0.001682\times \upsilon d<0.695$$

$$60<\upsilon d<100$$

where
$\theta g\_F$ represents a partial dispersion ratio of a material of the lens element, $$\theta g\_F=(Ng-NF)/(NF-NC)$$

Ng represents a refractive index for a g-line,
NF represents a refractive index for an F-line,
NC represents a refractive index for a C-line, and
$\upsilon d$ represents an Abbe number of the material of the lens element.

22. The projection lens system according to claim 17, wherein
the first lens group includes at least one lens element having a positive refractive power; and
conditional formula (5) below is fulfilled:

$$0.33<|\phi 1p/\phi 1|<0.59$$

where
$\phi 1p$ represents an average refractive power of a lens element having a positive refractive power included in the first lens group, and
$\phi 1$ represents a refractive power of the first lens group.

23. The projection lens system according to claim 17, wherein
conditional formula (6) below is fulfilled:

$$0.053<|\phi xx|\Delta 5|<0.105$$

where
$\phi x$ represents a composite refractive power, at the telephoto end, of from a lens group disposed to the reduction conjugate side of the aperture stop through the fifth lens group, and
$\Delta 5$ represents a movement amount of the fifth lens group during zooming from the telephoto end to the wide-angle end.

24. The projection lens system according to claim 16, wherein
conditional formula (6) below is fulfilled:

$$0.053<|\phi xx|\Delta 5|<0.105$$

where
$\phi x$ represents a composite refractive power, at the telephoto end, of from a lens group disposed to the reduction conjugate side of the aperture stop through the fifth lens group, and
$\Delta 5$ represents a movement amount of the fifth lens group during zooming from the telephoto end to the wide-angle end.

25. A projection lens system, comprising, in order from an enlargement conjugate side:
a first lens group having a negative refractive power;
a second lens group having a negative refractive power;
a third lens group having a positive refractive power;
a fourth lens group having a negative refractive power;
a fifth lens group; and
a sixth lens group having a positive refractive power,
the projection lens system achieving zooming by varying a distance between lens groups,
wherein
at least the second lens group, the third lens group, and the fifth lens group each move during zooming;
the third lens group moves from the enlargement conjugate side to a reduction conjugate side during zooming from a telephoto end to a wide-angle end;
an aperture stop is disposed between a most reduction-conjugate-side surface of the third lens group and a most enlargement-conjugate-side surface of the fifth lens group;
the projection lens system is substantially telecentric on the reduction conjugate side; and
conditional formula (6) below is fulfilled:

$$0.053<|\phi xx|\Delta 5|<0.105$$

where
$\phi x$ represents a composite refractive power, at the telephoto end, of from a lens group disposed to the reduction conjugate side of the aperture stop through the fifth lens group, and
$\Delta 5$ represents a movement amount of the fifth lens group during zooming from the telephoto end to the wide-angle end.

26. The projection lens system according to claim 25, wherein
the fifth lens group has a positive refractive power.

27. The projection lens system according to claim 26, wherein
the first lens group remains stationary except during focusing; and
in addition to the second lens group, the third lens group, and the fifth lens group, the fourth lens group moves during zooming from the telephoto end to the wide-angle end.

28. The projection lens system according to claim 26, wherein
a most enlargement-conjugate-side lens element in the first lens group has a negative refractive power.

29. The projection lens system according to claim 26, wherein
the first lens group includes at least one lens element having a positive refractive power; and
conditional formula (5) below is fulfilled:

$$0.33<|\phi 1p/\phi 1|<0.59$$

where
$\phi 1p$ represents an average refractive power of a lens element having a positive refractive power included in the first lens group, and
$\phi 1$ represents a refractive power of the first lens group.

30. A projection lens system, comprising, in order from an enlargement conjugate side:
a first lens group having a negative refractive power;
a second lens group having a negative refractive power;
a third lens group having a positive refractive power;
a fourth lens group having a negative refractive power;
a fifth lens group; and
a sixth lens group having a positive refractive power,
the projection lens system achieving zooming by varying a distance between lens groups,
wherein
at least the second lens group, the third lens group, and the fifth lens group each move during zooming;
the third lens group moves from the enlargement conjugate side to a reduction conjugate side during zooming from a telephoto end to a wide-angle end;
an aperture stop is disposed between a most reduction-conjugate-side surface of the third lens group and a most enlargement-conjugate-side surface of the fifth lens group;
the projection lens system is substantially telecentric on the reduction conjugate side; and
the fifth lens group has a negative refractive power or is afocal.

31. The projection lens system according to claim 30, wherein
the first lens group remains stationary except during focusing.

32. The projection lens system according to claim 30, wherein
the first lens group remains stationary except during focusing; and
in addition to the second lens group, the third lens group, and the fifth lens group, the fourth lens group moves during zooming from the telephoto end to the wide-angle end.

33. The projection lens system according to claim 30, wherein
a most enlargement-conjugate-side lens element in the first lens group has a negative refractive power.

34. The projection lens system according to claim 30, wherein
conditional formula (1) below is fulfilled:

$$1.57<np<1.65$$

where
np represents an average value of refractive indices for a d-line of lens elements constituting the first lens group, the second lens group, and the third lens group.

35. The projection lens system according to claim 30, wherein
conditional formula (2) below is fulfilled:

$$0.33<|\phi 1/\phi w|<0.50$$

where
$\phi 1$ represents a refractive power of the first lens group, and
$\phi w$ represents a refractive power of the entire projection lens system at the wide-angle end.

36. The projection lens system according to claim 30, wherein
the fourth lens group includes, in order from the enlargement conjugate side, one or more negative lens elements and a positive lens element; and
at least one lens element having a negative refractive power included in the fourth lens group fulfills conditional formulae (3) and (4) below:

$$0.645<\theta g\_F+0.001682\times \upsilon d<0.695$$

$$60<\upsilon d<100$$

where
$\theta g\_F$ represents a partial dispersion ratio of a material of the lens element, $$\theta g\_F=(Ng\text{-}NF)/(NF\text{-}NC)$$

Ng represents a refractive index for a g-line,
NF represents a refractive index for an F-line,
NC represents a refractive index for a C-line, and
$\upsilon d$ represents an Abbe number of the material of the lens element.

37. A projector, comprising:
an image display device that displays an image;
a light source;
an illumination optical system that directs light from the light source to the image display device; and
the projection lens system according to claim 30 which projects the image displayed on the image display device onto a screen surface on an enlarged scale.

* * * * *